US012460225B2

(12) United States Patent
Follenzi et al.

(10) Patent No.: US 12,460,225 B2
(45) Date of Patent: Nov. 4, 2025

(54) VECTOR WITH AN ENDOTHELIAL-SPECIFIC PROMOTER FOR TREATING FACTOR V, VII, VIII, OR IX DEFICIENCY

(71) Applicants: UNIVERSITA' DEL PIEMONTE ORIENTALE, Vercelli (IT); Licio Collavin, Trieste (IT)

(72) Inventors: Antonia Follenzi, Vercelli (IT); Simone Merlin, Vercelli (IT); Ester Borroni, Vercelli (IT); Chiara Borsotti, Vercelli (IT); Valentina Bruscaggin, Vercelli (IT); Silvia Zucchelli, Vercelli (IT)

(73) Assignee: UNIVERSITA' DEL PIEMONTE ORIENTALE, Vercelli (IT)

( * ) Notice: Subject to any disclaimer, the term of this patent is extended or adjusted under 35 U.S.C. 154(b) by 514 days.

(21) Appl. No.: 16/634,432

(22) PCT Filed: Jul. 26, 2018

(86) PCT No.: PCT/IB2018/055603
§ 371 (c)(1),
(2) Date: Jan. 27, 2020

(87) PCT Pub. No.: WO2019/021238
PCT Pub. Date: Jan. 31, 2019

(65) Prior Publication Data

US 2020/0165631 A1 May 28, 2020

(30) Foreign Application Priority Data

Jul. 27, 2017 (IT) ........................ 102017000086403

(51) Int. Cl.

| | |
|---|---|
| ***C12N 15/86*** | (2006.01) |
| ***A61K 48/00*** | (2006.01) |
| ***C07K 14/705*** | (2006.01) |
| ***C07K 14/755*** | (2006.01) |

(52) U.S. Cl.
CPC ............ *C12N 15/86* (2013.01); *A61K 48/005* (2013.01); *C07K 14/705* (2013.01); *C07K 14/755* (2013.01); *C12N 2830/008* (2013.01); *C12N 2830/48* (2013.01)

(58) Field of Classification Search
None
See application file for complete search history.

(56) References Cited

U.S. PATENT DOCUMENTS

2016/0244837 A1 8/2016 Bare et al.

FOREIGN PATENT DOCUMENTS

| | | | |
|---|---|---|---|
| WO | 2005/052171 | 6/2005 | |
| WO | 2007/000668 | 1/2007 | |
| WO | WO-2010125471 A2 * | 11/2010 | ............. A61K 48/00 |
| WO | 2017/109039 | 6/2017 | |
| WO | WO-2017109039 A1 * | 6/2017 | ............. A61K 39/23 |
| WO | WO-2017212460 A1 * | 12/2017 | ............. A61K 38/37 |

OTHER PUBLICATIONS

Perrin, Blood, 2019, vol. 133, No. 5, p. 407-414.*
Zhou (Glycobiology, 2003, vol. 13, No. 5, p. 339-349.*
SignaGen Labs, "How to locate promoter sequence for a specific gene", Oct. 14, 2015.*
Johnston (Gene Therapy, 2013, vol. 20, p. 607-615).*
Wang (Molecular Therapy, 2015, vol. 23, No. 4, p. 617-626).*
Yarovoi (Blood, 2003, vol. 102, p. 4006-4013).*
Barry (Human Gene Therapy, 2001, vol. 12, No. 1103-1108).*
International Search Report issued Oct. 19, 2018 in International (PCT) Application No. PCT/IB2018/055603.
Megan S. Rost et al., "Hyaluronic Acid Receptor Stabilin-2 Regulates Erk Phosphorylation and Arterial—Venous Differentiation in Zebrafish", PLOS ONE, vol. 9, No. 2, Feb. 28, 2014, e88614, XP055444397, pp. 1-11.
Cyrill Géraud et al., "GATA4-dependent organ-specific endothelial differentiation controls liver development and embryonic hematopoiesis", The Journal of Clinical Investigation, vol. 127, No. 3, Mar. 2017, pp. 1099-1114, XP05544378.
James D. Perkins et al., "Liver Sinusoidal Endothelial Cells: Their Unique Role in Immune Tolerance", Liver Transplantation, col. 12, No. 12, Dec. 2006, pp. 1900-1903, XP055444522.
Marina E. Fomin, "Production of Factor VIII by Human Liver Sinusoidal Endothelial Cells Transplanted in Immunodeficient uPA Mice", PLOS ONE, vol. 8, No. 10. Oct. 22, 2013, e77255, XP055444533, pp. 1-13.

* cited by examiner

*Primary Examiner* — Michael C Wilson
(74) *Attorney, Agent, or Firm* — Silvia Salvadori, P.C.; Silvia Salvadori

(57) ABSTRACT

Sequences derived from Stabilin-2 promoter are used as a promoter to drive the expression of a gene specifically into endothelial cells, preferably said gene is a therapeutic gene, such as FVIII or any gene involved in the coagulation cascade. Moreover, the use of these sequences is for medical purposes, in particular, to treat a genetic disease, such as hemophilia, preferably by gene and/or cellular therapy.

13 Claims, 15 Drawing Sheets

Figure 1:
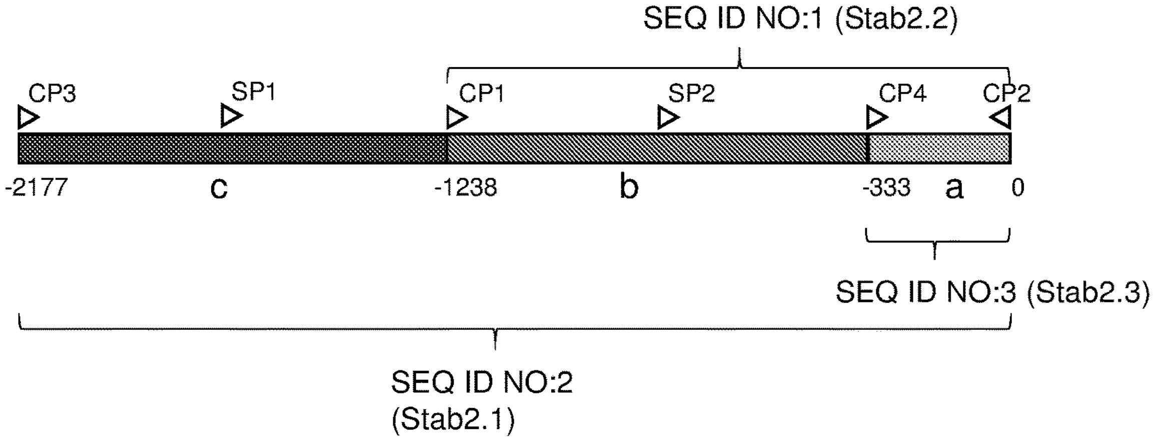

Specification includes a Sequence Listing.

Full lenght stab2 promoter

A

B

A

B

A

B

A

B

VECTOR WITH AN ENDOTHELIAL-SPECIFIC PROMOTER FOR TREATING FACTOR V, VII, VIII, OR IX DEFICIENCY

The present invention refers to sequences derived from Stabilin-2 (Stab-2) promoter to be used as promoter to drive the expression of a gene specifically into endothelial cells, preferably, said gene is a therapeutic gene, such as FVIII or any gene involved in the coagulation cascade or having a particular function into endothelial cells homeostasis or having the need to be produced in endothelial cells.

Moreover, the invention refers to the use of these sequences for medical purposes, in particular, to treat a genetic disease, such as hemophilia, preferably by gene and/or cellular therapy.

BACKGROUND

Hemophilia A (HA) is a recessive X-linked bleeding disorder that occurs in 1:5000 male new births and is due to the lack or reduced activity of coagulation Factor VIII (FVIII).

Based on the residual FVIII activity, there are three forms of hemophilia A: 1) the severe form characterized by levels of FVIII below 1%; 2) the moderate form characterized by levels of FVIII between 1 and 5%; and 3) the mild form showing from 5 to 40% of FVIII activity.

The clinical manifestations of the disease range from spontaneous bleeding, with frequent haemarthroses in the most severe form, to secondary bleeding with rare haemarthroses in milder form.

Although the development of blood products and the availability of recombinant FVIII have drastically improved the patient's quality of life, the replacement therapy does not represent yet a definitive cure and several issues are still to be solved. Among these, there are the high costs, the frequent number of administrations due to the short FVIII half-life in the bloodstream, and the high probability to develop neutralizing antibodies.

Thus, further therapeutic approaches are still required.

Since orthotopic liver transplantation corrected hemophilia A, liver has been considered the primary site of FVIII production. However, the identity of liver cells expressing FVIII is controversial and therefore it still represents a question to be definitively clarified.

Hemophilia A represent an ideal target for gene therapy since restoring FVIII levels higher than 1% is sufficient to ameliorate the bleeding phenotypes of patients with an overall increase of quality of life. Hemophilia B gene therapy has provided good results in clinical trials by using adeno associated-viral vector (AAV) to deliver FIX into the patients.

Despite the relevant results obtained for hemophilia B, gene therapy for hemophilia A has seen significantly less progress into the clinic due to several aspects that make FVIII expression complicated compared to FIX expression. Recently, Biomarine has started a clinical trial on Hemophilia A patients using AAV5 to express FVIII at therapeutic levels. The results of the trial are encouraging and further data are expected at the completion of the study (by 2022).

FVIII is naturally 5-6 fold more immunogenic than FIX. Therefore, the transgene-mediated immune response represents the main big concern.

Restricting FVIII expression to specific cell type allows to overcoming inhibitor's development.

Up to day, liver, and in particular, hepatocytes, are the preferred target for hemophilia A gene therapy. Indeed, they show a limited transgene mediated immune response.

Nevertheless, the anti-FVIII antibodies development is still a current drawback for the feasibility of hemophilia A gene therapy.

In view of these considerations, there is still a huge need to develop a new gene therapy strategy to cure hemophilia, preferably type A hemophilia. In particular, there is still a need to develop a system to express FVIII or its variants by gene therapy in a way free of side effects and, above all, free of the transgene immune response drawbacks like anti-FVIII antibodies generation.

At this regard, encouraging results in mice were obtained by restricting FVIII expression to platelets by using megakaryocyte-specific promoters.

The present invention proposes as a solution to the needs of the prior art disclosed above nucleotide sequences derived from Stabilin-2 promoter. These sequences are able to induce the endothelial-specific expression, mainly in sinusoidal endothelial cells of liver, of a therapeutic gene, such as FVIII and/or its variants/fragments or further players of the coagulation cascade, when the expression of said gene is under control of (regulated by) said sequences. Advantageously the sequences of the invention can be used also to drive the endothelial-specific expression of any gene, in particular any endothelial-specific gene, such as endothelin1, 2 and 3 or VEGF-A.

In other words, the authors of the present study have found and experimentally demonstrated for the first time that sequences derived from Stabilin-2 promoter are useful to address the endothelial-specific expression of a gene of interest. In particular, when the claimed sequences are used to drive the endothelial specific expression of FVIII and/or its variants/fragments or further proteins of the coagulation cascade, they are able to rescue a pathological condition such as hemophilia, preferably hemophilia A.

Indeed, when, for example FVIII, is introduced into a vector to be expressed under the control of the claimed sequences as promoter, its expression is high, long lasting, limited to the endothelial cells and, above all, is free from any immune response against the expressed protein, preferably FVIII. In other words, the inventors have found that the endothelial expression of FVIII and/or its variants induced by these sequences does not cause anti-FVIII antibodies generation, meaning that there is no immune response against FVIII when it is expressed in these cells under the expression control of the nucleotide sequences here disclosed. Therefore, the sequences of the invention are useful for treating hemophilia, preferably type A hemophilia, preferably by gene and/or cellular therapy. In particular, the claimed sequences can be used as promoter sequences and introduced into an expression vector to drive the endothelial-specific expression of a therapeutic gene, such as FVIII and/or variants thereof.

In particular, the authors of the present invention have discovered that under the control of the sequences of the invention, the transgene expression (the expression of the therapeutic gene of interest) is specifically driven into the endothelial cells, in particular into sinusoidal endothelial cells of the liver and above all, this expression is free from any immune response elicited by transgene expression, especially when the transgene is really immunogenic like FVIII. Indeed, compared to further sequences such as FVIII promoter derived sequences, the sequences herewith disclosed allow a more striking and effective loss of the immune response against the transgene expression, preferably against FVIII.

SUMMARY OF THE INVENTION

A first aspect of the present invention refers to a vector for expressing a therapeutic molecule, preferably a gene, more preferably a therapeutic gene, specifically into endothelial cells said vector comprising at least one promoter sequence and at least a nucleotide sequence encoding for the therapeutic molecule wherein said promoter sequence is selected from or comprises a SEQ ID NO: 1-3 or variants thereof.

According to a preferred embodiment, the therapeutic molecule is selected from: FVIII, preferably human B domain-deleted (BDD) FVIII, FIX, FVII, FV or any factor of the coagulation cascade, or a functional protein involved in the coagulation cascade or having a particular function into endothelial cells homeostasis or having the need to be produced in endothelial cells.

According to a further preferred embodiment, the therapeutic molecule is selected from or comprises SEQ ID NO: 4-8 for FVIII and variants thereof, SEQ ID NO: 9 and/or 10 for FIX, SEQ ID NO: 11 for FVII and SEQ ID NO: 12 for FV or sequences having 80-99% identity.

Preferably the vector is a viral vector or a non-viral vector, wherein the viral vector is selected from: a parvovirus, an adenovirus, preferably adeno-associated vector (AAV), a herpes simplex virus, a lentiviral vector (LV), a retroviral vector, preferably HIV-1 and/or gamma retroviruses. More preferably, the vector is the improved self-inactivating (SIN) HIV-1 based LV (pCCL-prom-transgene-cPPT-Wpre), preferably prepared with the third generation lentiviral packaging system.

According to a preferred embodiment, the vector further comprises at least one sequence for modulating gene expression, preferably selected from the group and consisting of: a polyadenylation sequence; a Woodchuck hepatitis post-transcriptional regulatory element (WPRE—to increase the transcript stability); the central polypurine tract (cPPT), preferably for lentiviral vectors; at least one mirT (mir Target sequences—that are sequences recognized by tissue-specific miRNAs inducing cell specific gene knockdown in selected cell types) and any combination thereof, wherein said mirT is preferably selected from: mirT-142-3p, preferably SEQ ID NO: 15, preferably to detarget transgene expression from all hematopoietic cells; mirT-223, preferably SEQ ID NO: 14, preferably to detarget transgene expression from all myeloid cells; mirT-122, preferably SEQ ID NO: 13, preferably to detarget transgene expression from hepatocytes, and any combination thereof.

According to a further preferred embodiment, the vector comprises also an enhancer polynucleotide sequence, preferably positioned upstream or downstream and/or close or far from the nucleotide sequence, which expression has to be enhanced.

A further aspect of the present invention refers to a host cell comprising a polynucleotide sequence selected from or comprising SEQ ID NO: 1-3 or variants thereof and/or a vector as disclosed above wherein said vector is capable of expressing the nucleotide sequence encoding for the therapeutic molecule in the host, wherein the host is preferably selected from: a bacterial, a yeast, an insect or a mammalian cell.

A further aspect of the present invention refers to a transgenic animal comprising a polynucleotide sequence selected from or comprising SEQ ID NO: 1-3 or variants thereof, and/or the vector as disclosed above, or the host cell as disclosed above, wherein said animal is preferably a non-human mammal, preferably a rodent, preferably a mouse.

A further aspect of the present invention refers to a pharmaceutical composition comprising a polynucleotide sequence selected from or comprising SEQ ID NO: 1-3 or variants thereof, and/or the vector as disclosed above, or the host cell as disclosed above and at least one pharmaceutically acceptable excipients, preferably said excipients being selected from: carriers, diluents and/or other medical agents, pharmaceutical agents and adjuvants.

A further aspect of the present invention refers to a polynucleotide sequence selected from or comprising SEQ ID NO: 1-3 or variants thereof, and/or the vector as disclosed above, and/or the host cell as disclosed above, and/or the composition as disclosed above for use in therapy, preferably in gene and/or cellular therapy.

A further aspect of the present invention refers to a polynucleotide sequence selected from or comprising SEQ ID NO: 1-3 or variants thereof, and/or the vector as disclosed above, and/or the host cell as disclosed above, and/or the composition as disclosed above for use in the treatment of a pathological condition associated to or caused by a mis-expression a nucleotide sequence encoding for the therapeutic molecule, preferably said pathological condition being hemophilia, preferably type A hemophilia.

A further aspect of the present invention refers to a polynucleotide sequence selected from or comprising SEQ ID NO: 1-3 or variants thereof, and/or the vector as disclosed above, and/or the host cell as disclosed above, and/or the composition as disclosed above for use as disclosed above in combination with further medicaments useful to treat said pathological condition.

A further aspect of the present invention refers to the use of a polynucleotide sequence selected from or comprising SEQ ID NO: 1-3 or variants thereof, and/or the vector as disclosed above to drive the endothelial specific expression of a therapeutic molecule. Preferably, the therapeutic molecule is selected from: FVIII, preferably human B domain-deleted (BDD) FVIII, FIX, FVII, FV or any factor of the coagulation cascade, or a functional protein involved in the coagulation cascade or having a particular function into endothelial cells homeostasis or having the need to be expressed in endothelial cells. More preferably, the nucleotide sequence encoding for the therapeutic molecule is selected from or comprises SEQ ID NO: 4-8 for FVIII and variants thereof, SEQ ID NO: 9 and/or 10 for FIX, SEQ ID NO: 11 for FVII and SEQ ID NO: 12 for FV or sequences having 80-99% identity.

SHORT DESCRIPTION OF FIGURES

FIG. 1 shows a schematic representation of the sequences of the invention along the full-length (2177 base pairs long) Stabilin-2 promoter, wherein SEQ ID NO: 3 (a) extends from 0 to −333 base pairs (bp) upstream the start site; SEQ ID NO: 1 (a+b) extends from 0 to −1238 bp and comprises SEQ ID NO: 3 (a) and sequence from −334 to −1238 bp; SEQ ID NO: 2 (a+b+c) extends from 0 to −2177 bp and comprises SEQ ID NO: 1 (a+b) and sequence from −1239 to −2177 bp. CP=cloning primer; SP=sequencing primer.

Figure 2:
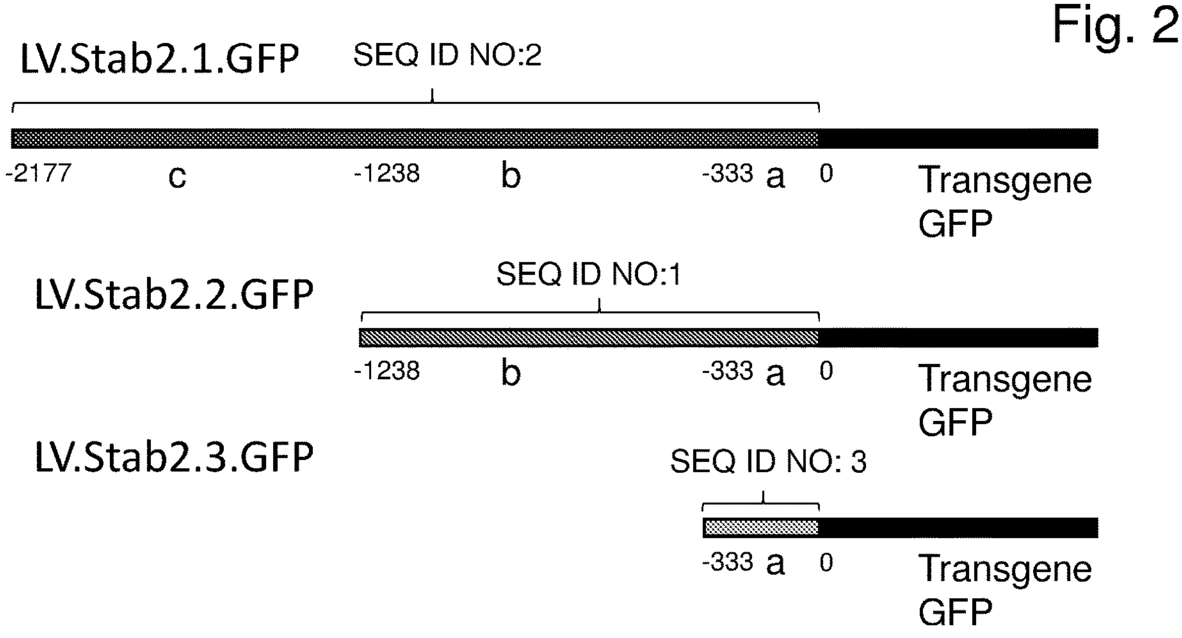

FIG. 2 shows a schematic representation of the sequences of the present invention introduced into the LV vectors upstream GFP gene as reporter. LV.Stab2.1 is the construct comprising regions a, b and c of Stabilin-2 promoter (SEQ ID NO: 2) and the GFP as reporter gene. LV.Stab2.2 is the construct comprising regions a and b of Stabilin-2 promoter (SEQ ID NO: 1). LV.Stab2.3 is the construct comprising region a of Stabilin-2 promoter (SEQ ID NO: 3).

Figure 3:
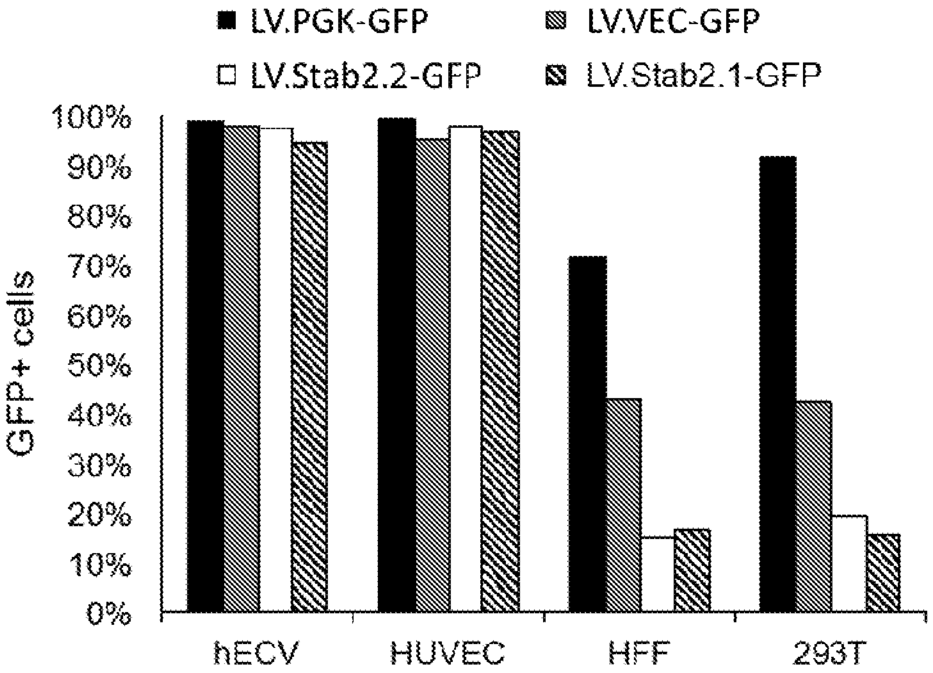

FIG. 3 shows the in vitro characterization of Stab2.1 (SEQ ID NO: 2) and Stab2.2 (SEQ ID NO: 1) sequences. Comparison of transgene expression (the GFP reporter in this case) in endothelial and non-endothelial cells after transduction with the lentiviral constructs LV.Stab2.2-GFP or LV.Stab2.1-GFP. Endothelial-specific activity was compared with the ubiquitous PGK promoter and the endothelial-specific VEC promoter. The results show that Stab2.1 and Stab2.2 sequences promote transgene expression in the human endothelial cell line (hECV) and in the primary endothelial cells (HUVEC), while their activity is strongly reduced in non-endothelial cell types.

Figure 4:
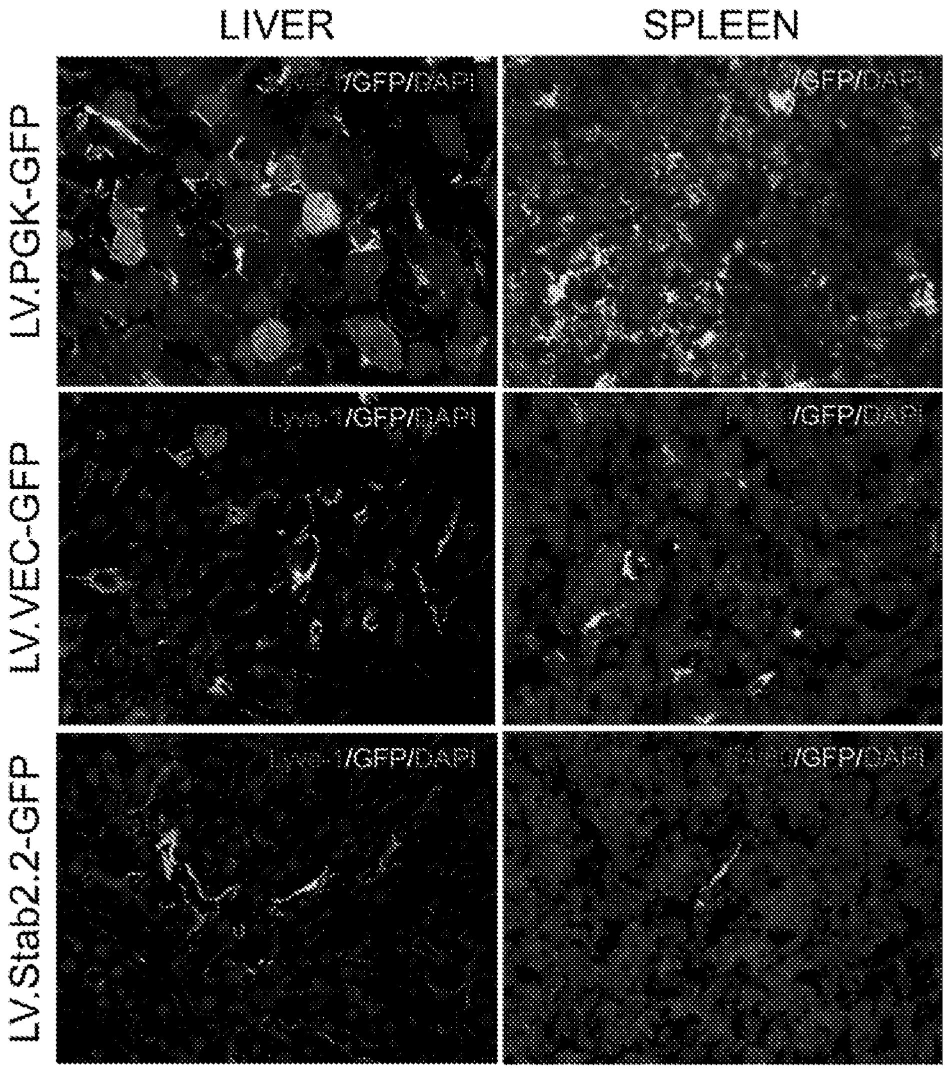

FIG. 4 shows the in vivo characterization of the sequences of the invention. Immunofluorescence on liver and spleen sections from mice injected with the lentiviral constructs LV.PGK-GFP, LV.VEC-GFP or LV.Stab2.2-GFP. The results show that after direct injection of LV.Stab2.2-GFP, transgene expression is observed mainly in liver sinusoidal endothelial cells (Lyve-1+) and in few endothelial cells in spleen, while no GFP expression was detected in other cell types, such as hepatocytes or hematopoietic cells.

Figure 5:
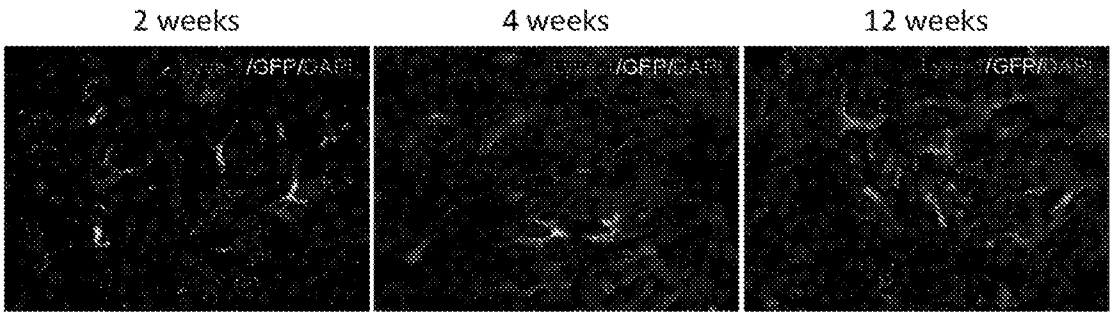

FIG. 5 shows the in vivo long-term transgene expression. Immunofluorescence on liver sections from mice injected with LV.Stab2.2-GFP. The results show that the transgene expression is observed only in liver sinusoidal endothelial cells (Lyve-1+) for up to 12 weeks after injection.

Figure 6:
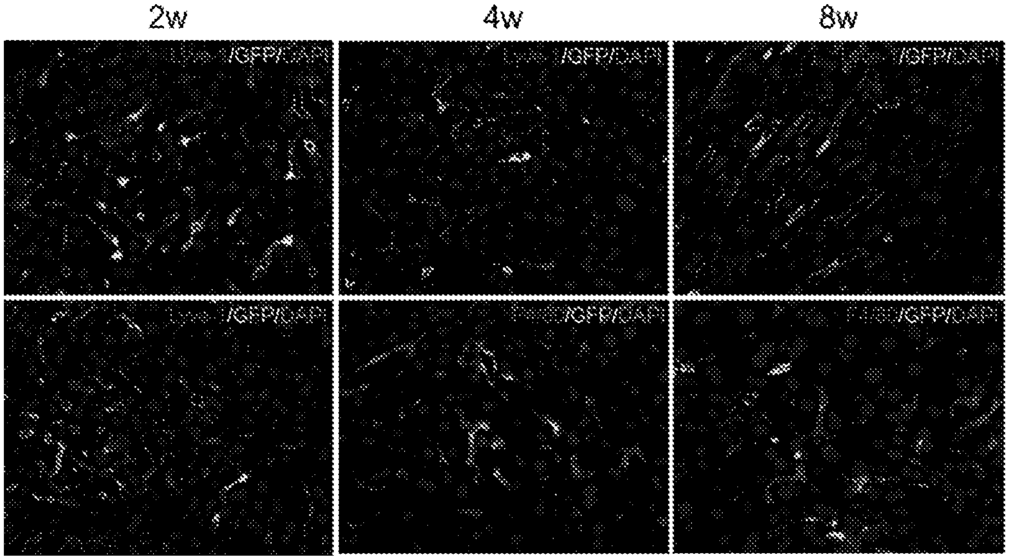

FIG. 6 shows the transgene (GFP) expression in BALB/c mice. Immunofluorescence on liver sections from BALB/c mice injected with LV.Stab2.2-GFP. The results show that the transgene expression is observed only in liver sinusoidal endothelial cells (Lyve-1+) for up to 8 weeks after LV delivery.

Figure 7:
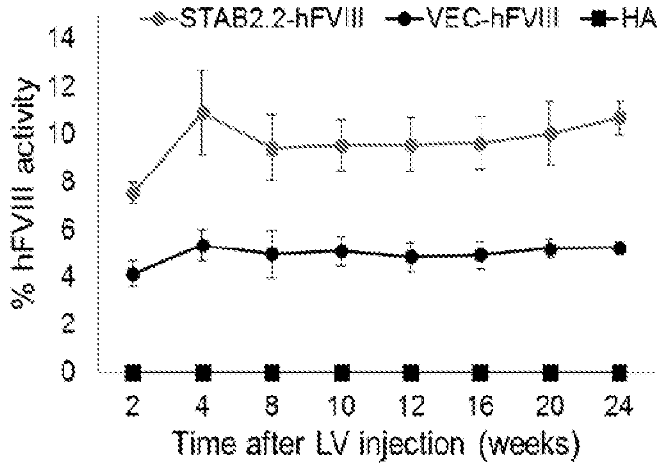
Figure 7:
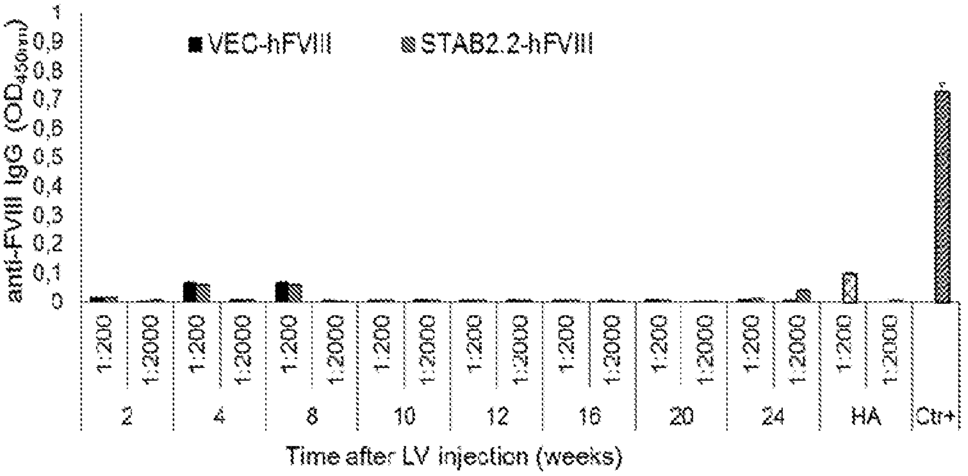

FIG. 7 shows the in vivo FVIII expression after LV.Stab2.2-hBDD-FVIII delivery. C57Bl/6 HA mice were tail vein injected with $10^9$ TU of LV.Stab2.2-hBDD-FVIII. As a comparison, a group of HA mice were injected with LV.VEC-hBDD-FVIII. A) Line chart showing hFVIII activity doubled in plasma of mice treated with LV.Stab2.2-hBDD-FVIII (~10%) for up to 24 weeks after injection. B) No anti-FVIII antibodies were detected by ELISA in plasma of treated mice up to 24 weeks after LV delivery.

Figure 8:
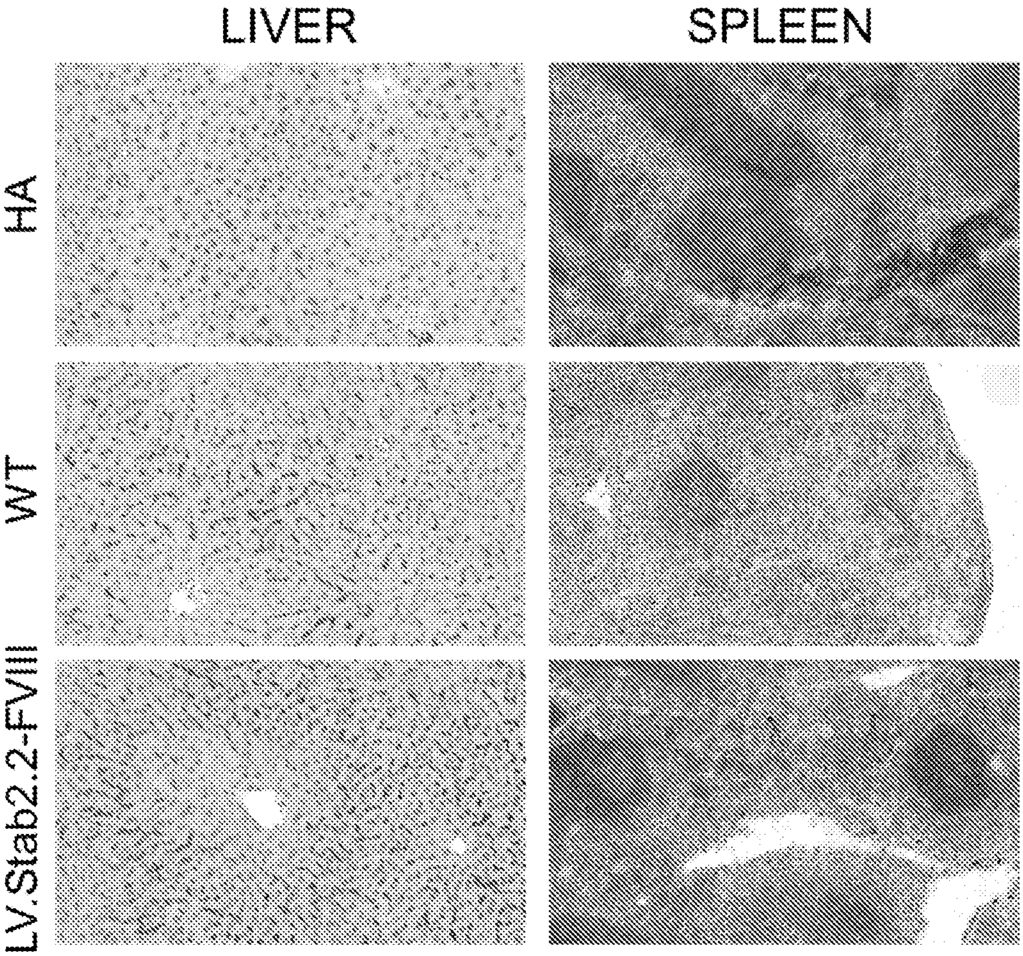

FIG. 8 shows FVIII expression in liver and spleen after LV.Stab2.2-hBDD-FVIII delivery. Immunohistochemistry showing FVIII expressed mainly by liver sinusoidal endothelial cells and, in a lesser extent, by sinusoidal endothelial cells in the spleen. HA=C57Bl/6 HA mouse; WT=C57Bl/6 mouse; LV.Stab2-FVIII=C57Bl/6 HA mouse injected with LV.Stab2.2-hBDD-FVIII.

Figure 9:
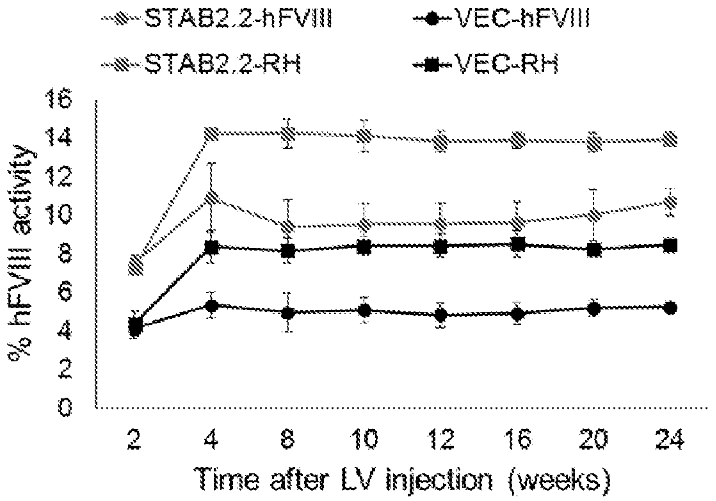
Figure 9:
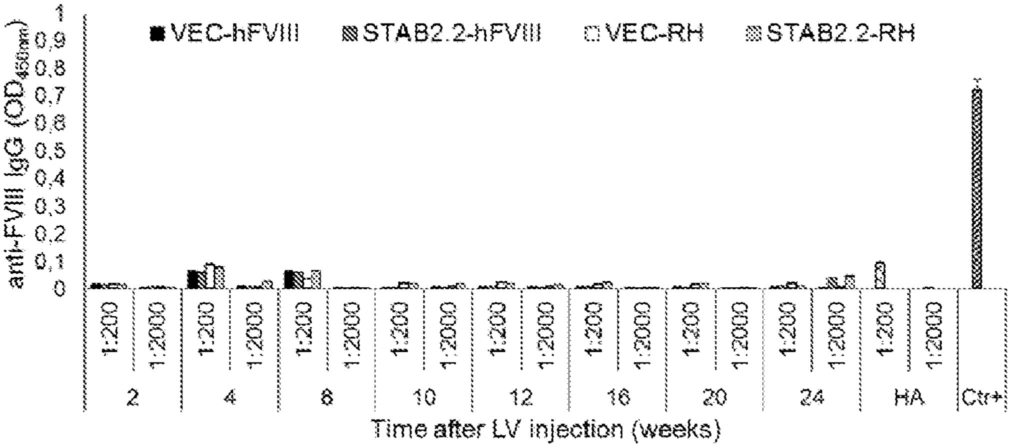

FIG. 9 shows the in vivo FVIII expression after delivery of LV containing the sequences of the invention and a more active form of FVIII. C57Bl/6 HA mice were tail vein injected with $10^9$ TU of LV.Stab2.2-hBDD-FVIII (n=4) or LV.Stab2.2-hBDD-FVIII-RH (n=4). As a comparison, two HA mice groups were injected with LV.VEC-hBDD-FVIII (n=3) or LV.VEC-FVIII-RH (n=3). A) Line chart shows hFVIII activity increased ~45-50% in plasma of mice treated with LV containing the FVIII.RH form for up to 24 weeks after injection. Despite the increase of FVIII after injection of LV.VEC-FVIII-RH, the plasma levels of FVIII activity in mice injected with LV.Stab2.2-hBDD-FVIII was higher (10% Stab2.2-hBDD-FVIII vs 8% VEC-hBDD-FVIII-RH) and almost doubled in mice injected with LV.Stab2-FVIII-RH (15% Stab2.2-hBDD-FVIII-RH vs 8% VEC-hBDD-FVIII-RH). B) No anti-FVIII antibodies were detected in plasma of all treated mice up to 24 weeks after LV delivery.

Figure 10:
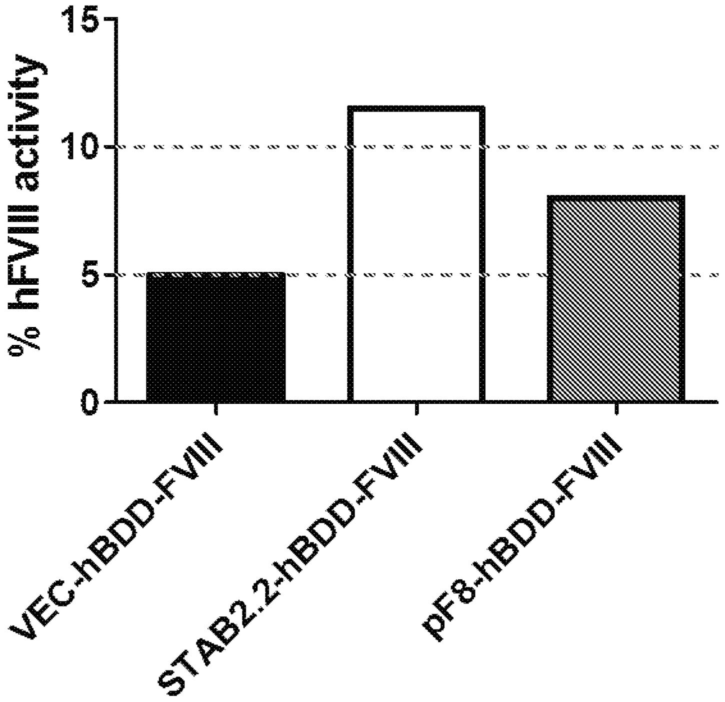
Figure 10:
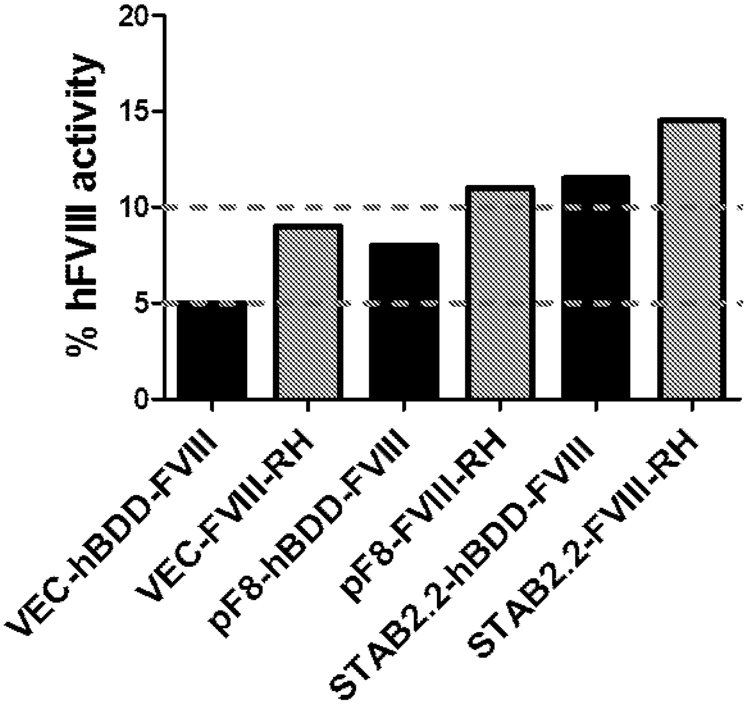

FIG. 10 shows the promoters activity and transgenes expression comparison. Chart showing a comparison of FVIII activity observed in plasma of C57Bl/6 HA mice after delivery of LV containing the VEC, F8 or the Stab2 promoter and hBDD-FVIII (A) or FVIII-RH (B) transgene. Red and blue dashed lines indicate 5% and 10% FVIII activity, respectively.

Figure 11:
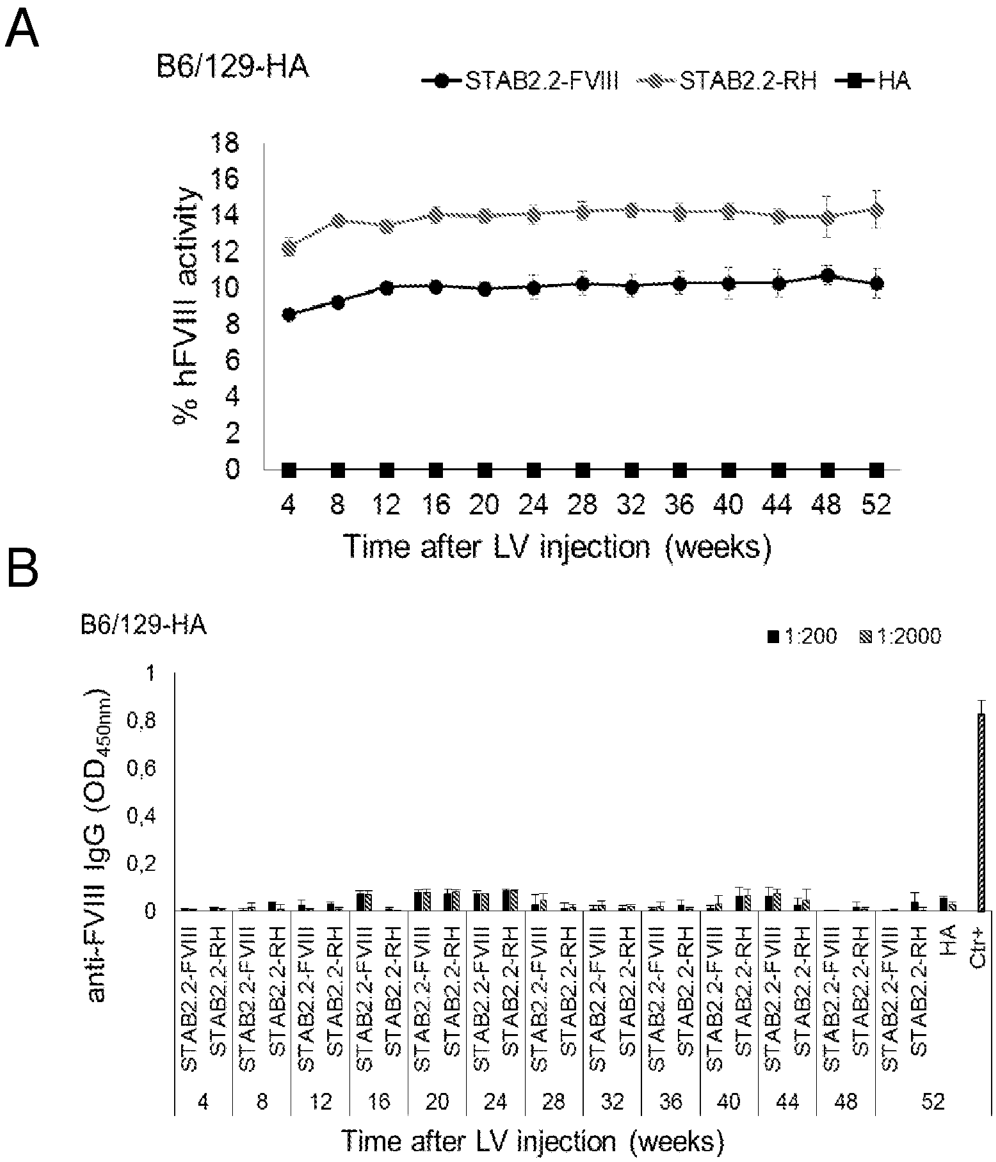

FIG. 11 shows the in vivo FVIII expression after delivery of LV containing Stab2.2 promoter and a more active form of FVIII in B6/129 HA mice. Mice were tail vein injected with $10^9$ TU of LV.Stab2.2-hBDD-FVIII (n=4) or LV.Stab2.2-FVIII-RH (n=4). A) Line chart showing hFVIII activity increase of −55-60% in plasma of mice treated with LV.Stab2.2-FVIII-RH compared to levels in mice treated with LV.Stab2.2-hBDD-FVIII. The activity detected in treated mice is comparable to the activity observed in C57Bl/6 HA mice injected with same LVs (Stab2.2-hBDD-FVIII=10% and Stab2.2-FVIII-RH=14%). B) No anti-FVIII antibodies were detected in plasma of treated mice up to 1 year after LV delivery.

Figure 12:
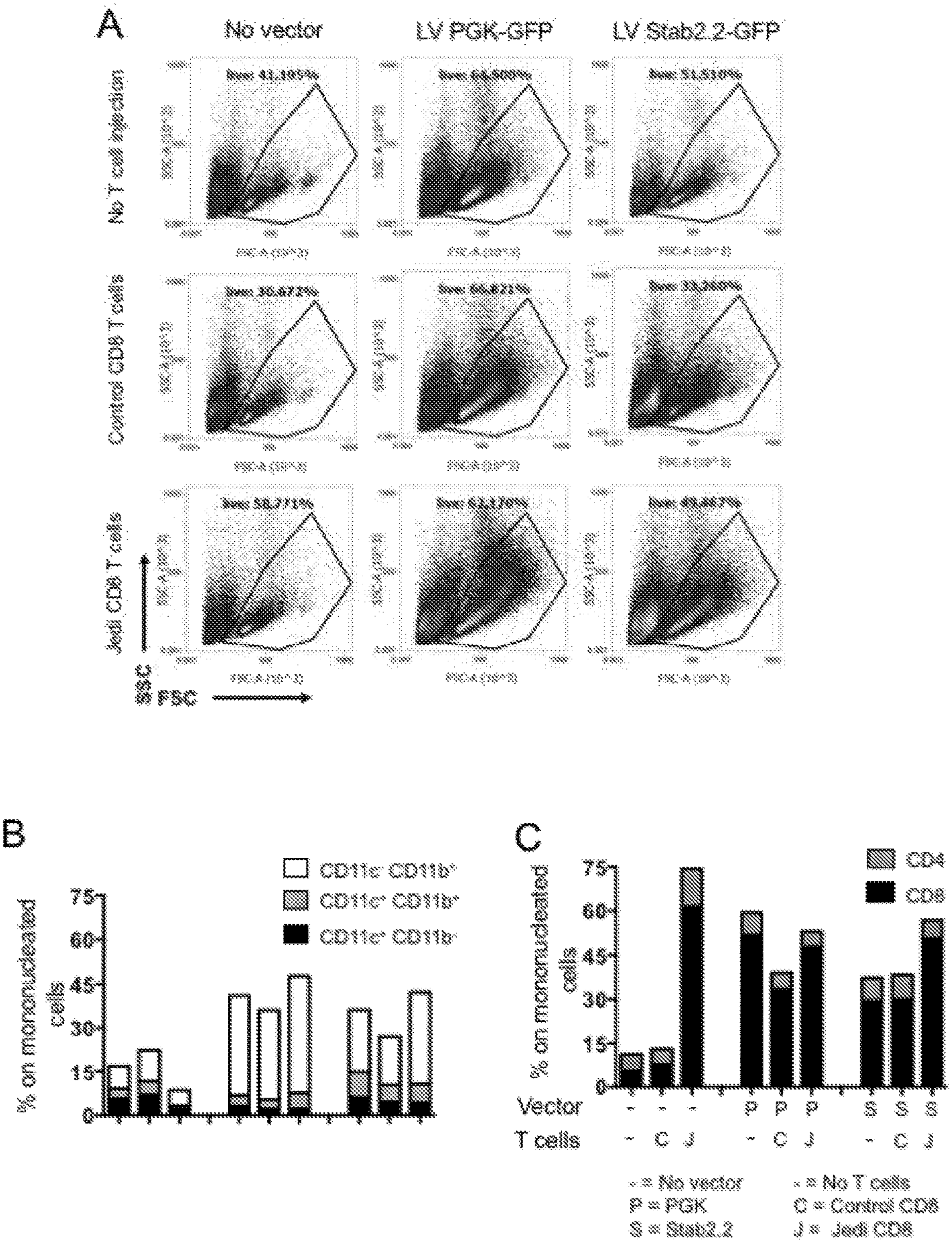

FIG. 12 shows the FACS analysis of hematological liver cells in B10D2×C57BL/6J mice injected with $3\times10^8$ TU of LV.PGK-GFP or $5\times10^8$ TU of LV.Stab2.2-GFP followed by adoptive transfer of $2\times10^6$ Control or Jedi CD8 T cells. A) Representative dot plots of physical parameters of hepatic immuno-hematologic cells. B-C) Stacked bars showing percentages of myeloid, $CD8^+$ and $CD4^+$ T cells in the liver.

Figure 13:
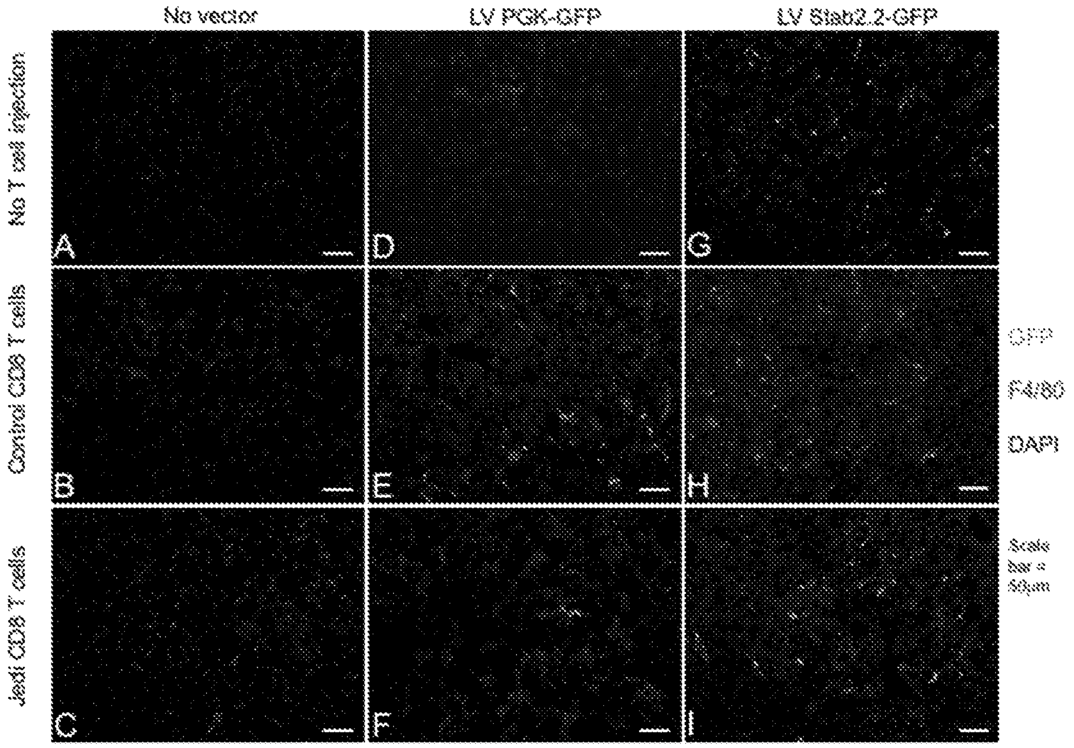

FIG. 13 shows the GFP expression and F4/80 marker by immunofluorescent staining in the liver of mice 11 days after LV.PGK-GFP or LV.Stab2.2-GFP injection and 4 days after Control or Jedi CD8 T cells transfer.

Figure 14:
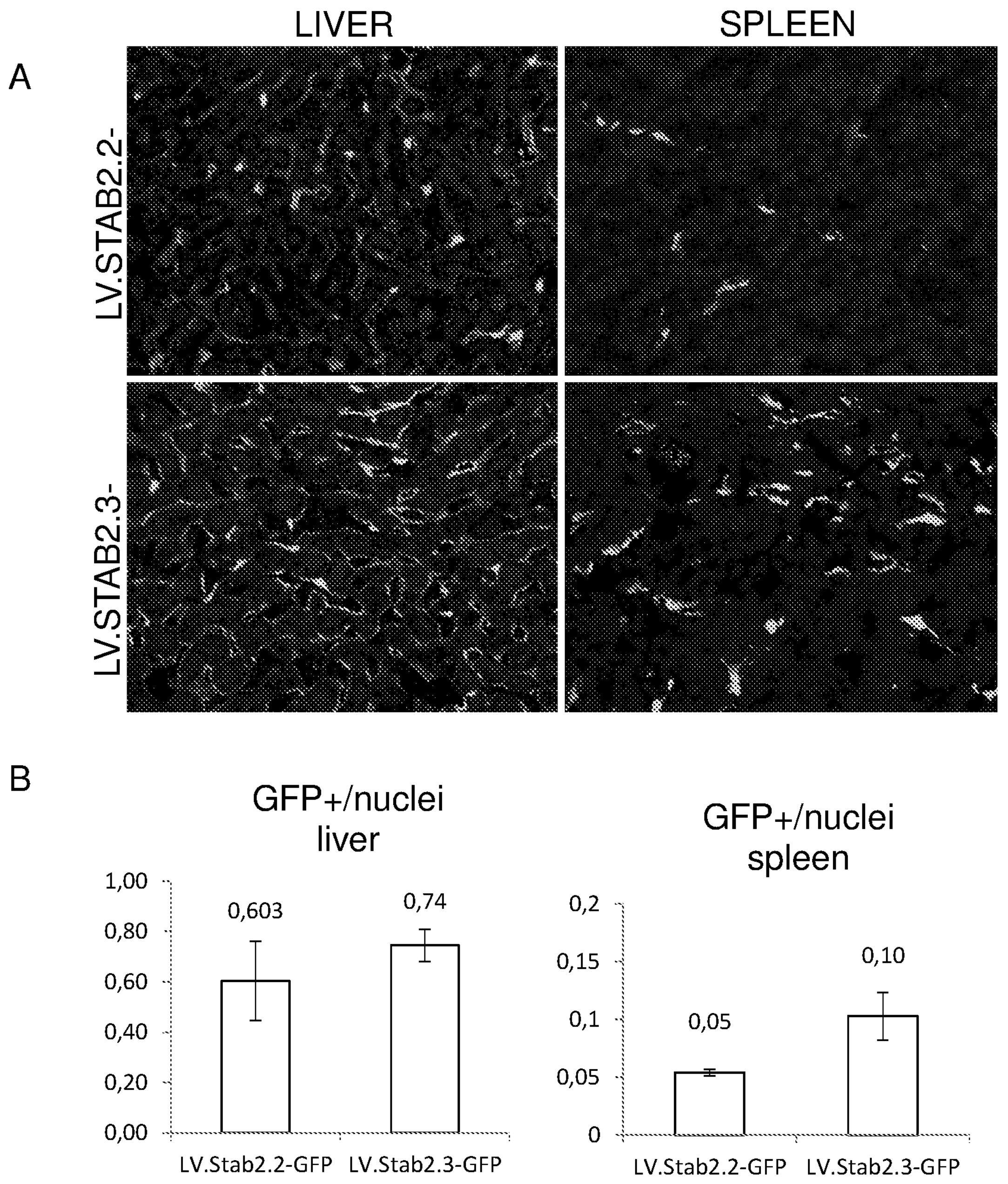

FIG. 14 shows the in vivo characterization of the shortest sequences of the invention. Immunofluorescence on liver and spleen sections (A) from mice injected with the lentiviral construct LV.Stab2.2-GFP (top) and LV.Stab2.3-GFP (bottom). Bars represent the quantification of GFP in organ slices (n=20 fields/sample) expressed as ratio between $GFP^+$ cells and nuclei in a fixed area (B). The results show that transgene expression is exclusively observed in liver sinusoidal endothelial cells with an increase of endothelial GFP+ cells in the spleen of mice injected with the shortest LV.Stab2.3-GFP.

Figure 15:
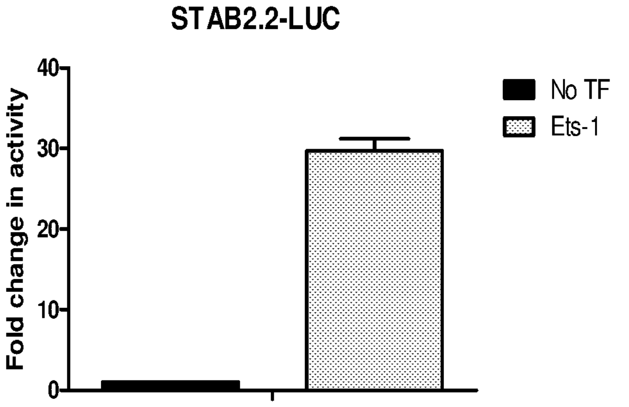
Figure 15:
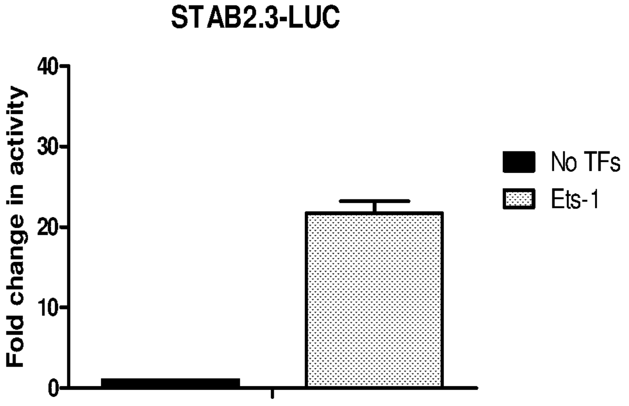

FIG. 15 shows luciferase activity of 293T cells transiently transfected with plasmids expressing a luciferase reporter gene under the control of Stab2.2 (A) or Stab2.3 (B) promoters alone (black bars) or in combination with the Ets-1 endothelial transcription factor (grey bars). As showed, the expression of Ets-1 induced an up-regulation of luciferase activity of both promoters up to 30 times.

DEFINITIONS

In the context of the present invention, "promoter" means a DNA sequence adjacent and typically upstream (5') of the sense strand of the regulated gene, where transcription of a gene by RNA polymerase begins.

In particular, the present invention refers to sequences derived from the Stabilin-2 promoter. Stabilin-2 (Stab-2), also known as hyaluronic acid receptor for endocytosis (HARE), is a type I transmembrane receptor expressed in the sinusoidal endothelial cells of liver, lymph nodes, bone marrow, spleen and in some macrophage subsets. Stab-2 belongs to the class H of scavenger receptors involved in several processes, including endocytosis, cell-cell interactions and apoptotic and necrotic cell clearance and in removal of negatively charged and/or sulfated carbohydrate polymer components of the extracellular matrix from circulation. Park et al. described and characterized the human Stab-2 promoter as a 1500 base pair sequence located on chromosome 12. In particular, by RACE PCR they identified the transcription initiation site located 205 nucleotides upstream the Stab-2 start codon and selected the Stab-2 promoter sequence as the genomic region containing nucleotides −1342 to +205 from the transcription initiation site. Moreover, they showed that NFATc1 regulates the Stab-2 transcription by interacting directly with nucleotides −188 to −183 of Stab-2 promoter sequence. Finally, they studied Stab-2 expression and function during myogenic differentiation and muscle regeneration.

The Stab-2 promoter derived sequences of the present invention are sequences able to drive the expression of transgenes in endothelial cells. Moreover, by using an in silico analysis several endothelial specific transcription factor (TF) binding site such as Ets-1, Ets-2 and PEA3 are identified in the first 333 bp upstream the ATG. Moreover, in the initial 333 bp also several transcription initiation start sites for FOXP3 are present.

The Stab-2 promoter derived sequence of the present invention is preferably selected from: SEQ ID NO: 1, 2 and 3 or any sequences comprising a sequence selected from SEQ ID NO: 1-3 and/or derived from SEQ ID NO: 1-3 and any combination thereof. In particular, SEQ ID NO: 2 corresponds to a sequence derived from the Stab-2 promoter located on Chromosome 12 and spanned between the following genomic coordinates 103,585,300-103,587,476 (of chromosome 12). SEQ ID NO: 1 corresponds to a sequence derived from the Stab-2 promoter located on Chromosome 12 and spanned between the following genomic coordinates 103,586,239-103,587,476 (of chromosome 12). SEQ ID NO: 3 corresponds to a sequence derived from the Stab-2 promoter located on Chromosome 12 and spanned between the following genomic coordinates 103,587,144-103,587,476 (of chromosome 12).

In the context of the present invention, "hemophilia A" means a X-linked genetic disorder caused by missing or defective clotting FVIII.

In the context of the present invention, "further diseases or conditions associated with or related to FVIII gene misexpression" means any disease, such as hemophilia B, that is a X-linked genetic disorder caused by missing or defective clotting FIX.

In the context of the present invention, "gene therapy" means a set of strategies that modify the expression of individual's genes or that correct abnormal genes. Each strategy involves the administration of a specific DNA.

In the context of the present invention, "coagulation cascade" means the sequence of biochemical reactions, involving clotting factors that stop bleeding by forming the fibrin clot.

In the context of the present invention, "liver sinusoidal endothelial cells" are the cells that form a continuous lining of the liver sinusoids, separating parenchymal cells and fat-storing cells from sinusoidal blood.

DETAILED DESCRIPTION OF THE INVENTION

A first aspect of the present invention refers to new polynucleotide sequences derived from Stabilin-2 (Stab-2) promoter and/or combination of sequences including those to be used as promoter (regulative) sequences for inducing/driving/targeting the endothelial specific expression of a therapeutic gene, preferably FVIII and/or its variants (or fragments). Therefore, the polynucleotide sequences of the present invention can be also defined as "endothelial-specific transcriptional promoter sequences", in other words sequences that are able to induce the expression of a gene specifically into endothelial cells.

The Stab-2 promoter derived sequence of the present invention is preferably selected from: SEQ ID NO: 1, 2 and 3, or any sequences comprising SEQ ID NO: 1, 2 or 3, or any derivative/fragments/variants of SEQ ID NO: 1, 2 and 3.

As already specified above, SEQ ID NO: 2 corresponds to a sequence derived from the Stab-2 promoter sequence located on Chromosome 12 and spanned between the following genomic coordinates (Human Genome HG19): 103,585,300-103,587,476 (of chromosome 12). This sequence (SEQ ID NO: 2) is called from now on also long Stab-2 promoter derived sequence or Long sequence and comprises 2177 base pairs upstream stabilin-2 gene CDS (the CDS of Stabilin-2 is well defined sequence such as for example the one having the following Gene ID 55576) of Stab-2 gene as shown in FIGS. 1 and 2.

SEQ ID NO: 1 corresponds to a sequence derived from the Stab-2 promoter sequence located on Chromosome 12 and spanned between the following genomic coordinates 103,586,239-103,587,476 (of chromosome 12). This sequence (SEQ ID NO: 1) is called from now on also short Stab-2 promoter derived sequence or Short sequence. This sequence (SEQ ID NO: 1) is called from now on also short Stab-2 promoter derived sequence or Short sequence and comprises 1238 base pairs upstream stabilin-2 gene CDS of Stab-2 gene as shown in FIGS. 1 and 2.

SEQ ID NO: 3 corresponds to a sequence derived from the Stab-2 promoter sequence located on Chromosome 12 and spanned between the following genomic coordinates 103,587,144-103,587,476 (of chromosome 12). This sequence (SEQ ID NO: 3) is called from now on also shortest Stab-2 promoter derived sequence or Shortest sequence. This sequence (SEQ ID NO: 3) is called from now on also shortest Stab-2 promoter derived sequence or Shortest sequence and comprises 333 base pairs upstream stabilin-2 gene CDS of Stab-2 gene as shown in FIGS. 1 and 2.

FVIII is preferably human B-Domain Deleted (BDD) FVIII, more preferably the human BDD FVIII polynucleotide sequence is selected from: SEQ ID NO: 4 and/or 5 or any sequences comprising SEQ ID NO: 4 and/or 5.

The variants of FVIII are preferably any form of FVIII with increased stability and/or enhanced pro-coagulant activity. Preferably, the FVIII variant is selected from: FVIII-RH and/or FVIII-N6 that are mutated forms of FVIII. In particular, FVIII-RH molecule is characterized by a substitution present in the canine form of FVIII that is more active of the human one. FVIII-N6 is characterized by a longer B domain included in comparison to the classical B domain deleted form used in gene therapy. Preferably, the polynucleotide sequence of FVIII-RH is selected from: SEQ ID NO: 6 and/or 7 or any sequences comprising SEQ ID NO: 6 and/or 7 wherein SEQ ID NO: 7 is a codon-optimized sequence. Preferably, the polynucleotide sequence of FVIII-N6 is SEQ ID NO: 8 or any sequences comprising SEQ ID NO: 8.

All the sequences disclosed in the present invention are listed in Table I and the Stab-2 promoter derived sequences of the invention are outlined in FIGS. 1 and 2. However, any sequence having 80-95% of identity compared to the sequences of the present invention and/or sequences containing a combination of part or all the sequences of the present invention should be considered part of the disclosure. Moreover, the sequences of the disclosure are provided herewith as Sequence Listing.

TABLE I

| | | |
|---|---|---|
| Stab2 promoter derived short sequence (Stab2.2) | CGTTTCCATCATGGTTTCCAATAGAATTGAGAATACCATCT<br>ATTATTTATTTATTCATTAAATATTGATTGTTTCAGCAGCAG<br>AGGGCAGTGGTTGACAGTACTGGCTCTGGAGCCACATAG<br>TTTGAATACTAGATTTACCACCTATTAGCTGTGTGGCCTTG<br>GATAAATTCCTTAACCTCTCTGCCTCAGTTTCCTCCTCTGT<br>AAAATGAGAAGAATCATCCTGTTTTACCAAGTACTGTGAGA<br>ATTAAACAACTAAATCCATGGAGAGGCCTAGAATAGTGAC<br>TAGCATGTAGTAAGTTTTCAAAAAGTGATGGCTACTATCCT<br>TAACTGTTTTCATTATTTTGAAGTGCAGGTCTCTGCTCTAG<br>GAATCAAGGGGTACAGAGAAGATGAGGCTATATTCTTCTG<br>TCCTCAAGGCATTCATAGCTGGGCATGGGAGACAGACAG<br>ATAGATGTGACCTCGGCTTTCATGGCTTTATGTGCAAAATT<br>GTGGGAGCATCTTCAGGGTCCTGTGGAGGGGCAGCACAG<br>GAAGGCTTCCTGGAAGGGGTGGCTTTAGATCTGGAACTTA<br>AAGGGTAAGATTGAACCTACAGGCTCAGTCACTTGTTACT<br>GAAGTGGCATGGAAAAGAAGAAAGAATGAGTCAAAAACCC<br>ACCTGTCAGCATCTGCAAGGAGACTTTTTTTGCAGTAGAG<br>GTTATCCAGGGTGAAGCCACCACCTCCTGCAAGGTTTCTG<br>CAACATTCATTCCATACCTGGGACCGTGCTCACTTATGGG<br>CACTCCCCCAACCCCGCTCGACAGCAAGCTTGGACCTTT<br>GCATTGGCACCAAAAGGCCTGCAGTGTTCCATGGCGTGG<br>TTGTGGAAACATTGACAGGGCCGCAGGGCAGCAGTAGGC<br>AGGACTAGAGGAGGGGGCAGAGTAGAGGAGAGGCAGGA<br>CCGTTCTGAGAGCTTCGCAGGCACAAAAATCCCGGGCCA<br>AGCCTCTGCCTCAGCCCCTGCAGGATATCCTGTCATTCAG<br>CAGGATATATAGACCATTTACAGTGGCCAATTTCACCAAG<br>ACTCCTGGATTTGCCATTTTTCCTTTCTGAAGGCAGGTCTC<br>ACCTATCTCCTGGTTCGATCTAGGAAAAAGGAAAGGAAGG<br>GATTTAAAAGTAAACAGTGAAATGAGAAAGAATTCACTGG<br>GAGTTTATCAAACTAAGTTAAAATAGCTAAGTCAGCCTGAC<br>AGGTGCTTGGCACAGAGAAGGAGCAAATATTTCCTC | SEQ ID NO: 1 |
| Stab2 promoter derived long sequence (Stab2.1) | GTCTAACATGGCATTTCCCTTAGAGACACTGATAGAACAC<br>AGAATCTGGAGGTTGCCAATATAAATTTGCAAAAACAGAA<br>AGCAACCCTTAGTCTAAAAAGCTTGGGAAATGCTGCCTTA<br>AGCAAAGTTGAACTGTTTTTTGTTTCATTTGGTTGCGTTGT<br>TTTAAAGGACTTCTCAGAACTTTCAATGGACTAACAAACAT<br>GGCCAATCCATGAGAAAGGGACATGAGAGACAGGCGTCC<br>CAAATTATCTGGCGAGAGAATTCTTCCCCACTACCCCTAC<br>AGCATTTTCCATAACTAAATTGTATTTAATAAAACATTATTT<br>AGGAAATGCTAGTATGGGCTCATTTTATTATTTCACCTGGA<br>ATTGAGCCTGTTCCAAGCCCCAGATTTTTATCTACATCCTT<br>TAGAAAGAAAAGAATCAGAAAGAAGCATCCAATTTATGTC<br>CCTGTTATATTTTTTAAGGTAACACAGCTGCTGTAACAGAT<br>AAATATCAAAGTCTCACTGGCTTCACACAATCATAATCCAT<br>TTCTCCTCAAGCAACAGTCCAGCGCAAGTGAAATCACCCA<br>GGAAGCTTTGGAAAATTCTCCTGTGCGCCACTCCCAGGCA<br>TTCTGATTTGGTTATTCTGGAGTGGAGCTAAGCATTAGGC<br>CTTTTTTTTTTTTTTTTGAGCTCCCCACCCAGGTTTCTGGG<br>CTGGCCTCTGAGGGGCCTATGTTGGAAAAGTTTCCTAGAT<br>TATCGGTCATTATAAATGTTGTTTCAAAAGTTGAAAGGAGT<br>CGGGGGGAGAGAGAGAGAGAGAGAGAGAGAAACTTTGTAGA<br>GAAATAAAGGATCATTTAACCAAAATTAGTATCTGTAAGTG<br>CATGAATCTCCCATTTAATTTAGTGTCATGAGACATGCCCT<br>GGTTTGTTAATAAGTCCAAACCTTATCCTTCCTGGTGCTG<br>GGTCTGACACGTTTCCATCATGGTTTCCAATAGAATTGAG<br>AATACCATCTATTATTTATTTATTCATTAAATATTGATTGTTT<br>CAGCAGCAGAGGGCAGTGGTTGACAGTACTGGCTCTGGA<br>GCCACATAGTTTGAATACTAGATTTACCACCTATTAGCTGT<br>GTGGCCTTGGATAAATTCCTTAACCTCTCTGCCTCAGTTTC<br>CTCCTCTGTAAAATGAGAAGAATCATCCTGTTTTACCAAGT<br>ACTGTGAGAATTAAACAACTAAATCCATGGAGAGGCCTAG<br>AATAGTGACTAGCATGTAGTAAGTTTTCAAAAAGTGATGG<br>CTACTATCCTTAACTGTTTTCATTATTTTGAAGTGCAGGTC<br>TCTGCTCTAGGAATCAAGGGGTACAGAGAAGATGAGGCT<br>ATATTCTTCTGTCCTCAAGGCATTCATAGCTGGGCATGGG<br>AGACAGACAGATAGATGTGACCTCGGCTTTCATGGCTTTA<br>TGTGCAAAATTGTGGGAGCATCTTCAGGGTCCTGTGGAG<br>GGGCAGCACAGGAAGGCTTCCTGGAAGGGGTGGCTTTAG<br>ATCTGGAACTTAAAGGGTAAGATTGAACCTACAGGCTCAG<br>TCACTTGTTACTGAAGTGGCATGGAAAAGAAGAAAGAATG<br>AGTCAAAAACCCACCTGTCAGCATCTGCAAGGAGACTTTT<br>TTTGCAGTAGAGGTTATCCAGGGTGAAGCCACCACCTCCT<br>GCAAGGTTTCTGCAACATTCATTCCATACCTGGGACCGTG<br>CTCACTTATGGGCACTCCCCCAACCCCGCTCGACAGCAA<br>GCTTGGACCTTTGCATTGGCACCAAAAGGCCTGCAGTGTT<br>CCATGGCGTGGTTGTGGAAACATTGACAGGGCCGCAGGG<br>CAGCAGTAGGCAGGACTAGAGGAGGGGGCAGAGTAGAG<br>GAGAGGCAGGACCGTTCTGAGAGCTTCGCAGGCACAAAA<br>ATCCCGGGCCAAGCCTCTGCCTCAGCCCCTGCAGGATAT | SEQ ID NO: 2 |

TABLE I-continued

| | | |
|---|---|---|
| | CCTGTCATTCAGCAGGATATATAGACCATTTACAGTGGCC<br>AATTTCACCAAGACTCCTGGATTTGCCATTTTTCCTTTCTG<br>AAGGCAGGTCTCACCTATCTCCTGGTTCGATCTAGGAAAA<br>AGGAAAGGAAGGGATTTAAAAGTAAACAGTGAAATGAGAA<br>AGAATTCACTGGGAGTTTATCAAACTAAGTTAAAATAGCTA<br>AGTCAGCCTGACAGGTGCTTGGCACAGAGAAGGAGCAAA<br>TATTTCCTC | |
| Stab2 promoter derived shortest Sequence (Stab2.3) | TAGAGGAGAGGCAGGACCGTTCTGAGAGCTTCGCAGGCA<br>CAAAAATCCCGGGCCAAGCCTCTGCCTCAGCCCCTGCAG<br>GATATCCTGTCATTCAGCAGGATATATAGACCATTTACAGT<br>GGCCAATTTCACCAAGACTCCTGGATTTGCCATTTTTCCTT<br>TCTGAAGGCAGGTCTCACCTATCTCCTGGTTCGATCTAGG<br>AAAAAGGAAAGGAAGGGATTTAAAAGTAAACAGTGAAATG<br>AGAAAGAATTCACTGGGAGTTTATCAAACTAAGTTAAAATA<br>GCTAAGTCAGCCTGACAGGTGCTTGGCACAGAGAAGGAG<br>CAAATATTTCCTC | SEQ ID NO: 3 |
| hBDD-FVIII | atgcaaatagagctctccacctgcttctttctgtgccttttgcgattctgctttagtgccacc<br>agaagatactacctgggtgcagtggaactgtcatgggactatatgcaaagtgatctcg<br>gtgagctgcctgtggacgcaagatttcctcctagagtgccaaaatcttttccattcaaca<br>cctcagtcgtgtacaaaaagactctgtttgtagaattcacggatcaccttttcaacatcg<br>ctaagccaaggccaccctggatgggtctgctaggtcctaccatccaggctgaggtttat<br>gatacagtggtcattacacttaagaacatggcttcccatcctgtcagtcttcatgctgttg<br>gtgtatcctactggaaagcttctgagggagctgaatatgatgatcagaccagtcaaag<br>ggagaaagaagatgataaagtcttccctggtggaagccatacatatgtctggcaggt<br>cctgaaagagaatggtccaatggcctctgacccactgtgccttacctactcatatctttct<br>catgtggacctggtaaaagacttgaattcaggcctcattggagccctactagtatgtag<br>agaagggagtctggccaaggaaaagacacagaccttgcacaaatttatactacttttt<br>gctgtatttgatgaagggaaaagttggcactcagaaacaaagaactccttgatgcag<br>gatagggatgctgcatctgctcgggcctggcctaaaatgcacacagtcaatggttatgt<br>aaacaggtctctgccaggtctgattggatgccacaggaaatcagtctattggcatgtga<br>ttggaatgggcaccactcctgaagtgcactcaatattcctcgaaggtcacacatttcttg<br>tgaggaaccatcgccaggcgtccttggaaatctcgccaataactttccttactgctcaa<br>acactcttgatggaccttggacagtttctactgttttgtcatatctcttcccaccaacatgat<br>ggcatggaagcttatgtcaaagtagacagctgtccagaggaaccccaactacgaat<br>gaaaaataatgaagaagcggaagactatgatgatgatcttactgattctgaaatggat<br>gtggtcaggtttgatgatgacaactctccttcctttatccaaattcgctcagttgccaaga<br>agcatcctaaaacttgggtacattacattgctgctgaagaggaggactgggactatgc<br>tcccttagtcctcgcccccgatgacagaagttataaaagtcaatatttgaacaatggcc<br>ctcagcggattggtaggaagtacaaaaaagtccgatttatggcatacacagatgaaa<br>cctttaagactcgtgaagctattcagcatgaatcaggaatcttgggacctttactttatgg<br>ggaagttggagacacactgttgattatatttaagaatcaagcaagcagaccatataac<br>atctaccctcacggaatcactgatgtccgtcctttgtattcaaggagattaccaaaaggt<br>gtaaaacatttgaaggattttccaattctgccaggagaaatattcaaatataaatggac<br>agtgactgtagaagatgggccaactaaatcagatcctcggtgcctgacccgctattac<br>tctagtttcgttaatatggagagagatctagcttcaggactcattggccctctcctcatctg<br>ctacaaagaatctgtagatcaaagaggaaaccagataatgtcagacaagaggaat<br>gtcatcctgttttctgtatttgatgagaaccgaagctggtacctcacagagaatataca a<br>cgctttctccccaatccagctggagtgcagcttgaggatccagagttccaagcctcca<br>acatcatgcacagcatcaatggctatgtttttgatagtttgcagttgtcagtttgtttgcatg<br>aggtggcatactggtacattctaagcattggagcacagactgacttcctttctgtcttcttc<br>tctggatataccttcaaacacaaaatggtctatgaagacacactcaccctattcccattc<br>tcaggagaaactgtcttcatgtcgatggaaaacccaggtctatggattctggggtgcca<br>caactcagactttcggaacagaggcatgaccgccttactgaaggtttctagttgtgaca<br>agaacactggtgattattacgaggacagttatgaagatatttcagcatacttgctgagta<br>aaaacaatgccattgaaccaagaagcttctcccaaaacccaccagtcttgaaacgc<br>catcaacgggaaataactcgtactactcttcagtcagatcaagaggaaattgactatg<br>atgataccatatcagttgaaatgaagaaggaagattttgacatttatgatgaggatgaa<br>aatcagagcccccgcagctttcaaaagaaaacacgacactattttattgctgcagtgg<br>agaggctctgggattatgggatgagtagctccccacatgttctaagaaacagggctca<br>gagtggcagtgtccctcagttcaagaaagttgttttccaggaatttactgatggctccttta<br>ctcagcccttataccgtggagaactaaatgaacatttgggactcctggggccatatata<br>agagcagaagttgaagataatatcatggtaactttcagaaatcaggcctctcgtcccta<br>ttccttctattctagccttatttcttatgaggaagatcagaggcaaggagcagaacctag<br>aaaaaactttgtcaagcctaatgaaaccaaaacttacttttggaaagtgcaacatcat<br>atggcacccactaaagatgagtttgactgcaaagcctgggcttatttctctgatgttgac<br>ctggaaaaagatgtgcactcaggcctgattggaccccttctggtctgccacactaaca<br>cactgaaccctgctcatgggagacaagtgacagtacaggaatttgctctgtttttcacc<br>atctttgatgagaccaaaagctggtacttcactgaaaatatggaaagaaactgcagg<br>gctccctgcaatatccagatggaagatcccacttttaaagagaattatcgcttccatgc<br>aatcaatggctacataatggatacactacctggcttagtaatggctcaggatcaaagg<br>attcgatggtatctgctcagcatgggcagcaatgaaaacatccattctattcatttcagtg<br>gacatgtgttcaccgtacgaaaaaaagaggagtataaaatggcactgtacaatctct<br>atccaggtgtttttgagacagtggaaatgttaccatccaaagctggaatttggcgggtg<br>gaatgccttattggcgagcatctacatgctgggatgagcacactttttctggtgtacagc<br>aataagtgtcagactccccctgggaatggcttctggacacattagagattttcagattaca<br>gcttcaggacaatatggacagtgggccccaaagctggccagacttcattattccggat<br>caatcaatgcctggagcaccaaggagcccttttcttggatcaaggtggatctgttggca<br>ccaatgattattcacggcatcaagacccagggtgcccgtcagaagttctccagcctct | SEQ ID NO: 4 |

TABLE I-continued

| | | |
|---|---|---|
| | acatctctcagtttatcatcatgtatagtcttgatgggaagaagtggcagacttatcgag<br>gaaattccactggaaccttaatggtcttctttggcaatgtggattcatctgggataaaac<br>acaatatttttaaccctccaattattgctcgatacatccgtttgcacccaactcattatagc<br>attcgcagcactcttcgcatggagttgatgggctgtgatttaaatagttgcagcatgccat<br>tgggaatggagagtaaagcaatatcagatgcacagattactgcttcatcctactttacc<br>aatatgtttgccacctggtctccttcaaaagctcgacttcacctccaagggaggagtaa<br>tgcctggagacctcaggtgaataatccaaaagagtggctgcaagtggacttccagaa<br>gacaatgaaagtcacaggagtaactactcagggagtaaaatctctgcttaccagcat<br>gtatgtgaaggagttcctcatctccagcagtcaagatggccatcagtggactctctttttt<br>cagaatggcaaagtaaaggtttttcagggaaatcaagactccttcacacctgtggtga<br>actctctagacccaccgttactgactcgctaccttcgaattcacccccagagttgggtgc<br>accagattgccctgaggatggaggttctgggctgcgaggcacaggacctctactga | |
| hBDD-FVIII CO | ATGCAGATCGAGCTGTCCACCTGCTTTTTCTGTGCCTGC<br>TGCGGTTCTGCTTCAGCGCCACCCGGCGGTACTACCTGG<br>GCGCCGTGGAGCTGTCCTGGGACTACATGCAGAGCGACC<br>TGGGCGAGCTGCCCGTGGACGCCCGGTTCCCCCCCAGA<br>GTGCCCAAGAGCTTCCCCTTCAACACCAGCGTGGTGTAC<br>AAGAAAACCCTGTTCGTGGAGTTCACCGACCACCTGTTCA<br>ATATCGCCAAGCCCAGGCCCCCCTGGATGGGCCTGCTGG<br>GCCCCACCATCCAGGCCGAGGTGTACGACACCGTGGTGA<br>TCACCCTGAAGAACATGGCCAGCCACCCCGTGAGCCTGC<br>ACGCCGTGGGCGTGAGCTACTGGAAGGCCAGCGAGGGC<br>GCCGAGTACGACGACCAGACCAGCCAGCGGGAGAAAGA<br>AGATGACAAGGTGTTCCCTGGCGGCAGCCACACCTACGT<br>GTGGCAGGTGCTGAAAGAAAACGGCCCCATGGCCTCCGA<br>CCCCCTGTGCCTGACCTACAGCTACCTGAGCCACGTGGA<br>CCTGGTGAAGGACCTGAACAGCGGCCTGATCGGCGCTCT<br>GCTCGTCTGCCGGGAGGGCAGCCTGGCCAAAGAGAAAAC<br>CCAGACCCTGCACAAGTTCATCCTGCTGTTCGCCGTGTTC<br>GACGAGGGCAAGAGCTGGCACAGCGAGACAAAGAACAG<br>CCTGATGCAGGACCGGGACGCCGCCTCTGCCAGAGCCT<br>GGCCCAAGATGCACACCGTGAACGGCTACGTGAACAGAA<br>GCCTGCCCGGCCTGATTGGCTGCCACCGGAAGAGCGTGT<br>ACTGGCACGTGATCGGCATGGGCACCACACCCGAGGTGC<br>ACAGCATCTTTCTGGAAGGGCACACCTTTCTGGTCCGGAA<br>CCACCGGCAGGCCAGCCTGGAAATCAGCCCTATCACCTT<br>CCTGACCGCCCAGACACTGCTGATGGACCTGGGCCAGTT<br>CCTGCTGTTTTGCCACATCAGCTCTCACCAGCACGACGGC<br>ATGGAAGCCTACGTGAAGGTGGACTCTTGCCCCGAGGAA<br>CCCCAGCTGCGGATGAAGAACAACGAGGAAGCCGAGGAC<br>TACGACGACGACCTGACCGACAGCGAGATGGACGTGGTG<br>CGGTTCGACGACGACAACAGCCCCAGCTTCATCCAGATC<br>AGAAGCGTGGCCAAGAAGCACCCCAAGACCTGGGTGCAC<br>TATATCGCCGCCGAGGAAGAGGACTGGGACTACGCCCCC<br>CTGGTGCTGGCCCCCGACGACAGAAGCTACAAGAGCCAG<br>TACCTGAACAATGGCCCCCAGCGGATCGGCCGGAAGTAC<br>AAGAAAGTGCGGTTCATGGCCTACACCGACGAGACATTCA<br>AGACCCGGGAGGCCATCCAGCACGAGAGCGGCATCCTG<br>GGCCCCCTGCTGTACGGCGAAGTGGGCGACACACTGCTG<br>ATCATCTTCAAGAACCAGGCTAGCCGGCCCTACAACATCT<br>ACCCCCACGGCATCACCGACGTGCGGCCCCTGTACAGCA<br>GGCGGCTGCCCAAGGGCGTGAAGCACCTGAAGGACTTCC<br>CCATCCTGCCCGGCGAGATCTTCAAGTACAAGTGGACCG<br>TGACCGTGGAGGACGGCCCCACCAAGAGCGACCCCAGAT<br>GCCTGACCCGGTACTACAGCAGCTTCGTGAACATGGAAC<br>GGGACCTGGCCTCCGGGCTGATCGGACCTCTGCTGATCT<br>GCTACAAAGAAAGCGTGGACCAGCGGGGCAACCAGATCA<br>TGAGCGACAAGCGGAACGTGATCCTGTTCAGCGTGTTCG<br>ATGAGAACCGGTCCTGGTATCTGACCGAGAACATCCAGC<br>GGTTTCTGCCCAACCCTGCCGGCGTGCAGCTGGAAGATC<br>CCGAGTTCCAGGCCAGCAACATCATGCACTCCATCAATGG<br>CTACGTGTTCGACTCTCTGCAGCTCTCCGTGTGTCTGCAC<br>GAGGTGGCCTACTGGTACATCCTGAGCATCGGCGCCCAG<br>ACCGACTTCCTGAGCGTGTTCTTCAGCGGCTACACCTTCA<br>AGCACAAGATGGTGTACGAGGACACCCTGACCCTGTTCC<br>CTTTCAGCGGCGAGACAGTGTTCATGAGCATGGAAAACC<br>CCGGCCTGTGGATTCTGGGCTGCCACAACAGCGACTTCC<br>GGAACCGGGGCATGACCGCCCTGCTGAAGGTGTCCAGCT<br>GCGACAAGAACACCGGCGACTACTACGAGGACAGCTACG<br>AGGATATCAGCGCCTACCTGCTGTCCAAGAACAACGCCAT<br>CGAACCCCGGAGCTTCAGCCAGAACCCCCCCGTGCTGAC<br>GCGTCACCAGCGGGAGATCACCCGGACAACCCTGCAGTC<br>CGACCAGGAAGAGATCGATTACGACGACACCATCAGCGT<br>GGAGATGAAGAAAGAGGATTTCGATATCTACGACGAGGA<br>CGAGAACCAGAGCCCCAGAAGCTTCCAGAAGAAAACCCG<br>GCACTACTTCATTGCCGCCGTGGAGAGGCTGTGGGACTA<br>CGGCATGAGTTCTAGCCCCCACGTGCTGCGGAACCGGGC<br>CCAGAGCGGCAGCGTGCCCCAGTTCAAGAAAGTGGTGTT<br>CCAGGAATTCACAGACGGCAGCTTCACCCAGCCTCTGTAT | SEQ ID NO: 5 |

TABLE I-continued

| | | |
|---|---|---|
| | AGAGGCGAGCTGAACGAGCACCTGGGGCTGCTGGGGCC<br>CTACATCAGGGCCGAAGTGGAGGACAACATCATGGTGAC<br>CTTCCGGAATCAGGCCAGCAGACCCTACTCCTTCTACAGC<br>AGCCTGATCAGCTACGAAGAGGACCAGCGGCAGGGCGC<br>CGAACCCCGGAAGAACTTCGTGAAGCCCAACGAAACCAA<br>GACCTACTTCTGGAAAGTGCAGCACCACATGGCCCCCAC<br>CAAGGACGAGTTCGACTGCAAGGCCTGGGCCTACTTCAG<br>CGACGTGGATCTGGAAAAGGACGTGCACTCTGGACTGAT<br>TGGCCCACTCCTGGTCTGCCACACTAACACCCTCAACCCC<br>GCCCACGGCCGCCAGGTGACCGTGCAGGAATTCGCCCT<br>GTTCTTCACCATCTTCGACGAGACAAAGTCCTGGTACTTC<br>ACCGAGAATATGGAACGGAACTGCAGAGCCCCCTGCAAC<br>ATCCAGATGGAAGATCCTACCTTCAAAGAGAACTACCGGT<br>TCCACGCCATCAACGGCTACATCATGGACACCCTGCCTG<br>GCCTGGTGATGGCCCAGGACCAGAGAATCCGGTGGTATC<br>TGCTGTCCATGGGCAGCAACGAGAATATCCACAGCATCCA<br>CTTCAGCGGCCACGTGTTCACCGTGCGGAAGAAAGAAGA<br>GTACAAGATGGCCCTGTACAACCTGTACCCCGGCGTGTT<br>CGAGACAGTGGAGATGCTGCCCAGCAAGGCCGGCATCTG<br>GCGGGTGGAGTGTCTGATCGGCGAGCACCTGCACGCTG<br>GCATGAGCACCCTGTTTCTGGTGTACAGCAACAAGTGCCA<br>GACCCCACTGGGCATGGCCTCTGGCCACATCCGGGACTT<br>CCAGATCACCGCCTCCGGCCAGTACGGCCAGTGGGCCC<br>CCAAGCTGGCCAGACTGCACTACAGCGGCAGCATCAACG<br>CCTGGTCCACCAAAGAGCCCTTCAGCTGGATCAAGGTGG<br>ACCTGCTGGCCCCTATGATCATCCACGGCATTAAGACCCA<br>GGGCGCCAGGCAGAAGTTCAGCAGCCTGTACATCAGCCA<br>GTTCATCATCATGTACAGCCTGGACGGCAAGAAGTGGCA<br>GACCTACCGGGGCAACAGCACCGGCACCCTGATGGTGTT<br>CTTCGGCAATGTGGACAGCAGCGGCATCAAGCACAACAT<br>CTTCAACCCCCCCATCATTGCCCGGTACATCCGGCTGCAC<br>CCCACCCACTACAGCATTAGATCCACACTGAGAATGGAAC<br>TGATGGGCTGCGACCTGAACTCCTGCAGCATGCCTCTGG<br>GCATGGAAAGCAAGGCCATCAGCGACGCCCAGATCACAG<br>CCAGCAGCTACTTCACCAACATGTTCGCCACCTGGTCCCC<br>CTCCAAGGCCAGGCTGCACCTGCAGGGCCGGTCCAACG<br>CCTGGCGGCCTCAGGTCAACAACCCCAAAGAATGGCTGC<br>AGGTGGACTTTCAGAAAACCATGAAGGTGACCGGCGTGA<br>CCACCCAGGGCGTGAAAAGCCTGCTGACCAGCATGTACG<br>TGAAAGAGTTTCTGATCAGCAGCTCTCAGGATGGCCACCA<br>GTGGACCCTGTTCTTTCAGAACGGCAAGGTGAAAGTGTTC<br>CAGGGCAACCAGGACTCCTTCACCCCCGTGGTGAACTCC<br>CTGGACCCCCCCCTGCTGACCCGCTACCTGAGAATCCAC<br>CCCCAGTCTTGGGTGCACCAGATCGCCCTCAGGATGGAA<br>GTCCTGGGATGTGAGGCCCAGGATCTGTACTGATGA | |
| FVIII-RH | ATGCAAATAGAGCTCTCCACCTGCTTCTTTCTGTGCCTTTT<br>GCGATTCTGCTTTAGTGCCACCAGAAGATACTACCTGGGT<br>GCAGTGGAACTGTCATGGGACTATATGCAAAGTGATCTCG<br>GTGAGCTGCCTGTGGACGCAAGATTTCCTCCTAGAGTGC<br>CAAAATCTTTTCCATTCAACACCTCAGTCGTGTACAAAAAG<br>ACTCTGTTTGTAGAATTCACGGATCACCTTTTCAACATCGC<br>TAAGCCAAGGCCACCCTGGATGGGTCTGCTAGGTCCTAC<br>CATCCAGGCTGAGGTTTATGATACAGTGGTCATTACACTT<br>AAGAACATGGCTTCCCATCCTGTCAGTCTTCATGCTGTTG<br>GTGTATCCTACTGGAAAGCTTCTGAGGGAGCTGAATATGA<br>TGATCAGACCAGTCAAAGGGAGAAAGAAGATGATAAAGTC<br>TTCCCTGGTGGAAGCCATACATATGTCTGGCAGGTCCTGA<br>AAGAGAATGGTCCAATGGCCTCTGACCCACTGTGCCTTAC<br>CTACTCATATCTTTCTCATGTGGACCTGGTAAAAGACTTGA<br>ATTCAGGCCTCATTGGAGCCCTACTAGTATGTAGAGAAGG<br>GAGTCTGGCCAAGGAAAAGACACAGACCTTGCACAAATTT<br>ATACTACTTTTTGCTGTATTTGATGAAGGGAAAAGTTGGCA<br>CTCAGAAACAAAGAACTCCTTGATGCAGGATAGGGATGCT<br>GCATCTGCTCGGGCCTGGCCTAAAATGCACACAGTCAAT<br>GGTTATGTAAACAGGTCTCTGCCAGGTCTGATTGGATGCC<br>ACAGGAAATCAGTCTATTGGCATGTGATTGGAATGGGCAC<br>CACTCCTGAAGTGCACTCAATATTCCTCGAAGGTCACACA<br>TTTCTTGTGAGGAACCATCGCCAGGCGTCCTTGGAAATCT<br>CGCCAATAACTTTCCTTACTGCTCAAACACTCTTGATGGAC<br>CTTGGACAGTTTCTACTGTTTTGTCATATCTCTTCCCACCA<br>ACATGATGGCATGGAAGCTTATGTCAAAGTAGACAGCTGT<br>CCAGAGGAACCCCAACTACGAATGAAAAATAATGAAGAAG<br>CGGAAGACTATGATGATGATCTTACTGATTCTGAAATGGA<br>TGTGGTCAGGTTTGATGATGACAACTCTCCTTCCTTTATCC<br>AAATTCGCTCAGTTGCCAAGAAGCATCCTAAAACTTGGGT<br>ACATTACATTGCTGCTGAAGAGGAGGACTGGGACTATGCT<br>CCCTTAGTCCTCGCCCCCGATGACAGAAGTTATAAAAGTC<br>AATATTTGAACAATGGCCCTCAGCGGATTGGTAGGAAGTA<br>CAAAAAAGTCCGATTTATGGCATACACAGATGAAACCTTTA | SEQ ID NO: 6 |

TABLE I-continued

| | | |
|---|---|---|
| | AGACTCGTGAAGCTATTCAGCATGAATCAGGAATCTTGGG | |
| | ACCTTTACTTTATGGGGAAGTTGGAGACACACTGTTGATT | |
| | ATATTTAAGAATCAAGCAAGCAGACCATATAACATCTACCC | |
| | TCACGGAATCACTGATGTCCGTCCTTTGTATTCAAGGAGA | |
| | TTACCAAAAGGTGTAAAACATTTGAAGGATTTTCCAATTCT | |
| | GCCAGGAGAAATATTCAAATATAAATGGACAGTGACTGTA | |
| | GAAGATGGGCCAACTAAATCAGATCCTCGGTGCCTGACC | |
| | CGCTATTACTCTAGTTTCGTTAATATGGAGAGAGATCTAGC | |
| | TTCAGGACTCATTGGCCCTCTCCTCATCTGCTACAAAGAA | |
| | TCTGTAGATCAAAGAGGAAACCAGATAATGTCAGACAAGA | |
| | GGAATGTCATCCTGTTTTCTGTATTTGATGAGAACCGAAG | |
| | CTGGTACCTCACAGAGAATATACAACGCTTTCTCCCCAAT | |
| | CCAGCTGGAGTGCAGCTTGAGGATCCAGAGTTCCAAGCC | |
| | TCCAACATCATGCACAGCATCAATGGCTATGTTTTTGATAG | |
| | TTTGCAGTTGTCAGTTTGTTTGCATGAGGTGGCATACTGG | |
| | TACATTCTAAGCATTGGAGCACAGACTGACTTCCTTTCTGT | |
| | CTTCTTCTCTGGATATACCTTCAAACACAAAATGGTCTATG | |
| | AAGACACACTCACCCTATTCCCATTCTCAGGAGAAACTGT | |
| | CTTCATGTCGATGGAAAACCCAGGTCTATGGATTCTGGGG | |
| | TGCCACAACTCAGACTTTCGGAACAGAGGCATGACCGCC | |
| | TTACTGAAGGTTTCTAGTTGTGACAAGAACACTGGTGATTA | |
| | TTACGAGGACAGTTATGAAGATATTTCAGCATACTTGCTGA | |
| | GTAAAAACAATGCCATTGAACCAAGAAGCTTCTCCCAAAA | |
| | CCCACCAGTCTTGAAACACCATCAACGGGAAATAACTCGT | |
| | ACTACTCTTCAGTCAGATCAAGAGGAAATTGACTATGATG | |
| | ATACCATATCAGTTGAAATGAAGAAGGAAGATTTTGACATT | |
| | TATGATGAGGATGAAAATCAGAGCCCCCGCAGCTTTCAAA | |
| | AGAAAACACGACACTATTTTATTGCTGCAGTGGAGAGGCT | |
| | CTGGGATTATGGGATGAGTAGCTCCCCACATGTTCTAAGA | |
| | AACAGGGCTCAGAGTGGCAGTGTCCCTCAGTTCAAGAAA | |
| | GTTGTTTTCCAGGAATTTACTGATGGCTCCTTTACTCAGCC | |
| | CTTATACCGTGGAGAACTAAATGAACATTTGGGACTCCTG | |
| | GGGCCATATATAAGAGCAGAAGTTGAAGATAATATCATGG | |
| | TAACTTTCAGAAATCAGGCCTCTCGTCCCTATTCCTTCTAT | |
| | TCTAGCCTTATTTCTTATGAGGAAGATCAGAGGCAAGGAG | |
| | CAGAACCTAGAAAAAACTTTGTCAAGCCTAATGAAACCAA | |
| | AACTTACTTTTGGAAAGTGCAACATCATATGGCACCCACTA | |
| | AAGATGAGTTTGACTGCAAAGCCTGGGCTTATTTCTCTGA | |
| | TGTTGACCTGGAAAAAGATGTGCACTCAGGCCTGATTGGA | |
| | CCCCTTCTGGTCTGCCACACTAACACACTGAACCCTGCTC | |
| | ATGGGAGACAAGTGACAGTACAGGAATTTGCTCTGTTTTT | |
| | CACCATCTTTGATGAGACCAAAAGCTGGTACTTCACTGAA | |
| | AATATGGAAAGAAACTGCAGGGCTCCCTGCAATATCCAGA | |
| | TGGAAGATCCCACTTTTAAAGAGAATTATCGCTTCCATGCA | |
| | ATCAATGGCTACATAATGGATACACTACCTGGCTTAGTAAT | |
| | GGCTCAGGATCAAAGGATTCGATGGTATCTGCTCAGCATG | |
| | GGCAGCAATGAAAACATCCATTCTATTCATTTCAGTGGAC | |
| | ATGTGTTCACCGTACGAAAAAAAGAGGAGTATAAAATGGC | |
| | ACTGTACAATCTCTATCCAGGTGTTTTTGAGACAGTGGAA | |
| | ATGTTACCATCCAAAGCTGGAATTTGGCGGGTGGAATGCC | |
| | TTATTGGCGAGCATCTACATGCTGGGATGAGCACACTTTT | |
| | TCTGGTGTACAGCAATAAGTGTCAGACTCCCCTGGGAATG | |
| | GCTTCTGGACACATTAGAGATTTTCAGATTACAGCTTCAG | |
| | GACAATATGGACAGTGGGCCCCAAAGCTGGCCAGACTTC | |
| | ATTATTCCGGATCAATCAATGCCTGGAGCACCAAGGAGCC | |
| | CTTTTCTTGGATCAAGGTGGATCTGTTGGCACCAATGATT | |
| | ATTCACGGCATCAAGACCCAGGGTGCCCGTCAGAAGTTC | |
| | TCCAGCCTCTACATCTCTCAGTTTATCATCATGTATAGTCT | |
| | TGATGGGAAGAAGTGGCAGACTTATCGAGGAAATTCCACT | |
| | GGAACCTTAATGGTCTTCTTTGGCAATGTGGATTCATCTG | |
| | GGATAAAACACAATATTTTTAACCCTCCAATTATTGCTCGA | |
| | TACATCCGTTTGCACCCAACTCATTATAGCATTCGCAGCA | |
| | CTCTTCGCATGGAGTTGATGGGCTGTGATTTAAATAGTTG | |
| | CAGCATGCCATTGGGAATGGAGAGTAAAGCAATATCAGAT | |
| | GCACAGATTACTGCTTCATCCTACTTTACCAATATGTTTGC | |
| | CACCTGGTCTCCTTCAAAAGCTCGACTTCACCTCCAAGGG | |
| | AGGAGTAATGCCTGGAGACCTCAGGTGAATAATCCAAAAG | |
| | AGTGGCTGCAAGTGGACTTCCAGAAGACAATGAAAGTCAC | |
| | AGGAGTAACTACTCAGGGAGTAAAATCTCTGCTTACCAGC | |
| | ATGTATGTGAAGGAGTTCCTCATCTCCAGCAGTCAAGATG | |
| | GCCATCAGTGGACTCTCTTTTTTCAGAATGGCAAAGTAAA | |
| | GGTTTTTCAGGGAAATCAAGACTCCTTCACACCTGTGGTG | |
| | AACTCTCTAGACCCACCGTTACTGACTCGCTACCTTCGAA | |
| | TTCACCCCCAGAGTTGGGTGCACCAGATTGCCCTGAGGA | |
| | TGGAGGTTCTGGGCTGCGAGGCACAGGACCTCTACTGA | |
| FVIII-RH | ATGCAGATCGAGCTGTCCACCTGCTTTTTCTGTGCCTGC | SEQ |
| CO | TGCGGTTCTGCTTCAGCGCCACCCGGCGGTACTACCTGG | ID NO: |
| | GCGCCGTGGAGCTGTCCTGGGACTACATGCAGAGCGACC | 7 |
| | TGGGCGAGCTGCCCGTGGACGCCCGGTTCCCCCCCAGA | |

TABLE I-continued

GTGCCCAAGAGCTTCCCCTTCAACACCAGCGTGGTGTAC
AAGAAAACCCTGTTCGTGGAGTTCACCGACCACCTGTTCA
ATATCGCCAAGCCCAGGCCCCCCTGGATGGGCCTGCTGG
GCCCCACCATCCAGGCCGAGGTGTACGACACCGTGGTGA
TCACCCTGAAGAACATGGCCAGCCACCCCGTGAGCCTGC
ACGCCGTGGGCGTGAGCTACTGGAAGGCCAGCGAGGGC
GCCGAGTACGACGACCAGACCAGCCAGCGGGAGAAAGA
AGATGACAAGGTGTTCCCTGGCGGCAGCCACACCTACGT
GTGGCAGGTGCTGAAAGAAAACGGCCCCATGGCCTCCGA
CCCCCTGTGCCTGACCTACAGCTACCTGAGCCACGTGGA
CCTGGTGAAGGACCTGAACAGCGGCCTGATCGGCGCTCT
GCTCGTCTGCCGGGAGGGCAGCCTGGCCAAAGAGAAAAC
CCAGACCCTGCACAAGTTCATCCTGCTGTTCGCCGTGTTC
GACGAGGGCAAGAGCTGGCACAGCGAGACAAAGAACAG
CCTGATGCAGGACCGGGACGCCGCCTCTGCCAGAGCCT
GGCCCAAGATGCACACCGTGAACGGCTACGTGAACAGAA
GCCTGCCCGGCCTGATTGGCTGCCACCGGAAGAGCGTGT
ACTGGCACGTGATCGGCATGGGCACCACACCCGAGGTGC
ACAGCATCTTTCTGGAAGGGCACACCTTTCTGGTCCGGAA
CCACCGGCAGGCCAGCCTGGAAATCAGCCCTATCACCTT
CCTGACCGCCCAGACACTGCTGATGGACCTGGGCCAGTT
CCTGCTGTTTTGCCACATCAGCTCTCACCAGCACGACGGC
ATGGAAGCCTACGTGAAGGTGGACTCTTGCCCCGAGGAA
CCCCAGCTGCGGATGAAGAACAACGAGGAAGCCGAGGAC
TACGACGACGACCTGACCGACAGCGAGATGGACGTGGTG
CGGTTCGACGACGACAACAGCCCCAGCTTCATCCAGATC
AGAAGCGTGGCCAAGAAGCACCCCAAGACCTGGGTGCAC
TATATCGCCGCCGAGGAAGAGGACTGGGACTACGCCCCC
CTGGTGCTGGCCCCCGACGACAGAAGCTACAAGAGCCAG
TACCTGAACAATGGCCCCCAGCGGATCGGCCGGAAGTAC
AAGAAAGTGCGGTTCATGGCCTACACCGACGAGACATTCA
AGACCCGGGAGGCCATCCAGCACGAGAGCGGCATCCTG
GGCCCCCTGCTGTACGGCGAAGTGGGCGACACACTGCTG
ATCATCTTCAAGAACCAGGCTAGCCGGCCCTACAACATCT
ACCCCCACGGCATCACCGACGTGCGGCCCCTGTACAGCA
GGCGGCTGCCCAAGGGCGTGAAGCACCTGAAGGACTTCC
CCATCCTGCCCGGCGAGATCTTCAAGTACAAGTGGACCG
TGACCGTGGAGGACGGCCCCACCAAGAGCGACCCCAGAT
GCCTGACCCGGTACTACAGCAGCTTCGTGAACATGGAAC
GGGACCTGGCCTCCGGGCTGATCGGACCTCTGCTGATCT
GCTACAAAGAAAGCGTGGACCAGCGGGGCAACCAGATCA
TGAGCGACAAGCGGAACGTGATCCTGTTCAGCGTGTTCG
ATGAGAACCGGTCCTGGTATCTGACCGAGAACATCCAGC
GGTTTCTGCCCAACCCTGCCGGCGTGCAGCTGGAAGATC
CCGAGTTCCAGGCCAGCAACATCATGCACTCCATCAATGG
CTACGTGTTCGACTCTCTGCAGCTCTCCGTGTGTCTGCAC
GAGGTGGCCTACTGGTACATCCTGAGCATCGGCGCCCAG
ACCGACTTCCTGAGCGTGTTCTTCAGCGGCTACACCTTCA
AGCACAAGATGGTGTACGAGGACACCCTGACCCTGTTCC
CTTTCAGCGGCGAGACAGTGTTCATGAGCATGGAAAACC
CCGGCCTGTGGATTCTGGGCTGCCACAACAGCGACTTCC
GGAACCGGGGCATGACCGCCCTGCTGAAGGTGTCCAGCT
GCGACAAGAACACCGGCGACTACTACGAGGACAGCTACG
AGGATATCAGCGCCTACCTGCTGTCCAAGAACAACGCCAT
CGAACCCCGGAGCTTCAGCCAGAACCCCCCCGTGCTGAC
GCATCACCAGCGGGAGATCACCCGGACAACCCTGCAGTC
CGACCAGGAAGAGATCGATTACGACGACACCATCAGCGT
GGAGATGAAGAAAGAGGATTTCGATATCTACGACGAGGA
CGAGAACCAGAGCCCCAGAAGCTTCCAGAAGAAAACCCG
GCACTACTTCATTGCCGCCGTGGAGAGGCTGTGGGACTA
CGGCATGAGTTCTAGCCCCCACGTGCTGCGGAACCGGGC
CCAGAGCGGCAGCGTGCCCCAGTTCAAGAAAGTGGTGTT
CCAGGAATTCACAGACGGCAGCTTCACCCAGCCTCTGTAT
AGAGGCGAGCTGAACGAGCACCTGGGGCTGCTGGGGCC
CTACATCAGGGCCGAAGTGGAGGACAACATCATGGTGAC
CTTCCGGAATCAGGCCAGCAGACCCTACTCCTTCTACAGC
AGCCTGATCAGCTACGAAGAGGACCAGCGGCAGGGCGC
CGAACCCCGGAAGAACTTCGTGAAGCCCAACGAAACCAA
GACCTACTTCTGGAAAGTGCAGCACCACATGGCCCCCAC
CAAGGACGAGTTCGACTGCAAGGCCTGGGCCTACTTCAG
CGACGTGGATCTGGAAAAGGACGTGCACTCTGGACTGAT
TGGCCCACTCCTGGTCTGCCACACTAACACCCTCAACCCC
GCCCACGGCCGCCAGGTGACCGTGCAGGAATTCGCCCT
GTTCTTCACCATCTTCGACGAGACAAAGTCCTGGTACTTC
ACCGAGAATATGGAACGGAACTGCAGAGCCCCCTGCAAC
ATCCAGATGGAAGATCCTACCTTCAAAGAGAACTACCGGT
TCCACGCCATCAACGGCTACATCATGGACACCCTGCCTG
GCCTGGTGATGGCCCAGGACCAGAGAATCCGGTGGTATC
TGCTGTCCATGGGCAGCAACGAGAATATCCACAGCATCCA
CTTCAGCGGCCACGTGTTCACCGTGCGGAAGAAAGAAGA

TABLE I-continued

| | | |
|---|---|---|
| | GTACAAGATGGCCCTGTACAACCTGTACCCCGGCGTGTT<br>CGAGACAGTGGAGATGCTGCCCAGCAAGGCCGGCATCTG<br>GCGGGTGGAGTGTCTGATCGGCGAGCACCTGCACGCTG<br>GCATGAGCACCCTGTTTCTGGTGTACAGCAACAAGTGCCA<br>GACCCCACTGGGCATGGCCTCTGGCCACATCCGGGACTT<br>CCAGATCACCGCCTCCGGCCAGTACGGCCAGTGGGCCC<br>CCAAGCTGGCCAGACTGCACTACAGCGGCAGCATCAACG<br>CCTGGTCCACCAAAGAGCCCTTCAGCTGGATCAAGGTGG<br>ACCTGCTGGCCCCTATGATCATCCACGGCATTAAGACCCA<br>GGGCGCCAGGCAGAAGTTCAGCAGCCTGTACATCAGCCA<br>GTTCATCATCATGTACAGCCTGGACGGCAAGAAGTGGCA<br>GACCTACCGGGGCAACAGCACCGGCACCCTGATGGTGTT<br>CTTCGGCAATGTGGACAGCAGCGGCATCAAGCACAACAT<br>CTTCAACCCCCCCATCATTGCCCGGTACATCCGGCTGCAC<br>CCCACCCACTACAGCATTAGATCCACACTGAGAATGGAAC<br>TGATGGGCTGCGACCTGAACTCCTGCAGCATGCCTCTGG<br>GCATGGAAAGCAAGGCCATCAGCGACGCCCAGATCACAG<br>CCAGCAGCTACTTCACCAACATGTTCGCCACCTGGTCCCC<br>CTCCAAGGCCAGGCTGCACCTGCAGGGCCGGTCCAACG<br>CCTGGCGGCCTCAGGTCAACAACCCCAAAGAATGGCTGC<br>AGGTGGACTTTCAGAAAACCATGAAGGTGACCGGCGTGA<br>CCACCCAGGGCGTGAAAAGCCTGCTGACCAGCATGTACG<br>TGAAAGAGTTTCTGATCAGCAGCTCTCAGGATGGCCACCA<br>GTGGACCCTGTTCTTTCAGAACGGCAAGGTGAAAGTGTTC<br>CAGGGCAACCAGGACTCCTTCACCCCCGTGGTGAACTCC<br>CTGGACCCCCCCCTGCTGACCCGCTACCTGAGAATCCAC<br>CCCCAGTCTTGGGTGCACCAGATCGCCCTCAGGATGGAA<br>GTCCTGGGATGTGAGGCCCAGGATCTGTACTGATGA | |
| FVIII-N6 | ATGCAAAGTGATCTCGGTGAGCTGCCTGTGGACGCAAGA<br>TTTCCTCCTAGAGTGCCAAAATCTTTTCCATTCAACACCTC<br>AGTCGTGTACAAAAAGACTCTGTTTGTAGAATTCACGGAT<br>CACCTTTTCAACATCGCTAAGCCAAGGCCACCCTGGATGG<br>GTCTGCTAGGTCCTACCATCCAGGCTGAGGTTTATGATAC<br>AGTGGTCATTACACTTAAGAACATGGCTTCCCATCCTGTC<br>AGTCTTCATGCTGTTGGTGTATCCTACTGGAAAGCTTCTG<br>AGGGAGCTGAATATGATGATCAGACCAGTCAAAGGGAGA<br>AAGAAGATGATAAAGTCTTCCCTGGTGGAAGCCATACATA<br>TGTCTGGCAGGTCCTGAAAGAGAATGGTCCAATGGCCTCT<br>GACCCACTGTGCCTTACCTACTCATATCTTTCTCATGTGGA<br>CCTGGTAAAAGACTTGAATTCAGGCCTCATTGGAGCCCTA<br>CTAGTATGTAGAGAAGGGAGTCTGGCCAAGGAAAAGACA<br>CAGACCTTGCACAAATTTATACTACTTTTTGCTGTATTTGA<br>TGAAGGGAAAAGTTGGCACTCAGAAACAAAGAACTCCTTG<br>ATGCAGGATAGGGATGCTGCATCTGCTCGGGCCTGGCCT<br>AAAATGCACACAGTCAATGGTTATGTAAACAGGTCTCTGC<br>CAGGTCTGATTGGATGCCACAGGAAATCAGTCTATTGGCA<br>TGTGATTGGAATGGGCACCACTCCTGAAGTGCACTCAATA<br>TTCCTCGAAGGTCACACATTTCTTGTGAGGAACCATCGCC<br>AGGCGTCCTTGGAAATCTCGCCAATAACTTTCCTTACTGC<br>TCAAACACTCTTGATGGACCTTGGACAGTTTCTACTGTCTT<br>GTCATATCTCTTCCCACCAACATGATGGCATGGAAGCTTA<br>TGTCAAAGTAGACAGCTGTCCAGAGGAACCCCAACTACGA<br>ATGAAAAATAATGAAGAAGCGGAAGACTATGATGATGATC<br>TTACTGATTCTGAAATGGATGTGGTCAGGTTTGATGATGA<br>CAACTCTCCTTCCTTTATCCAAATTCGCTCAGTTGCCAAGA<br>AGCATCCTAAAACTTGGGTACATTACATTGCTGCTGAAGA<br>GGAGGACTGGGACTATGCTCCCTTAGTCCTCGCCCCCGA<br>TGACAGAAGTTATAAAAGTCAATATTTGAACAATGGCCCTC<br>AGCGGATTGGTAGGAAGTACAAAAAAGTCCGATTTATGGC<br>ATACACAGATGAAACCTTTAAGACTCGTGAAGCTATTCAG<br>CATGAATCAGGAATCTTGGGACCTTTACTTTATGGGGAAG<br>TTGGAGACACACTGTTGATTATATTTAAGAATCAAGCAAGC<br>AGACCATATAACATCTACCCTCACGGAATCACTGATGTCC<br>GTCCTTTGTATTCAAGGAGATTACCAAAAGGTGTAAAACAT<br>TTGAAGGATTTTCCAATTCTGCCAGGAGAAATATTCAAATA<br>TAAATGGACAGTGACTGTAGAAGATGGGCCAACTAAATCA<br>GATCCTCGGTGCCTGACCCGCTATTACTCTAGTTTCGTTA<br>ATATGGAGAGAGATCTAGCTTCAGGACTCATTGGCCCTCT<br>CCTCATCTGCTACAAAGAATCTGTAGATCAAAGAGGAAAC<br>CAGATAATGTCAGACAAGAGGAATGTCATCCTGTTTTCTG<br>TATTTGATGAGAACCGAAGCTGGTACCTCACAGAGAATAT<br>ACAACGCTTTCTCCCCAATCCAGCTGGAGTGCAGCTTGAG<br>GATCCAGAGTTCCAAGCCTCCAACATCATGCACAGCATCA<br>ATGGCTATGTTTTTGATAGTTTGCAGTTGTCAGTTTGTTTG<br>CATGAGGTGGCATACTGGTACATTCTAAGCATTGGAGCAC<br>AGACTGACTTCCTTTCTGTCTTCTTCTCTGGATATACCTTC<br>AAACACAAAATGGTCTATGAAGACACACTCACCCTATTCC<br>CATTCTCAGGAGAAACTGTCTTCATGTCGATGGAAAACCC<br>AGGTCTATGGATTCTGGGGTGCCACAACTCAGACTTTCGG | SEQ ID NO: 8 |

TABLE I-continued

| | | |
|---|---|---|
| | AACAGAGGCATGACCGCCTTACTGAAGGTTTCTAGTTGTG<br>ACAAGAACACTGGTGATTATTACGAGGACAGTTATGAAGA<br>TATTTCAGCATACTTGCTGAGTAAAAACAATGCCATTGAAC<br>CAAGAAGCTTCTCCCAGAATTCAAGACACCCTAGCACTAG<br>GCAAAAGCAATTTAATGCCACCACAATTCCAGAAAATGAC<br>ATAGAGAAGACTGACCCTTGGTTTGCACACAGAACACCTA<br>TGCCTAAAATACAAAATGTCTCCTCTAGTGATTTGTTGATG<br>CTCTTGCGACAGAGTCCTACTCCACATGGGCTATCCTTAT<br>CTGATCTCCAAGAAGCCAAATATGAGACTTTTTCTGATGAT<br>CCATCACCTGGAGCAATAGACAGTAATAACAGCCTGTCTG<br>AAATGACACACTTCAGGCCACAGCTCCATCACAGTGGGG<br>ACATGGTATTTACCCCTGAGTCAGGCCTCCAATTAAGATT<br>AAATGAGAAACTGGGGACAACTGCAGCAACAGAGTTGAA<br>GAAACTTGATTTCAAAGTTTCTAGTACATCAAATAATCTGA<br>TTTCAACAATTCCATCAGACAATTTGGCAGCAGGTACTGAT<br>AATACAAGTTCCTTAGGACCCCCAAGTATGCCAGTTCATT<br>ATGATAGTCAATTAGATACCACTCTATTTGGCAAAAAGTCA<br>TCTCCCCTTACTGAGTCTGGTGGACCTCTGAGCTTGAGTG<br>AAGAAAATAATGATTCAAAGTTGTTAGAATCAGGTTTAATG<br>AATAGCCAAGAAAGTTCATGGGGAAAAAATGTATCGACGC<br>GTAGCTTTCAAAAGAAAACACGACACTATTTTATTGCTGCA<br>GTGGAGAGGCTCTGGGATTATGGGATGAGTAGCTCCCCA<br>CATGTTCTAAGAAACAGGGCTCAGAGTGGCAGTGTCCCTC<br>AGTTCAAGAAAGTTGTTTTCCAGGAATTTACTGATGGCTCC<br>TTTACTCAGCCCTTATACCGTGGAGAACTAAATGAACATTT<br>GGGACTCCTGGGGCCATATATAAGAGCAGAAGTTGAAGA<br>TAATATCATGGTAACTTTCAGAAATCAGGCCTCTCGTCCCT<br>ATTCCTTCTATTCTAGCCTTATTTCTTATGAGGAAGATCAG<br>AGGCAAGGAGCAGAACCTAGAAAAAACTTTGTCAAGCCTA<br>ATGAAACCAAAACTTACTTTTGGAAAGTGCAACATCATATG<br>GCACCCACTAAAGATGAGTTTGACTGCAAAGCCTGGGCTT<br>ATTTCTCTGATGTTGACCTGGAAAAAGATGTGCACTCAGG<br>CCTGATTGGACCCCTTCTGGTCTGCCACACTAACACACTG<br>AACCCTGCTCATGGGAGACAAGTGACAGTACAGGAATTTG<br>CTCTGTTTTTCACCATCTTTGATGAGACCAAAAGCTGGTAC<br>TTCACTGAAAATATGGAAAGAAACTGCAGGGCTCCCTGCA<br>ATATCCAGATGGAAGATCCCACTTTTAAAGAGAATTATCGC<br>TTCCATGCAATCAATGGCTACATAATGGATACACTACCTG<br>GCTTAGTAATGGCTCAGGATCAAAGGATTCGATGGTATCT<br>GCTCAGCATGGGCAGCAATGAAAACATCCATTCTATTCAT<br>TTCAGTGGACATGTGTTCACTGTACGAAAAAAAGAGGAGT<br>ATAAAATGGCACTGTACAATCTCTATCCAGGTGTTTTTGAG<br>ACAGTGGAAATGTTACCATCCAAAGCTGGAATTTGGCGGG<br>TGGAATGCCTTATTGGCGAGCATCTACATGCTGGGATGAG<br>CACACTTTTTCTGGTGTACAGCAATAAGTGTCAGACTCCC<br>CTGGGAATGGCTTCTGGACACATTAGAGATTTTCAGATTA<br>CAGCTTCAGGACAATATGGACAGTGGGCCCCAAAGCTGG<br>CCAGACTTCATTATTCCGGATCAATCAATGCCTGGAGCAC<br>CAAGGAGCCCTTTTCTTGGATCAAGGTGGATCTGTTGGCA<br>CCAATGATTATTCACGGCATCAAGACCCAGGGTGCCCGTC<br>AGAAGTTCTCCAGCCTCTACATCTCTCAGTTTATCATCATG<br>TATAGTCTTGATGGGAAGAAGTGGCAGACTTATCGAGGAA<br>ATTCCACTGGAACCTTAATGGTCTTCTTTGGCAATGTGGAT<br>TCATCTGGGATAAAACACAATATTTTTAACCCTCCAATTAT<br>TGCTCGATACATCCGTTTGCACCCAACTCATTATAGCATTC<br>GCAGCACTCTTCGCATGGAGTTGATGGGCTGTGATTTAAA<br>TAGTTGCAGCATGCCATTGGGAATGGAGAGTAAAGCAATA<br>TCAGATGCACAGATTACTGCTTCATCCTACTTTACCAATAT<br>GTTTGCCACCTGGTCTCCTTCAAAAGCTCGACTTCACCTC<br>CAAGGGAGGAGTAATGCCTGGAGACCTCAGGTGAATAAT<br>CCAAAAGAGTGGCTGCAAGTGGACTTCCAGAAGACAATG<br>AAAGTCACAGGAGTAACTACTCAGGGAGTAAAATCTCTGC<br>TTACCAGCATGTATGTGAAGGAGTTCCTCATCTCCAGCAG<br>TCAAGATGGCCATCAGTGGACTCTCTTTTTTCAGAATGGC<br>AAAGTAAAGGTTTTTCAGGGAAATCAAGACTCCTTCACAC<br>CTGTGGTGAACTCTCTAGACCCACCGTTACTGACTCGCTA<br>CCTTCGAATTCACCCCCAGAGTTGGGTGCACCAGATTGCC<br>CTGAGGATGGAGGTTCTGGGCTGCGAGGCACAGGACCTC<br>TACTGA | |
| FIX | ATGCAGCGCGTGAACATGATCATGGCAGAATCACCAGGC<br>CTCATCACCATCTGCCTTTTAGGATATCTACTCAGTGCTGA<br>ATGTACAGTTTTTCTTGATCATGAAAACGCCAACAAAATTC<br>TGAATCGGCCAAAGAGGTATAATTCAGGTAAATTGGAAGA<br>GTTTGTTCAAGGGAACCTTGAGAGAGAATGTATGGAAGAA<br>AAGTGTAGTTTTGAAGAAGCACGAGAAGTTTTTGAAAACA<br>CTGAAAGAACAACTGAATTTTGGAAGCAGTATGTTGATGT<br>AACATGTAACATTAAGAATGGCAGATGCGAGCAGTTTTGT<br>AAAAATAGTGCTGATAACAAGGTGGTTTGCTCCTGTACTG<br>AGGGATATCGACTTGCAGAAAACCAGAAGTCCTGTGAACC | SEQ ID NO: 9 |

TABLE I-continued

| | | |
|---|---|---|
| | AGCAGTGCCATTTCCATGTGGAAGAGTTTCTGTTTCACAA<br>ACTTCTAAGCTCACCCGTGCTGAGACTGTTTTTCCTGATG<br>TGGACTATGTAAATTCTACTGAAGCTGAAACCATTTTGGAT<br>AACATCACTCAAAGCACCCAATCATTTAATGACTTCACTCG<br>GGTTGTTGGTGGAGAAGATGCCAAACCAGGTCAATTCCCT<br>TGGCAGGTTGTTTTGAATGGTAAAGTTGATGCATTCTGTG<br>GAGGCTCTATCGTTAATGAAAAATGGATTGTAACTGCTGC<br>CCACTGTGTTGAAACTGGTGTTAAAATTACAGTTGTCGCA<br>GGTGAACATAATATTGAGGAGACAGAACATACAGAGCAAA<br>AGCGAAATGTGATTCGAATTATTCCTCACCACAACTACAAT<br>GCAGCTATTAATAAGTACAACCATGACATTGCCCTTCTGG<br>AACTGGACGAACCCTTAGTGCTAAACAGCTACGTTACACC<br>TATTTGCATTGCTGACAAGGAATACACGAACATCTTCCTCA<br>AATTTGGATCTGGCTATGTAAGTGGCTGGGGAAGAGTCTT<br>CCACAAAGGGAGATCAGCTTTAGTTCTTCAGTACCTTAGA<br>GTTCCACTTGTTGACCGAGCCACATGTCTTCGATCTACAA<br>AGTTCACCATCTATAACAACATGTTCTGTGCTGGCTTCCAT<br>GAAGGAGGTAGAGATTCATGTCAAGGAGATAGTGGGGGA<br>CCCCATGTTACTGAAGTGGAAGGGACCAGTTTCTTAACTG<br>GAATTATTAGCTGGGGTGAAGAGTGTGCAATGAAAGGCAA<br>ATATGGAATATATACCAAGGTATCCCGGTATGTCAACTGG<br>ATTAAGGAAAAAACAAAGCTCACTTAA | |
| FIX Padua | ATGCAGCGCGTGAACATGATCATGGCAGAATCACCAGGC<br>CTCATCACCATCTGCCTTTTAGGATATCTACTCAGTGCTGA<br>ATGTACAGTTTTTCTTGATCATGAAAACGCCAACAAAATTC<br>TGAATCGGCCAAAGAGGTATAATTCAGGTAAATTGGAAGA<br>GTTTGTTCAAGGGAACCTTGAGAGAGAATGTATGGAAGAA<br>AAGTGTAGTTTTGAAGAAGCACGAGAAGTTTTTGAAAACA<br>CTGAAAGAACAACTGAATTTTGGAAGCAGTATGTTGATGT<br>AACATGTAACATTAAGAATGGCAGATGCGAGCAGTTTTGT<br>AAAAATAGTGCTGATAACAAGGTGGTTTGCTCCTGTACTG<br>AGGGATATCGACTTGCAGAAAACCAGAAGTCCTGTGAACC<br>AGCAGTGCCATTTCCATGTGGAAGAGTTTCTGTTTCACAA<br>ACTTCTAAGCTCACCCGTGCTGAGACTGTTTTTCCTGATG<br>TGGACTATGTAAATTCTACTGAAGCTGAAACCATTTTGGAT<br>AACATCACTCAAAGCACCCAATCATTTAATGACTTCACTCG<br>GGTTGTTGGTGGAGAAGATGCCAAACCAGGTCAATTCCCT<br>TGGCAGGTTGTTTTGAATGGTAAAGTTGATGCATTCTGTG<br>GAGGCTCTATCGTTAATGAAAAATGGATTGTAACTGCTGC<br>CCACTGTGTTGAAACTGGTGTTAAAATTACAGTTGTCGCA<br>GGTGAACATAATATTGAGGAGACAGAACATACAGAGCAAA<br>AGCGAAATGTGATTCGAATTATTCCTCACCACAACTACAAT<br>GCAGCTATTAATAAGTACAACCATGACATTGCCCTTCTGG<br>AACTGGACGAACCCTTAGTGCTAAACAGCTACGTTACACC<br>TATTTGCATTGCTGACAAGGAATACACGAACATCTTCCTCA<br>AATTTGGATCTGGCTATGTAAGTGGCTGGGGAAGAGTCTT<br>CCACAAAGGGAGATCAGCTTTAGTTCTTCAGTACCTTAGA<br>GTTCCACGAGTTGACCGAGCCACATGTCTTCGATCTACAA<br>AGTTCACCATCTATAACAACATGTTCTGTGCTGGCTTCCAT<br>GAAGGAGGTAGAGATTCATGTCAAGGAGATAGTGGGGGA<br>CCCCATGTTACTGAAGTGGAAGGGACCAGTTTCTTAACTG<br>GAATTATTAGCTGGGGTGAAGAGTGTGCAATGAAAGGCAA<br>ATATGGAATATATACCAAGGTATCCCGGTATGTCAACTGG<br>ATTAAGGAAAAAACAAAGCTCACTTAAATGCAGCGCGTGA<br>ACATGATCATGGCAGAATCACCAGGCCTCATCACCATCTG<br>CCTTTTAGGATATCTACTCAGTGCTGAATGTACAGTTTTTC<br>TTGATCATGAAAACGCCAACAAAATTCTGAATCGGCCAAA<br>GAGGTATAATTCAGGTAAATTGGAAGAGTTTGTTCAAGGG<br>AACCTTGAGAGAGAATGTATGGAAGAAAAGTGTAGTTTTG<br>AAGAAGCACGAGAAGTTTTTGAAAACACTGAAAGAACAAC<br>TGAATTTTGGAAGCAGTATGTTGATGTAACATGTAACATTA<br>AGAATGGCAGATGCGAGCAGTTTTGTAAAAATAGTGCTGA<br>TAACAAGGTGGTTTGCTCCTGTACTGAGGGATATCGACTT<br>GCAGAAAACCAGAAGTCCTGTGAACCAGCAGTGCCATTTC<br>CATGTGGAAGAGTTTCTGTTTCACAAACTTCTAAGCTCACC<br>CGTGCTGAGACTGTTTTTCCTGATGTGGACTATGTAAATTC<br>TACTGAAGCTGAAACCATTTTGGATAACATCACTCAAAGCA<br>CCCAATCATTTAATGACTTCACTCGGGTTGTTGGTGGAGA<br>AGATGCCAAACCAGGTCAATTCCCTTGGCAGGTTGTTTTG<br>AATGGTAAAGTTGATGCATTCTGTGGAGGCTCTATCGTTA<br>ATGAAAAATGGATTGTAACTGCTGCCCACTGTGTTGAAAC<br>TGGTGTTAAAATTACAGTTGTCGCAGGTGAACATAATATTG<br>AGGAGACAGAACATACAGAGCAAAAGCGAAATGTGATTCG<br>AATTATTCCTCACCACAACTACAATGCAGCTATTAATAAGT<br>ACAACCATGACATTGCCCTTCTGGAACTGGACGAACCCTT<br>AGTGCTAAACAGCTACGTTACACCTATTTGCATTGCTGAC<br>AAGGAATACACGAACATCTTCCTCAAATTTGGATCTGGCT<br>ATGTAAGTGGCTGGGGAAGAGTCTTCCACAAAGGGAGAT<br>CAGCTTTAGTTCTTCAGTACCTTAGAGTTCCACGAGTTGA | SEQ ID NO: 10 |

TABLE I-continued

| | | |
|---|---|---|
| | CCGAGCCACATGTCTTCGATCTACAAAGTTCACCATCTAT<br>AACAACATGTTCTGTGCTGGCTTCCATGAAGGAGGTAGAG<br>ATTCATGTCAAGGAGATAGTGGGGGACCCCATGTTACTGA<br>AGTGGAAGGGACCAGTTTCTTAACTGGAATTATTAGCTGG<br>GGTGAAGAGTGTGCAATGAAAGGCAAATATGGAATATATA<br>CCAAGGTATCCCGGTATGTCAACTGGATTAAGGAAAAAAC<br>AAAGCTCACTTAA | |
| FVII | ATGGTCTCCCAGGCCCTCAGGCTCCTCTGCCTTCTGCTTG<br>GGCTTCAGGGCTGCCTGGCTGCAGGCGGGGTCGCTAAG<br>GCCTCAGGAGGAGAAACACGGGACATGCCGTGGAAGCC<br>GGGGCCTCACAGAGTCTTCGTAACCCAGGAGGAAGCCCA<br>CGGCGTCCTGCACCGGCGCCGGCGCGCCAACGCGTTCC<br>TGGAGGAGCTGCGGCCGGGCTCCCTGGAGAGGGAGTGC<br>AAGGAGGAGCAGTGCTCCTTCGAGGAGGCCCGGGAGAT<br>CTTCAAGGACGCGGAGAGGACGAAGCTGTTCTGGATTTC<br>TTACAGTGATGGGGACCAGTGTGCCTCAAGTCCATGCCA<br>GAATGGGGGCTCCTGCAAGGACCAGCTCCAGTCCTATAT<br>CTGCTTCTGCCTCCCTGCCTTCGAGGGCCGGAACTGTGA<br>GACGCACAAGGATGACCAGCTGATCTGTGTGAACGAGAA<br>CGGCGGCTGTGAGCAGTACTGCAGTGACCACACGGGCAC<br>CAAGCGCTCCTGTCGGTGCCACGAGGGGTACTCTCTGCT<br>GGCAGACGGGGTGTCCTGCACACCCACAGTTGAATATCC<br>ATGTGGAAAAATACCTATTCTAGAAAAAAGAAATGCCAGC<br>AAACCCCAAGGCCGAATTGTGGGGGGCAAGGTGTGCCCC<br>AAAGGGGAGTGTCCATGGCAGGTCCTGTTGTTGGTGAAT<br>GGAGCTCAGTTGTGTGGGGGGACCCTGATCAACACCATC<br>TGGGTGGTCTCCGCGGCCCACTGTTTCGACAAAATCAAG<br>AACTGGAGGAACCTGATCGCGGTGCTGGGCGAGCACGAC<br>CTCAGCGAGCACGACGGGGATGAGCAGAGCCGGCGGGT<br>GGCGCAGGTCATCATCCCCAGCACGTACGTCCCGGGCAC<br>CACCAACCACGACATCGCGCTGCTCCGCCTGCACCAGCC<br>CGTGGTCCTCACTGACCATGTGGTGCCCCTCTGCCTGCC<br>CGAACGGACGTTCTCTGAGAGGACGCTGGCCTTCGTGCG<br>CTTCTCATTGGTCAGCGGCTGGGGCCAGCTGCTGGACCG<br>TGGCGCCACGGCCCTGGAGCTCATGGTCCTCAACGTGCC<br>CCGGCTGATGACCCAGGACTGCCTGCAGCAGTCACGGAA<br>GGTGGGAGACTCCCCAAATATCACGGAGTACATGTTCTGT<br>GCCGGCTACTCGGATGGCAGCAAGGACTCCTGCAAGGG<br>GGACAGTGGAGGCCCACATGCCACCCACTACCGGGGCA<br>CGTGGTACCTGACGGGCATCGTCAGCTGGGGCCAGGGC<br>TGCGCAACCGTGGGCCACTTTGGGGTGTACACCAGGGTC<br>TCCCAGTACATCGAGTGGCTGCAAAAGCTCATGCGCTCA<br>GAGCCACGCCCAGGAGTCCTCCTGCGAGCCCCATTTCCC<br>TAG | SEQ ID NO: 11 |
| FV | ATGTTCCCAGGCTGCCCACGCCTCTGGGTCCTGGTGGTC<br>TTGGGCACCAGCTGGGTAGGCTGGGGGAGCCAAGGGAC<br>AGAAGCGGCACAGCTAAGGCAGTTCTACGTGGCTGCTCA<br>GGGCATCAGTTGGAGCTACCGACCTGAGCCCACAAACTC<br>AAGTTTGAATCTTTCTGTAACTTCCTTTAAGAAAATTGTCTA<br>CAGAGAGTATGAACCATATTTTAAGAAAGAAAAACCACAAT<br>CTACCATTTCAGGACTTCTTGGGCCTACTTTATATGCTGAA<br>GTCGGAGACATCATAAAAGTTCACTTTAAAAATAAGGCAG<br>ATAAGCCCTTGAGCATCCATCCTCAAGGAATTAGGTACAG<br>TAAATTATCAGAAGGTGCTTCTTACCTTGACCACACATTCC<br>CTGCGGAGAAGATGGACGACGCTGTGGCTCCAGGCCGA<br>GAATACACCTATGAATGGAGTATCAGTGAGGACAGTGGAC<br>CCACCCATGATGACCCTCCATGCCTCACACACATCTATTA<br>CTCCCATGAAAATCTGATCGAGGATTTCAACTCGGGGCTG<br>ATTGGGCCCCTGCTTATCTGTAAAAAAGGGACCCTAACTG<br>AGGGTGGGACACAGAAGACGTTTGACAAGCAAATCGTGC<br>TACTATTTGCTGTGTTTGATGAAAGCAAGAGCTGGAGCCA<br>GTCATCATCCCTAATGTACACAGTCAATGGATATGTGAAT<br>GGGACAATGCCAGATATAACAGTTTGTGCCCATGACCACA<br>TCAGCTGGCATCTGCTGGGAATGAGCTCGGGGCCAGAAT<br>TATTCTCCATTCATTTCAACGGCCAGGTCCTGGAGCAGAA<br>CCATCATAAGGTCTCAGCCATCACCCTTGTCAGTGCTACA<br>TCCACTACCGCAAATATGACTGTGGGCCCAGAGGGAAAG<br>TGGATCATATCTTCTCTCACCCCAAAACATTTGCAAGCTG<br>GGATGCAGGCTTACATTGACATTAAAAACTGCCCAAAGAA<br>AACCAGGAATCTTAAGAAAATAACTCGTGAGCAGAGGCGG<br>CACATGAAGAGGTGGGAATACTTCATTGCTGCAGAGGAA<br>GTCATTTGGGACTATGCACCTGTAATACCAGCGAATATGG<br>ACAAAAAATACAGGTCTCAGCATTTGGATAATTTCTCAAAC<br>CAAATTGGAAAACATTATAAGAAAGTTATGTACACACAGTA<br>CGAAGATGAGTCCTTCACCAAACATACAGTGAATCCCAAT<br>ATGAAAGAAGATGGGATTTTGGGTCCTATTATCAGAGCCC<br>AGGTCAGAGACACACTCAAAATCGTGTTCAAAAATATGGC<br>CAGCCGCCCCTATAGCATTTACCCTCATGGAGTGACCTTC | SEQ ID NO: 12 |

TABLE I-continued

TCGCCTTATGAAGATGAAGTCAACTCTTCTTTCACCTCAG
GCAGGAACAACACCATGATCAGAGCAGTTCAACCAGGGG
AAACCTATACTTATAAGTGGAACATCTTAGAGTTTGATGAA
CCCACAGAAAATGATGCCCAGTGCTTAACAAGACCATACT
ACAGTGACGTGGACATCATGAGAGACATCGCCTCTGGGC
TAATAGGACTACTTCTAATCTGTAAGAGCAGATCCCTGGA
CAGGCGAGGAATACAGAGGGCAGCAGACATCGAACAGCA
GGCTGTGTTTGCTGTGTTTGATGAGAACAAAAGCTGGTAC
CTTGAGGACAACATCAACAAGTTTTGTGAAAATCCTGATG
AGGTGAAACGTGATGACCCCAAGTTTTATGAATCAAACAT
CATGAGCACTATCAATGGCTATGTGCCTGAGAGCATAACT
ACTCTTGGATTCTGCTTTGATGACACTGTCCAGTGGCACT
TCTGTAGTGTGGGGACCCAGAATGAAATTTTGACCATCCA
CTTCACTGGGCACTCATTCATCTATGGAAAGAGGCATGAG
GACACCTTGACCCTCTTCCCCATGCGTGGAGAATCTGTGA
CGGTCACAATGGATAATGTTGGAACTTGGATGTTAACTTC
CATGAATTCTAGTCCAAGAAGCAAAAAGCTGAGGCTGAAA
TTCAGGGATGTTAAATGTATCCCAGATGATGATGAAGACT
CATATGAGATTTTTGAACCTCCAGAATCTACAGTCATGGCT
ACACGGAAAATGCATGATCGTTTAGAACCTGAAGATGAAG
AGAGTGATGCTGACTATGATTACCAGAACAGACTGGCTGC
AGCATTAGGAATCAGGTCATTCCGAAACTCATCATTGAAT
CAGGAAGAAGAAGAGTTCAATCTTACTGCCCTAGCTCTGG
AGAATGGCACTGAATTCGTTTCTTCAAACACAGATATAATT
GTTGGTTCAAATTATTCTTCCCCAAGTAATATTAGTAAGTT
CACTGTCAATAACCTTGCAGAACCTCAGAAAGCCCCTTCT
CACCAACAAGCCACCACAGCTGGTTCCCCACTGAGACAC
CTCATTGGCAAGAACTCAGTTCTCAATTCTTCCACAGCAG
AGCATTCCAGCCCATATTCTGAAGACCCTATAGAGGATCC
TCTACAGCCAGATGTCACAGGGATACGTCTACTTTCACTT
GGTGCTGGAGAATTCAAAAGTCAAGAACATGCTAAGCATA
AGGGACCCAAGGTAGAAAGAGATCAAGCAGCAAAGCACA
GGTTCTCCTGGATGAAATTACTAGCACATAAAGTTGGGAG
ACACCTAAGCCAAGACACTGGTTCTCCTTCCGGAATGAGG
CCCTGGGAGGACCTTCCTAGCCAAGACACTGGTTCTCCTT
CCAGAATGAGGCCCTGGAAGGACCCTCCTAGTGATCTGT
TACTCTTAAAACAAAGTAACTCATCTAAGATTTTGGTTGGG
AGATGGCATTTGGCTTCTGAGAAAGGTAGCTATGAAATAA
TCCAAGATACTGATGAAGACACAGCTGTTAACAATTGGCT
GATCAGCCCCCAGAATGCCTCACGTGCTTGGGGAGAAAG
CACCCCTCTTGCCAACAAGCCTGGAAAGCAGAGTGGCCA
CCCAAAGTTTCCTAGAGTTAGACATAAATCTCTACAAGTAA
GACAGGATGGAGGAAAGAGTAGACTGAAGAAAAGCCAGT
TTCTCATTAAGACACGAAAAAAGAAAAAAGAGAAGCACAC
ACACCATGCTCCTTTATCTCCGAGGACCTTTCACCCTCTA
AGAAGTGAAGCCTACAACACATTTTCAGAAAGAAGACTTA
AGCATTCGTTGGTGCTTCATAAATCCAATGAAACATCTCTT
CCCACAGACCTCAATCAGACATTGCCCTCTATGGATTTTG
GCTGGATAGCCTCACTTCCTGACCATAATCAGAATTCCTC
AAATGACACTGGTCAGGCAAGCTGTCCTCCAGGTCTTTAT
CAGACAGTGCCCCCAGAGGAACACTATCAAACATTCCCCA
TTCAAGACCCTGATCAAATGCACTCTACTTCAGACCCCAG
TCACAGATCCTCTTCTCCAGAGCTCAGTGAAATGCTTGAG
TATGACCGAAGTCACAAGTCCTTCCCCACAGATATAAGTC
AAATGTCCCCTTCCTCAGAACATGAAGTCTGGCAGACAGT
CATCTCTCCAGACCTCAGCCAGGTGACCCTCTCTCCAGAA
CTCAGCCAGACAAACCTCTCTCCAGACCTCAGCCACACGA
CTCTCTCTCCAGAACTCATTCAGAGAAACCTTTCCCCAGC
CCTCGGTCAGATGCCCATTTCTCCAGACCTCAGCCATACA
ACCCTTTCTCCAGACCTCAGCCATACAACCCTTTCTTTAGA
CCTCAGCCAGACAAACCTCTCTCCAGAACTCAGTCAGACA
AACCTTTCTCCAGCCCTCGGTCAGATGCCCCTTTCTCCAG
ACCTCAGCCATACAACCCTTTCTCTAGACTTCAGCCAGAC
AAACCTCTCTCCAGAACTCAGCCATATGACTCTCTCTCCA
GAACTCAGTCAGACAAACCTTTCCCCAGCCCTCGGTCAGA
TGCCCATTTCTCCAGACCTCAGCCATACAACCCTTTCTCTA
GACTTCAGCCAGACAAACCTCTCTCCAGAACTCAGTCAAA
CAAACCTTTCCCCAGCCCTCGGTCAGATGCCCCTTTCTCC
AGACCCCAGCCATACAACCCTTTCTCTAGACCTCAGCCAG
ACAAACCTCTCTCCAGAACTCAGTCAGACAAACCTTTCCC
CAGACCTCAGTGAGATGCCCCTCTTTGCAGATCTCAGTCA
AATTCCCCTTACCCCAGACCTCGACCAGATGACACTTTCT
CCAGACCTTGGTGAGACAGATCTTTCCCCAAACTTTGGTC
AGATGTCCCTTTCCCCAGACCTCAGCCAGGTGACTCTCTC
TCCAGACATCAGTGACACCACCCTTCTCCCGGATCTCAGC
CAGATATCACCTCCTCCAGACCTTGATCAGATATTCTACC
CTTCTGAATCTAGTCAGTCATTGCTTCTTCAAGAATTTAAT
GAGTCTTTTCCTTATCCAGACCTTGGTCAGATGCCATCTC
CTTCATCTCCTACTCTCAATGATACTTTTCTATCAAAGGAA
TTTAATCCACTGGTTATAGTGGGCCTCAGTAAAGATGGTA

TABLE I-continued

| | | |
|---|---|---|
| | CAGATTACATTGAGATCATTCCAAAGGAAGAGGTCCAGAG | |
| | CAGTGAAGATGACTATGCTGAAATTGATTATGTGCCCTAT | |
| | GATGACCCCTACAAAACTGATGTTAGGACAAACATCAACT | |
| | CCTCCAGAGATCCTGACAACATTGCAGCATGGTACCTCCG | |
| | CAGCAACAATGGAAACAGAAGAAATTATTACATTGCTGCT | |
| | GAAGAAATATCCTGGGATTATTCAGAATTTGTACAAAGGG | |
| | AAACAGATATTGAAGACTCTGATGATATTCCAGAAGATACC | |
| | ACATATAAGAAAGTAGTTTTTCGAAAGTACCTCGACAGCA | |
| | CTTTTACCAAACGTGATCCTCGAGGGGAGTATGAAGAGCA | |
| | TCTCGGAATTCTTGGTCCTATTATCAGAGCTGAAGTGGAT | |
| | GATGTTATCCAAGTTCGTTTTAAAAATTTAGCATCCAGACC | |
| | GTATTCTCTACATGCCCATGGACTTTCCTATGAAAAATCAT | |
| | CAGAGGGAAAGACTTATGAAGATGACTCTCCTGAATGGTT | |
| | TAAGGAAGATAATGCTGTTCAGCCAAATAGCAGTTATACC | |
| | TACGTATGGCATGCCACTGAGCGATCAGGGCCAGAAAGT | |
| | CCTGGCTCTGCCTGTCGGGCTTGGGCCTACTACTCAGCT | |
| | GTGAACCCAGAAAAAGATATTCACTCAGGCTTGATAGGTC | |
| | CCCTCCTAATCTGCCAAAAAGGAATACTACATAAGGACAG | |
| | CAACATGCCTATGGACATGAGAGAATTTGTCTTACTATTTA | |
| | TGACCTTTGATGAAAAGAAGAGCTGGTACTATGAAAAGAA | |
| | GTCCCGAAGTTCTTGGAGACTCACATCCTCAGAAATGAAA | |
| | AAATCCCATGAGTTTCACGCCATTAATGGGATGATCTACA | |
| | GCTTGCCTGGCCTGAAAATGTATGAGCAAGAGTGGGTGA | |
| | GGTTACACCTGCTGAACATAGGCGGCTCCCAAGACATTCA | |
| | CGTGGTTCACTTTCACGGCCAGACCTTGCTGGAAAATGGC | |
| | AATAAACAGCACCAGTTAGGGGTCTGGCCCCTTCTGCCTG | |
| | GTTCATTTAAAACTCTTGAAATGAAGGCATCAAAACCTGGC | |
| | TGGTGGCTCCTAAACACAGAGGTTGGAGAAAACCAGAGA | |
| | GCAGGGATGCAAACGCCATTTCTTATCATGGACAGAGACT | |
| | GTAGGATGCCAATGGGACTAAGCACTGGTATCATATCTGA | |
| | TTCACAGATCAAGGCTTCAGAGTTTCTGGGTTACTGGGAG | |
| | CCCAGATTAGCAAGATTAAACAATGGTGGATCTTATAATG | |
| | CTTGGAGTGTAGAAAAACTTGCAGCAGAATTTGCCTCTAA | |
| | ACCTTGGATCCAGGTGGACATGCAAAAGGAAGTCATAATC | |
| | ACAGGGATCCAGACCCAAGGTGCCAAACACTACCTGAAG | |
| | TCCTGCTATACCACAGAGTTCTATGTAGCTTACAGTTCCAA | |
| | CCAGATCAACTGGCAGATCTTCAAAGGGAACAGCACAAG | |
| | GAATGTGATGTATTTTAATGGCAATTCAGATGCCTCTACAA | |
| | TAAAAGAGAATCAGTTTGACCCACCTATTGTGGCTAGATAT | |
| | ATTAGGATCTCTCCAACTCGAGCCTATAACAGACCTACCC | |
| | TTCGATTGGAACTGCAAGGTTGTGAGGTAAATGGATGTTC | |
| | CACACCCCTGGGTATGGAAAATGGAAAGATAGAAAACAAG | |
| | CAAATCACAGCTTCTTCGTTTAAGAAATCTTGGTGGGGAG | |
| | ATTACTGGGAACCCTTCCGTGCCCGTCTGAATGCCCAGG | |
| | GACGTGTGAATGCCTGGCAAGCCAAGGCAAACAACAATA | |
| | AGCAGTGGCTAGAAATTGATCTACTCAAGATCAAGAAGAT | |
| | AACGGCAATTATAACACAGGGCTGCAAGTCTCTGTCCTCT | |
| | GAAATGTATGTAAAGAGCTATACCATCCACTACAGTGAGC | |
| | AGGGAGTGGAATGGAAACCATACAGGCTGAAATCCTCCAT | |
| | GGTGGACAAGATTTTTGAAGGAAATACTAATACCAAAGGA | |
| | CATGTGAAGAACTTTTTCAACCCCCCAATCATTTCCAGGTT | |
| | TATCCGTGTCATTCCTAAAACATGGAATCAAAGTATTGCAC | |
| | TTCGCCTGGAACTCTTTGGCTGTGATATTTACTAG | |
| mirT122- | ACAAACACCATTGTCACACTCCATTCGAAACAAACACCATT | SEQ |
| 3p | GTCACACTCCAACGCGTACAAACACCATTGTCACACTCCA | ID NO: |
| 110 bp | ATGCATACAAACACCATTGTCACACTCCA | 13 |
| mirT223 | GGGGTATTTGACAAACTGACACGATGGGGTATTTGACAAA | SEQ |
| 98 bp | CTGACAACCGGTGGGGTATTTGACAAACTGACATCACGG | ID NO: |
| | GGTATTTGACAAACTGACA | 14 |
| mirT142- | TCCATAAAGTAGGAAACACTACACGATTCCATAAAGTAGG | SEQ |
| 3p | AAACACTACAACCGGTTCCATAAAGTAGGAAACACTACAT | ID NO: |
| 108 bp | CACTCCATAAAGTAGGAAACACTACA | 15 |

The cellular expression of the therapeutic gene, preferably FVIII and/or its variants, obtained by using the sequences of the disclosure—as promoter of the therapeutic gene of interest—allows rescuing/curing a disease such as hemophilia, preferably type A hemophilia, and/or any condition or disease related to or associate with a deficit or any misexpression of the therapeutic gene of interest, preferably FVIII and/or its variants.

Therefore, a second aspect of the present invention refers to the disclosed polynucleotide sequences, preferably a sequence selected from: SEQ ID NO: 1, 2 and 3, or any sequences comprising SEQ ID NO: 1, 2 and/or 3, or any derivative of SEQ ID NO: 1, 2 and/or 3, for use in gene therapy and/or cellular therapy, in particular for treating, preferably by a gene and/or cellular therapy approach, hemophilia, preferably type A hemophilia or any condition or disease related to or associate with a deficit in the expression of the therapeutic gene, preferably FVIII and/or its variants.

Besides hemophilia A the disclosed sequences may be used also to promote the endothelial specific expression of any further gene involved in the coagulation cascade, preferably a gene selected from: FIX, FVII, FV and any combination thereof.

According to a preferred embodiment of the invention, the polynucleotide sequence encoding for FIX is preferably selected from: SEQ ID NO: 9 and 10 or any sequence comprising SEQ ID NO: 9 and/or 10; the polynucleotide sequence encoding for FVII is preferably SEQ ID NO: 11 or any sequence comprising SEQ ID NO: 11; the polynucleotide sequence encoding for FV is preferably SEQ ID NO: 12 or any sequence comprising SEQ ID NO: 12.

Therefore, the herewith disclosed sequences can be also used for treating a condition/disease related to or associated with a deficit or a misexpression of any further gene involved in the coagulation cascade, preferably selected from FIX, FVII, FV and any combination thereof.

According to a further aspect of the invention, the disclosed sequences are useful to promote the endothelial specific expression of a gene or a growth factor, or a functional protein involved in the coagulation cascade or having a particular function into endothelial cells homeostasis or having the need to be expressed in endothelial cells.

As already mentioned above, the disclosed sequences are used as promoter polynucleotide sequences useful to target/address/induce the expression of a therapeutic gene, preferably FVIII gene and/or its variants, specifically into endothelial cells. In the context of the present invention, the endothelial cells are preferably, the endothelial cells of the liver, more preferably, the liver sinusoidal endothelial cells (LSECs) or further vascular and/or lymphatic endothelial cells.

According to a preferred embodiment of the invention, the disclosed sequences are contained in a vector (can be introduced into a vector), preferably any vector useful for gene expression.

The vector, preferably the expression vector, comprises the Stab-2 promoter derived sequences as disclosed above and/or any gene, preferably any therapeutic and/or reported gene as disclosed above.

The Stab-2 promoter derived sequence of the disclosure is preferably selected from SEQ ID NO: 1-3. The therapeutic gene is preferably, FVIII, more preferably human BDD, still more preferably a sequence selected from SEQ ID NO: 4-8; and/or FIX, preferably SEQ ID NO: 9 and/or 10; and/or FVII, preferably SEQ ID NO: 11; and/or FV, preferably SEQ ID NO: 12.

The vector is a viral vector or a non-viral vector. Viral vectors include a parvovirus, an adenovirus, a herpes simplex virus or a lentiviral (LV), a retroviral vector, preferably selected from the HIV-1 and/or gamma retroviruses, or adeno-associated vector (AAV). Preferably said vector is the improved self-inactivating (SIN) HIV-1 based lentiviral vector (LV, pCCL-prom-trans gene-cPPT-Wpre) prepared with the third generation lentiviral packaging system to produce LV.

Alternatively, the vector is selected from adeno-associated viral vector (AAV), preferably serotypes that can be used in endothelial cells.

According to a further preferred embodiment, the vector further comprises at least one sequence for modulating gene expression, preferably selected from the group consisting of: a polyadenylation sequence; a Woodchuck hepatitis post-transcriptional regulatory element (WPRE—to increase the transcript stability); the central polypurine tract (cPPT), preferably for lentiviral vectors; at least one mirT (mir Target sequences—that are sequences recognized by tissue-specific miRNAs inducing cell specific gene knockdown in selected cell types) and any combination thereof. Preferably, said mirT is selected from: mirT-142-3p, preferably SEQ ID NO: 15, preferably to detarget transgene expression from all hematopoietic cells; mirT-223, preferably SEQ ID NO: 14, preferably to detarget transgene expression from all myeloid cells; mirT-122, preferably SEQ ID NO: 13, preferably to detarget transgene expression from hepatocytes, and any combination thereof.

More preferably, the vector further comprises an enhancer polynucleotide sequence. More preferably, said enhancer polynucleotide sequence can be positioned upstream or downstream and/or close or far from the gene sequence the expression of which has to be enhanced.

The obtained vectors are useful for targeting specifically the expression of a therapeutic gene of interest in endothelial cells. The gene of interest is introduced into the vector preferably downstream the polynucleotide sequences of the disclosure, preferably downstream a sequence selected from: SEQ ID NO: 1-3, or any sequences comprising SEQ ID NO: 1, 2 or 3, or any derivative of SEQ ID NO: 1, 2 or 3. Preferably, the therapeutic gene of interest is FVIII or variants/fragments thereof. FVIII is preferably human BDD FVIII, more preferably the human BDD FVIII polynucleotide sequence is SEQ ID NO: 4 and/or 5 or any sequences comprising SEQ ID NO: 4 and/or 5. The variants of FVIII are preferably molecules with an increased pro-coagulant activity. Preferably, these molecules are FVIII-RH and/or FVIII-N6 that are mutated forms of FVIII. In particular, FVIII-RH molecule is characterized by a substitution present in the canine form of FVIII that is more active of the human one. FVIII-N6 is characterized by a longer B domain included in comparison to the classical B domain deleted form used in gene therapy. Preferably, the polynucleotide sequence of FVIII-RH is SEQ ID NO: 6 and/or 7 or any sequences comprising SEQ ID NO: 6 and/or 7 wherein SEQ ID NO: 7 is a codon-optimized sequence. Preferably, the polynucleotide sequence of FVIII-N6 is preferably SEQ ID NO: 8 or any sequences comprising SEQ ID NO: 8.

Alternatively the therapeutic gene of interest can be any further gene of the coagulation cascade, preferably selected from: FIX, FVII and FV, or growth factors, cytokines and small molecules, wherein the polynucleotide sequence of FIX is preferably SEQ ID NO: 9 and/or 10 or any sequence comprising SEQ ID NO: 9 and/or 10; the polynucleotide sequence of FVII is preferably SEQ ID NO: 11 or any sequence comprising SEQ ID NO: 11; the polynucleotide sequence of FV is preferably SEQ ID NO: 12 or any sequence comprising SEQ ID NO: 12.

A further aspect of the present invention refers to host cells comprising the nucleotide sequences and/or the vectors disclosed above. Preferably, said vectors are capable of expressing the gene of interest, preferably the therapeutic gene sequences as disclosed above in the host. The host may be any suitable host such as a bacterial, a yeast, an insect or a mammalian cell.

A further aspect of the present invention refers to transgenic animals comprising the host cells, and/or the vectors and/or the nucleotide sequences disclosed above. The animals are preferably non-human mammals, preferably rodents, such as mice.

The host cells, or the vectors or the polynucleotide sequences disclosed above can be used in the manufacture of a medicament that is preferably used in therapy, more preferably in gene and/or cell therapy, more preferably to cure/treat hemophilia, preferably type A hemophilia.

A further aspect of the present invention refers to a pharmaceutical composition comprising the host cells, or the vectors or the polynucleotide sequences disclosed above and at least one pharmaceutically acceptable excipients, such as carriers, diluents and/or other medical agents, pharmaceutical agents or adjuvants, etc.

A further aspect of the present invention refers to a method for treating a disease, preferably hemophilia, more preferably type A hemophilia, comprising at least one step of administering a therapeutically effective amount of the host cell, and/or the vector and/or the polynucleotide sequence disclosed above to an individual, preferably a human, suffering from such disease, preferably hemophilia. According to a preferred embodiment the individual has an immune-response to FVIII, in other words the individual shows systemic detection of anti-FVIII antibodies.

In this context, a "therapeutically effective amount" means an amount effective, at dosages and for periods of time necessary, to achieve the desired therapeutic result, such as raising the level of therapeutic gene, preferably FVIII or the other coagulation cascade factors in said individual so as to lead to functional therapeutic gene/protein production to a level sufficient to rescue or to ameliorate the symptoms of the pathological condition associate to or caused by misexpression/deficit of said therapeutic gene/protein.

A further aspect of the present invention refers to the use of the polynucleotide sequences of the present invention as disclosed above, preferably a sequence selected from: SEQ ID NO: 1-3, or any sequences comprising SEQ ID NO: 1, 2 or 3, or any derivative of SEQ ID NO: 1, 2 or 3 for modulating the expression, preferably the cellular expression, more preferably into endothelial cells, of a therapeutic gene, wherein said therapeutic gene is preferably FVIII or variants/fragments thereof. FVIII is preferably human BDD FVIII, more preferably the human BDD FVIII polynucleotide sequence is SEQ ID NO: 4 and/or 5 or any sequences comprising SEQ ID NO: 4 and/or 5. The variants of FVIII are preferably molecules with an increased pro-coagulant activity. Preferably, these molecules are FVIII-RH and/or FVIII-N6 that are mutated forms of FVIII. In particular, FVIII-RH molecule is characterized by a substitution present in the canine form of FVIII that is more active of the human one. FVIII-N6 is characterized by a longer B domain included in comparison to the classical B domain deleted form used in gene therapy. Preferably, the polynucleotide sequence of FVIII-RH is SEQ ID NO: 6 and/or 7 or any sequences comprising SEQ ID NO: 6 and/or 7 wherein SEQ ID NO: 7 is a codon-optimized sequence. Preferably, the polynucleotide sequence of FVIII-N6 is preferably SEQ ID NO: 8 or any sequences comprising SEQ ID NO: 8. Alternatively the therapeutic gene can be any further gene of the coagulation cascade, preferably selected from: FIX, FVII and FV, or growth factors, cytokines and small molecules, wherein the polynucleotide sequence of FIX is preferably SEQ ID NO: 9 and/or 10 or any sequence comprising SEQ ID NO: 9 and/or 10; the polynucleotide sequence of FVII is preferably SEQ ID NO: 11 or any sequence comprising SEQ ID NO: 11; the polynucleotide sequence of FV is preferably SEQ ID NO: 12 or any sequence comprising SEQ ID NO: 12.

Example I

Cloning

The biological activities of the Stabilin-2 derived sequences of the invention have been tested by using two Lentiviral Vectors (LVs) expressing Green Fluorescent Protein (GFP). In particular, the long and the short form of Stabilin-2 promoter (SEQ ID NO: 2 and SEQ ID NO: 1, respectively) have been tested for GFP expression.

Both regions (the long and the short form of Stabilin-2 promoter) are located on chromosome 12. In particular, the short promoter spans between the following genomic coordinates: 103586239-103587476, and the long promoter spans between the following genomic coordinates: 103585300-103587476.

SEQ ID NO: 1, that is the Stab-2 short promoter (Stab2.2=1238 base pairs long); and SEQ ID NO: 2, that is the Stab-2 long promoter (Stab2.1=2177 base pairs long)—were amplified by PCR from human genomic DNA extracted by peripheral blood mononuclear cells by inserting at 3' and 5' ends the restriction sites for the enzymes XhoI and AgeI. These sites were used to insert the cloned promoter in the LV.PGK-GFP in place of PGK promoter in order to obtain the LV.Stab2.2-GFP (containing SEQ ID NO: 1, the short Stab-2 promoter derived) and the LV.Stab2.1-GFP (containing SEQ ID NO: 2, the long Stab-2 promoter derived) constructs respectively. In order to generate LV.Stab2.2-hBDD-FVIII and LV.Stab2.2-hBDD-FVIII-RH we substituted the GFP sequence with the human BDD-FVIII (SEQ ID NO: 4) or the hBDD-FVIII-RH (SEQ ID NO: 6) sequences.

SEQ ID NO: 3, that is the shortest Stab-2 promoter derived sequence (333 base pairs long) has been retrieved by PCR using specific primers and inserting the restriction sites for the enzymes XhoI and AgeI. All the sequences have been verified by direct Sanger sequencing.

The set of primers used for cloning and sequencing are listed in Table 2.

TABLE 2

| Cloning Primers | | |
|---|---|---|
| Primer | Sequence (5'→3') | SEQ ID NO |
| CP1: Stab2.2 sense (XhoI restriction site) | **CTCGAG**CGTTTCCATCATGGTTTC | SEQ ID NO: 16 |
| CP2: Stab2.1-3 anti-sense (AgeI restriction site) | **ACCGGT**GAGGAAATATTTGCTCCTTCTC | SEQ ID NO: 17 |

TABLE 2-continued

| | | |
|---|---|---|
| CP3: Stab2.1 sense (XhoI restriction site) | **CTCGAG**GTCTAACATGGCATTTCCCT | SEQ ID NO: 18 |
| CP4: Stab2.3 sense (XhoI restriction site) | **CTCGAG**TAGAGGAGAGGCAGGACCGTT | SEQ ID NO: 19 |
| Sequencing Primers | | |
| Primer | Sequence (5'→3') | |
| SP1 | GAAGCATCCAATTTATGTCCCT | SEQ ID NO: 20 |
| SP2 | GATAGATGTGACCTCGGCTTTC | SEQ ID NO: 21 |

In Vitro and In Vivo Studies

The cell specific expression of the promoter sequences of the invention (derived from Stab-2 promoter as disclosed above) have been verified in vitro by transducing cell lines and primary cells of different origin by using the constructs disclosed in the previous paragraph.

In particular, the capacity of the promoter sequences of the invention to induce the expression of a gene, such as the marker GFP, have been checked in following cell lines: HEK293T (human epithelial cell line), hECV (human endothelial cell line), HUVEC (human primary endothelial cells) and HFF (human primary fibroblasts).

GFP expression has been evaluated by FACS analysis 72 hours after transduction.

Further, in vivo studies have been performed by injecting 1) $5\times10^8$ TU of GFP-containing LVs into the tail vein of C57Bl/6 and BALB/c mice, and $10^9$ TU of FVIII-containing LVs into the tail vein of C57Bl/6 HA or B6/129 HA mice (B6;129S-F8tm1Kaz/J; The Jackson Laboratory).

GFP expression has been evaluated by FACS analysis and immunofluorescence starting from 2 weeks after injection.

FVIII plasma activity has been assessed in the injected mice by aPTT assay starting from 2 weeks and up to 6 months after injection.

FVIII expression in LSECs after injection of LV.Stab2.2-hBDD-FVIII was evaluated by immunohistochemistry 6 months after LV injection.

FVIII Activity Assays

FVIII activity has been assessed by aPTT assay using the Coagulation Analyzer Coatron® M4 (TECO Medical Instruments). Standard curves have been generated using serial dilutions of pooled human plasma or purified hBDD-hFVIII (Refacto®) in hemophilic mouse plasma. The results have been expressed as percentage of human FVIII activity.

ELISA for Anti-FVIII Antibodies

Plasma samples have been diluted—1:200 and 1:2000—and tested in a solid phase ELISA, in which ReFacto® (0.2 μg/well) or bovine serum albumin (BSA) used as a specificity control, were adsorbed on PVC microwells and saturated with 0.2% BSA.

Serum reactivity has been detected with horseradish peroxidase-conjugated goat anti-mouse total IgG (Thermo Scientific Inc) and the addition of the chromogen 3,3',5,5'-tetramethylbenzidine (TMB; Sigma Aldrich). A commercial mouse anti-FVIII monoclonal antibody (Clone GMA-8015, Green Mountain Antibodies) has been used as positive control. The absorbance has been read at 450 nm on a Victor X (PerkinElmer) spectrophotometer.

Immunofluorescence

Liver and spleen from mice have been fixed in 4% paraformaldehyde (PFA) in PBS for 2 hours at 4° C., equilibrated in 30% sucrose, embedded in Killik cryostat embedding medium (Bio-Optica) and stored at −80° C. Cryostat sections (5-6 μm) have been incubated in blocking buffer (5% goat serum, 1% BSA, 0.1% Triton X-100 in PBS). GFP has been detected by staining samples with rabbit anti-GFP (1:1000; Molecular Probes, Thermo Scientific Inc) for 1 hour at Room Temperature (RT).

Co-staining with rat anti-mouse F4/80 (1:400; AbD serotec, Bio-Rad) or rat anti-mouse Lyve-1 (1:200; eBioscience, Affymetrix) has been performed in order to characterize the GFP-expressing cells. After washing in PBS containing 0.1% Triton X-100, Alexa Fluor® 488-conjugated goat anti-rabbit IgG and Alexa Fluor® 546-conjugated goat anti-rat IgG (1:500, Molecular Probes, Thermo Scientific Inc) have been added for 1 hour. Nuclei have been stained with DAPI (Sigma Aldrich).

Immunohistochemistry

Paraffin-embedded sections (5-6 μm thick) from mouse liver and spleen have been treated in boiling 50 mM EDTA pH 8 for antigen retrieval using a microwave oven and then blocked in a buffer containing 5% goat serum, 1% BSA, 0.1% Triton X-100 in PBS. For FVIII detection, samples were stained with rabbit anti-FVIII (1:1000) for 2 hours at RT. Immunohistochemical reactions have been performed by a standard procedure. Immunostaining has been performed with a Dako Cytomation Envision plus system (DAKO Cytomation), using diaminobenzidine as chromogen. Sections have been counterstained with hemalume (Merck).

Results

Cloning and In Vitro Activity/Characterization of the Stab-2 Promoter Derived Sequences In order to assess the in vitro activity of the Stab-2 promoter derived sequences of the invention, we inserted SEQ ID NO: 1 or SEQ ID NO: 2 in two lentiviral (LV) transfer constructs containing GFP as gene reporter (LV.Stab2.2.GFP and LV.Stab2.1.GFP) (FIGS. 1 and 2).

The LVs constructs have been used to transduce at MOI 1 hECV cells and HUVEC, that are a human cell line of endothelial origin and primary human endothelial cell, respectively. HEK293T cells, (a human hembrionic kidney cell line) and primary human foreskin fibroblasts (HFF) have been used as negative controls.

The results are shown in FIG. 3 and have been compared with those obtained transducing same cells with LVs containing the GFP sequence under the control of the endothelial-specific VEC promoter or the ubiquitous PGK promoter.

Both SEQ ID NO 1 and 2—the short and the long form of Stab2 promoter-derived sequences—are active exclusively into endothelial cells (HUVEC and hECV cells), compared to the non-endothelial cells (HEK293T and HFF cells). Indeed, GFP is expressed at highest level into endothelial cells compared to the non-endothelial ones.

In Vivo Characterization of the Stab-2 Promoter Derived Sequences

Since no differences have been observed between SEQ ID NO: 1 and 2, only the shorter form (LV.Stab2.2 comprising SEQ ID NO: 1) have been used for in vivo experiments also in order to increase the loading capacity of the LVs.

$5\times10^{8}$ TU of LV.Stab2.2-GFP construct has been injected in the tail vein of C57Bl/6 mice. LV.VEC-GFP (comprising VEC—endothelial specific-promoter) and LV.PGK-GFP (comprising PGK—ubiquitous—promoter) have been used as control for endothelial and ubiquitous expression, respectively.

GFP expression in liver and spleen has been evaluated by FACS and immunofluorescence (IF) analysis 2 weeks after injection.

We evaluated the co-expression by immunofluorescence of GFP and LSEC (Lyve-1+) or Kupffer cells (F4/80+)-specific markers on liver and spleen sections of injected mice.

The results show that VEC promoter and SEQ ID NO: 1 are almost equally strong and efficient in driving transgene expression in LSEC as shown by Lyve1 (that is a marker for endothelial cells) co-staining (FIG. 4).

However, in the liver of LV.VEC-GFP injected mice we detected some "off-target" expression in Kupffer cells and hepatocytes while in spleen VEC was active in red pulp F4/80 positive cells.

Conversely, in liver sections of LV.Stab2.2-GFP-injected (comprising SEQ ID NO: 1) mice, the GFP expression is restricted to endothelial cells and, particularly, LSEC. Therefore, the Stab2 promoter derived sequences of the present invention drive transgene (here the GFP) expression into endothelial cells more specifically than a well-known endothelial-specific promoter, such as VEC promoter. Indeed, endothelial cells of big vessels did not express GFP and only Lyve-1 positive cells (LSECs) expressed the transgene.

In the spleen, very few GFP positive cells were detected and they were sinusoidal ECs according to their morphology and position (FIG. 4).

These results demonstrate that the sequences of the present invention are ideal sequences to be used as promoter to restrict specifically transgene expression to endothelial cells, in particular to LSECs.

Referring to the long-term GFP expression under the control of the sequences of the invention, a sustained GFP expression in LSECs have been observed up to 12 weeks after injection (FIG. 5).

Moreover, no significant cell aggregates were noticed around GFP positive cells demonstrating the absence of any inflammatory/immune response.

All these data demonstrate that the Stab-2 promoter-derived sequences of the present invention drive long-term transgene expression specifically into endothelial cells, in particular in LSECs.

When we injected LV.PGK-GFP, LV.VEC-GFP and LV.Stab2.2-GFP in BALB/c mice, we observed a clear GFP expression only in LV.Stab2.2-GFP-injected mice 2 weeks after delivery, while GFP+ cells were rare events in LV.VEC-GFP-injected mice and no GFP+ cells were found in LV.PGK-GFP-injected mice (FIG. 6).

Moreover, GFP expression was observed in the liver of LV.Stab2.2-GFP-injected mice up to 2 months after LV delivery (the longest time point tested) and GFP+ cells were LSECs, as demonstrated by immunofluorescence showing GFP expression in Lyve-1+ cells but not in F4/80+ cells (FIG. 5).

Stab-2 Promoter-Derived Sequences of the Present Invention have Therapeutic Effects and Correct the Bleeding Phenotype in Hemophilic Mice We then expressed hBDD-FVIII (SEQ ID NO: 4) under the control of the short form of Stab-2 promoter-derived sequence (SEQ ID NO: 1) and we tail vein injected C57Bl/6 HA mice with $10^{9}$ TU of LV.Stab2.2-hBDD-FVIII per mouse. aPTT assay on plasma of treated mice showed therapeutic levels of FVIII (9-10%) up to 24 weeks after LV delivery (FIG. 7A). Moreover, no anti-FVIII antibody are detected in the plasma of all injected mice overtime by ELISA (FIG. 7B).

We compared these data with results obtained in mice after injection of LV.VEC-hBDD-FVIII and we observed a stronger efficiency in FVIII production after delivery of the same dose of lentiviruses in the same mouse strain (9-10% when hBDD-FVIII is under the sequences of the invention vs 5% with VEC promoter—FIG. 7A). Efficient FVIII production has been confirmed by immunohistochemistry on spleen and liver sections of the injected mice (FIG. 8).

As said both hBDD-FVIII—SEQ ID NO: 4 and/or 5- and FVIII-RH—SEQ ID NO: 6 and/or/7—were tested. In particular, C57Bl/6 HA mice have been injected with $10^{9}$ TU of LV.Stab2.2-FVIII.RH (n=4) or LV.Stab2.2-hBDD-FVIII (n=4). As a comparison, C57Bl/6 HA mice have been injected with $10^{9}$ TU of LV.VEC-FVIII.RH (n=3) or LV.VEC-hBDD-FVIII (n=3). Despite FVIII activity increase in plasma of hemophilic mice injected with LV.VEC-FVIII.RH compared to LV.VEC-hBDD-FVIII (8-9% VEC-FVIII-RH vs 5% VEC-hBDD-FVIII), FVIII activity in plasma of LV.Stab2.2-hBDD-FVIII-injected (SEQ ID NO: 4 under SEQ ID NO: 1) hemophilic mice was higher than the activity observed in LV.VEC-FVIII-RH-injected mice (12-14% Stab2.2-hBDD-FVIII vs 8-9% VEC-FVIII-RH). FVIII activity even increased of 55-60% (14-15% FVIII activity) by substituting hBDD-FVIII (SEQ ID NO: 4) with FVIII.RH (SEQ ID NO: 6) under the control of the Stab-2 promoter-derived sequence of the invention (FIG. 9A). Moreover, mice injected with LV.Stab2.2-hBDD-FVIII and LV.Stab2.2-FVIII-RH did not develop anti-FVIII antibodies (FIG. 7B, 9B).

When we compared Stab2.2 with VEC and F8 promoters we observed a higher efficiency of Stab2.2 sequence in drive the expression and secretion of hBDD-FVIII or FVIII-RH (FIGS. 10A and B).

To sum up the results of the present invention demonstrate that:

i) Stab-2 promoter-derived sequences of the present invention are more active/efficient in inducing the expression of a transgene(s) (hBDD-FVIII in this case) specifically into endothelial cells, and in particular in LSECs, compared to VEC and F8 promoters as shown in FIG. 10 A-B wherein human FVIII activity is measured in mice injected with FVIII expressing constructs (both—hBDD-FVIII—SEQ ID NO: 4 and/or 5—and FVIII-RH—SEQ ID NO: 6; and/or 7; FIG. 9-10);

ii) FVIII expression/production is long lasting (long-term expression of the factor) and at higher levels (above 10%); and iii) FVIII expression/production under the sequences of the present invention does not cause any immune response against the expressed transgene.

Finally, to study whether FVIII expression under the transcriptional control of the Stab-2 promoter-derived sequences of the present invention would support long term transgene expression in a different immunocompetent mouse strain, B6/129 hemophilic mice have been injected with LV.Stab2.2-hBDD-FVIII (SEQ ID NO: 4 and/or 5 under control of SEQ ID NO: 1; n=4) and LV.Stab2.2-FVIII.RH (SEQ ID NO: 6 and/or 7 under control of SEQ ID NO: 1; n=4). So far, we have data up to 1 year after lentiviral delivery and FVIII activity is detected in plasma of injected mice with comparable activity (10% for hBDD-FVIII and 14% for FVIII-RH) (FIG. 11A) to that observed with immunocompetent C57Bl/6 HA mice. Moreover, no anti-FVIII antibodies were detected in plasma of all lentiviral injected hemophilic mice (FIG. 11B), indicating that treatment with LV.Stab2.2-hBDD-FVIII and LV.Stab2.2-FVIII-RH resulted in efficient FVIII production and secretion and did not trigger a humoral immune response in these mice.

Therefore, the Stab-2 promoter-derived sequences of the present invention have the ability to drive FVIII expression specifically into endothelial cells in vitro. In particular, by using the shorter form of Stab-2 promoter (Stab2.2—SEQ ID NO: 1) we showed that this sequence is active in liver sinusoidal endothelial cells and, in a lesser extent, in sinusoidal endothelial cells in the spleen. Preliminary data demonstrate similar effects by using the long and the shortest form of Stab-2 promoter (Stab2.1 and Stab2.3—SEQ ID NO: 1 and 3, respectively).

The in vivo FVIII gene transfer data by using the Stab-2 promoter-derived sequences of the present invention resulted in higher FVIII expression and activity in plasma of treated hemophilic mice compared to the previously described endothelial-specific VEC promoter and compared to FVIII promoter.

Example II

Mice and Cells

B10D2 and C57BL/6J mice were purchased from Charles River Laboratories. B10D2×C57BL/6J F1 progeny was obtained by crossing B10D2 males with C57BL/6J females. BM cells from Just EGFP death-inducing (Jedi) mice were kindly provided by Dr Brown (Mount Sinai, New York). Animal studies were performed according to approved protocol by the Animal Care and Use Committees of University of Piemonte Orientale, Novara, Italy.

Jedi T Cell Generation, Isolation and T Cell Adoptive Transfer $5\times10^6$ Jedi bone marrow (BM) cells were transplanted into lethally busulfan-conditioned (25 mg/kg for 4 days) B10D2 mice. 12 weeks after transplantation the mice were killed and spleen was collected. CD8 T cells were purified from Jedi-BM transplanted or age-matched control B10D2 mice by immunomagnetic negative selection (Miltenyi Biotec). $2\times10^6$ Jedi or control CD8 T cells were transferred per mouse by tail vein injection.

B10D2×C57BL/6J F1 mice received $3\times10^8$ TU of LV.PGK-GFP or $5\times10^8$ TU of LV.Stab2.2-GFP seven days before CD8 T cell injection. Four days after T cell transfer, the mice were killed and liver was collected for immunofluorescence and flow cytometry analysis.

Flow Cytometer Analysis

Liver samples were minced and mononucleated cells were obtained by density gradient centrifugation (Histopaque-1077, Sigma). Single cell suspensions were incubated for 30 minutes at 4° C. with fluorochrome-labeled mAbs against mouse cell surface markers. The following anti-mouse Abs were used: CD11c (N418), CD11 b (M1/70), CD8 (53-6.7), CD4 (RM4-5) from ThermoFisher Scientific. Samples were acquired on the Attune NxT Acoustic Focusing Cytometer (ThermoFisher Scientific) and analysis was performed by Attune NxT Software (ThermoFisher Scientific).

Results

In order to study the effect of the Stab2 promoter derived sequences of the present invention in modulating the immune response in the liver we employed GFP-specific (Jedi) CD8 T cells in mice injected with either LV.PGK-GFP or LV.Stab2.2-GFP, Jedi CD8 T cells recognize the GFP200-208 peptide presented on H-2Kd MHC haplotype allele, and they can eliminate GFP-expressing cells with high specificity.

Livers injected with both LV.PGK-GFP and LV.Stab2.2.GFP showed recruitment of immune cells compare to mice non-injected with LVs (FIG. 12A). Both myeloid (FIG. 12B) and $CD8^+$ T cells (FIG. 12C) increased in the immune hepatic compartment upon LV challenge, while $CD4^+$ T cell percentage did not change. Interestingly, all mice receiving LV.Stab2.2-GFP showed $GFP^+$ cells 11 days after injection with the majority of positive cells displaying LSEC morphology (FIG. 13G-I). On the contrary, few or no $GFP^+$ cells were detected in mice receiving LV.PGK-GFP (FIG. 13D-F) and only the mouse receiving control $CD8^+$ T cells maintained $GFP^+$ cells (FIG. 13E). Elimination of GFP-expressing cells in the control (FIG. 13D) and in Jedi T cell-injected mouse (FIG. 13F) could indicate that the immune response was mediated by both host and injected immune cells. Expression of GFP under the control of the Stab2 promoter-derived sequences of the present invention in LSECs instead prevented immune reaction against the foreign protein regardless of the origin of the immune cells. Interestingly, even Jedi GFP-specific $CD8^+$ T cells were not active in eliminating $GFP^+$ cells in LV.Stab2.2-GFP (FIG. 131) while they killed most of the $GFP^+$ cells in the LV.PGK-GFP injected mouse (FIG. 13F). This result demonstrates a main role of LSEC in promoting immune tolerance.

Example III

In Vivo Studies

New in vivo studies have been performed by injecting 5×108 TU of LV.Stab2.3-GFP into the tail vein of immunocompetent C57Bl/6 mice and GFP expression has been evaluated by immunofluorescence 2 weeks and 1 month later, as described above. Quantification of GFP+ cells were carried on by counting GFP expressing cells among total nuclei in 20 fields of liver and spleen slices (ImageJ). The results have been expressed as a ratio between GFP+ cells and nuclei in a fixed area.

Luciferase Assay

The Stab2.2 and Stab2.3 promoter sequences were cloned into the pNL1.1 [NanoLuc®] plasmid (Promega) using XhoI and HindIII restriction sites. Plasmid encoding the endothelial transcription factor Ets-1 (NM_001143820) under the control of CMV promoter was bought from Origene. Stab2.2 or Stab2.3 luciferase expressing vectors were transiently transfected using Lipofectamine™ 2000 Transfection Reagent (Thermo Fisher scientific) in 293T cell line either alone or in combination with Ets-1 transcription factor. The pGL4.54 [luc2/TK]) plasmid constitutively expressing the firefly luciferase was transfected for each condition and used as internal control to normalize data. Cell lysis was performed 24 hours after transfection using 1× Passive Lysis Buffer (PLB) (Promega). NanoLuc® and Firefly luciferase reporter activities were measured using the NanoDLR™ Assay (Promega) according to the manufacturer's instructions. Luminescence was read at 560 nm on a Victor X (PerkinElmer). The transcription activity of Stab2.2 or Stab2.3 was expressed as the ratio between the average of (Nluc/Firefly) of Stab2.2-NLuc and Stab2.3-NLuc co-transfected with the transcription factor and the average of (Nluc/Firefly) of Stab2.2-NLuc and Stab2.3-NLuc alone.

Results

In Vivo Characterization of the Shortest Stab-2 Promoter Derived Sequence

We further continued with in vivo characterization of the shortest sequence defined SEQ ID NO: 3 (Stab2.3). 5×108 TU of LV.Stab2.3-GFP construct has been injected in the tail vein of C57Bl/6 mice as well as LV.Stab2.2-GFP for comparison.

GFP expression in liver and spleen has been evaluated by immunofluorescence (IF) analysis 2 weeks and 1 month after injection. We evaluated the co-expression of GFP and LSECs (Lyve-1+) or Kupffer cells (F4/80+)-specific markers on liver and spleen sections. The results showed that SEQ ID NO: 1 and SEQ ID NO: 3 were equally present in the liver and specifically drove transgene expression in LSECs as shown by IF (FIG. 14 A), with a greater signal in livers of mice injected with LV.Stab2.3-GFP.

In spleen sections of LV.Stab2.2-GFP-injected mice (comprising SEQ ID NO: 1), few GFP positive cells were detected and identified as endothelial cells according to their morphology (FIG. 14 A, upper right panel). Moreover, in spleen sections of LV.Stab2.3-GFP-injected mice (comprising SEQ ID NO: 3), a greater number of GFP+ cells were present and specifically recognized as endothelial (FIG. 14 B, right panel, quantifications bars).

Taken together all these data underline that the Stab-2 promoter-derived sequences of the present invention drive transgene expression precisely restricted into liver sinusoidal endothelial cells and in endothelial cells in the spleen.

Finally, no off-targets were detected with both lentiviral constructs containing the Stab-2 promoter derived sequences.

Molecular Characterization of Stab-2 Promoter Derived Sequence in Presence of Ets-1 Transcription Factor In order to identify TFs involved in the control of Stab-2 promoter activation, we evaluated the capacity of the SEQ ID NO: 1, SEQ ID NO: 3 to drive the expression of the luciferase reporter gene in the presence of the endothelial TF Ets-1 previously identified by an in silico analysis. By luciferase assay we identified an up-regulation of luciferase activity of both promoters when we overexpressed Ets-1 TF in 293T cells (FIG. 15 A-B). In particular, neither Stab2.2 or Stab2.3 displayed luciferase activity when transfected alone. On the contrary, co-transfection of Ets-1 resulted in induction of luciferase expression up to 30 times for Stab2.2 (FIG. 15 A) and ~25 times for Stab2.3 (FIG. 15 B). These data demonstrate that the expression of Ets-1 can turn on Stab-2 promoter and demonstrate a critical role of this TF in Stab-2 gene expression regulation.

The invention claimed is:

1. A vector comprising a nucleic acid sequence encoding a protein operably linked to a promoter sequence comprising the nucleic acid sequence of SEQ ID NO: 3, wherein the protein is a) factor VIII (FVIII) comprising the amino acid sequence of SEQ ID NO: 4, 5, 6, 7, or 8;

b) factor IX (FIX) comprising the amino acid sequence of SEQ ID NO: 9 or 10;

c) factor VII (FVII) comprising the amino acid sequence of SEQ ID NO: 11; or d) factor V (FV) comprising the amino acid sequence of SEQ ID NO: 12.

2. The vector according to claim 1, wherein the vector is a parvoviral vector, adenoviral vector, adeno-associated viral (AAV) vector, herpes simplex viral (HSV) vector, lentiviral vector, retroviral vector or non-viral vector.

3. The vector according to claim 2, wherein the retroviral vector is HIV-1 or a gamma retrovirus.

4. The vector according to claim 1, wherein the vector is a self-inactivating (SIN) lentiviral vector.

5. The vector according to claim 4, wherein the self-inactivating (SIN) lentiviral vector is prepared with a lentiviral packaging system.

6. The vector according to claim 1, wherein the vector comprises a polyadenylation sequence, a Woodchuck hepatitis post-transcriptional regulatory element (WPRE), a central polypurine tract (cPPT), a mirT sequence, or any combination thereof.

7. The vector according to claim 6, wherein the vector comprises a cPPT or an mirT selected from the group consisting of mirT-142, -3p, mirT-223, mirT-122 and any combination thereof.

8. The vector according to claim 7, wherein the mirT-142-3p has the nucleic acid sequence of SEQ ID NO: 15; the mirT-223 has the nucleic acid sequence of SEQ ID NO: 14, and the mirT-122 has the nucleic acid sequence of SEQ ID NO: 13.

9. The vector according to claim 1, wherein the vector comprises an enhancer.

10. An isolated bacterial, yeast, insect, or mammalian cell comprising the vector according to claim 1, wherein said vector is capable of expressing the protein in the cell.

11. A pharmaceutical composition comprising the vector according to claim 1 and at least one pharmaceutically acceptable excipient.

12. The vector according to claim 1, wherein the protein is the FVIII comprising the amino acid sequence of SEQ ID NO: 4, 5, 6, 7, or 8.

13. A method of treating a Factor V, VII, VIII or IX deficiency, said method comprising:

a) administering the vector of claim 1 intravenously to a mammal with a factor V, VII, VIII, or IX deficiency, such that symptoms of the factor V, VII, VIII, or IX deficiency are treated.

* * * * *

SEQUENCE LISTING

```
<160> NUMBER OF SEQ ID NOS: 21

<210> SEQ ID NO 1
<211> LENGTH: 1238
<212> TYPE: DNA
<213> ORGANISM: Artificial Sequence
<220> FEATURE:
<223> OTHER INFORMATION: Stab2 promoter derived sequence (Stab2.2)

<400> SEQUENCE: 1

cgtttccatc atggtttcca atagaattga gaataccatc tattatttat ttattcatta     60

aatattgatt gtttcagcag cagagggcag tggttgacag tactggctct ggagccacat    120

agtttgaata ctagatttac cacctattag ctgtgtggcc ttggataaat tccttaacct    180

ctctgcctca gtttcctcct ctgtaaaatg agaagaatca tcctgtttta ccaagtactg    240

tgagaattaa acaactaaat ccatggagag gcctagaata gtgactagca tgtagtaagt    300

tttcaaaaag tgatggctac tatccttaac tgttttcatt attttgaagt gcaggtctct    360

gctctaggaa tcaaggggta cagagaagat gaggctatat tcttctgtcc tcaaggcatt    420

catagctggg catgggagac agacagatag atgtgacctc ggctttcatg gctttatgtg    480

caaaattgtg ggagcatctt cagggtcctg tggaggggca gcacaggaag gcttcctgga    540

aggggtggct ttagatctgg aacttaaagg gtaagattga acctacaggc tcagtcactt    600

gttactgaag tggcatggaa aagaagaaag aatgagtcaa aaacccacct gtcagcatct    660

gcaaggagac tttttttgca gtagaggtta tccagggtga agccaccacc tcctgcaagg    720

tttctgcaac attcattcca tacctgggac cgtgctcact tatgggcact cccccaaccc    780

cgctcgacag caagcttgga cctttgcatt ggcaccaaaa ggcctgcagt gttccatggc    840
```

```
gtggttgtgg aaacattgac agggccgcag ggcagcagta ggcaggacta gaggaggggg    900

cagagtagag gagaggcagg accgttctga gagcttcgca ggcacaaaaa tcccgggcca    960

agcctctgcc tcagcccctg caggatatcc tgtcattcag caggatatat agaccattta   1020

cagtggccaa tttcaccaag actcctggat ttgccatttt tcctttctga aggcaggtct   1080

cacctatctc ctggttcgat ctaggaaaaa ggaaaggaag ggatttaaaa gtaaacagtg   1140

aaatgagaaa gaattcactg ggagtttatc aaactaagtt aaaatagcta agtcagcctg   1200

acaggtgctt ggcacagaga aggagcaaat atttcctc                           1238
```

<210> SEQ ID NO 2
<211> LENGTH: 2177
<212> TYPE: DNA
<213> ORGANISM: Artificial Sequence
<220> FEATURE:
<223> OTHER INFORMATION: Stab2 promoter derived sequence (Stab2.1)

<400> SEQUENCE: 2

```
gtctaacatg gcatttccct tagagacact gatagaacac agaatctgga ggttgccaat     60

ataaatttgc aaaaacagaa agcaaccctt agtctaaaaa gcttgggaaa tgctgcctta    120

agcaaagttg aactgttttt tgtttcattt ggttgcgttg ttttaaagga cttctcagaa    180

ctttcaatgg actaacaaac atggccaatc catgagaaag ggacatgaga gacaggcgtc    240

ccaaattatc tggcgagaga attcttcccc actaccccta cagcattttc cataactaaa    300

ttgtatttaa taaaacatta tttaggaaat gctagtatgg gctcatttta ttatttcacc    360

tggaattgag cctgttccaa gccccagatt tttatctaca tcctttagaa agaaaagaat    420

cagaaagaag catccaattt atgtccctgt tatatttttt aaggtaacac agctgctgta    480

acagataaat atcaaagtct cactggcttc acacaatcat aatccatttc tcctcaagca    540

acagtccagc gcaagtgaaa tcacccagga agctttggaa aattctcctg tgcgccactc    600

ccaggcattc tgatttggtt attctggagt ggagctaagc attaggcctt tttttttttt    660

ttttgagctc cccacccagg tttctgggct ggcctctgag ggcctatgt tggaaaagtt     720

tcctagatta tcggtcatta taaatgttgt ttcaaaagtt gaaaggagtc ggggggagag    780

agagagagag agagagaaac tttgtagaga aataaaggat catttaacca aaattagtat    840

ctgtaagtgc atgaatctcc catttaattt agtgtcatga gacatgccct ggtttgttaa    900

taagtccaaa ccttatcctt cctggtgctg ggtctgacac gtttccatca tggtttccaa    960

tagaattgag aataccatct attatttatt tattcattaa atattgattg tttcagcagc   1020

agagggcagt ggttgacagt actggctctg gagccacata gtttgaatac tagatttacc   1080

acctattagc tgtgtggcct tggataaatt ccttaacctc tctgcctcag tttcctcctc   1140

tgtaaaatga gaagaatcat cctgttttac caagtactgt gagaattaaa caactaaatc   1200

catggagagg cctagaatag tgactagcat gtagtaagtt ttcaaaaagt gatggctact   1260

atccttaact gttttcatta ttttgaagtg caggtctctg ctctaggaat caaggggtac   1320

agagaagatg aggctatatt cttctgtcct caaggcattc atagctgggc atgggagaca   1380

gacagataga tgtgacctcg gctttcatgg ctttatgtgc aaaattgtgg gagcatcttc   1440

agggtcctgt ggaggggcag cacaggaagg cttcctggaa ggggtggctt tagatctgga   1500

acttaaaggg taagattgaa cctacaggct cagtcacttg ttactgaagt ggcatggaaa   1560

agaagaaaga atgagtcaaa aacccacctg tcagcatctg caaggagact ttttttgcag   1620

tagaggttat ccagggtgaa gccaccacct cctgcaaggt ttctgcaaca ttcattccat   1680
```

acctgggacc gtgctcactt atgggcactc ccccaacccc gctcgacagc aagcttggac 1740
ctttgcattg gcaccaaaag gcctgcagtg ttccatggcg tggttgtgga aacattgaca 1800
gggccgcagg gcagcagtag gcaggactag aggagggggc agagtagagg agaggcagga 1860
ccgttctgag agcttcgcag gcacaaaaat cccgggccaa gcctctgcct cagcccctgc 1920
aggatatcct gtcattcagc aggatatata gaccatttac agtggccaat ttcaccaaga 1980
ctcctggatt tgccattttt cctttctgaa ggcaggtctc acctatctcc tggttcgatc 2040
taggaaaaag gaaaggaagg gatttaaaag taaacagtga aatgagaaag aattcactgg 2100
gagtttatca aactaagtta aaatagctaa gtcagcctga caggtgcttg gcacagagaa 2160
ggagcaaata tttcctc 2177

<210> SEQ ID NO 3
<211> LENGTH: 333
<212> TYPE: DNA
<213> ORGANISM: Artificial Sequence
<220> FEATURE:
<223> OTHER INFORMATION: Stab2 promoter derived sequence (Stab2.3)

<400> SEQUENCE: 3
tagaggagag gcaggaccgt tctgagagct tcgcaggcac aaaaatcccg ggccaagcct 60
ctgcctcagc ccctgcagga tatcctgtca ttcagcagga tatatagacc atttacagtg 120
gccaatttca ccaagactcc tggatttgcc atttttcctt tctgaaggca ggtctcacct 180
atctcctggt tcgatctagg aaaaaggaaa ggaagggatt taaaagtaaa cagtgaaatg 240
agaaagaatt cactgggagt ttatcaaact aagttaaaat agctaagtca gcctgacagg 300
tgcttggcac agagaaggag caaatatttc ctc 333

<210> SEQ ID NO 4
<211> LENGTH: 4374
<212> TYPE: DNA
<213> ORGANISM: Artificial Sequence
<220> FEATURE:
<223> OTHER INFORMATION: hBDD-FVIII

<400> SEQUENCE: 4
atgcaaatag agctctccac ctgcttcttt ctgtgccttt tgcgattctg ctttagtgcc 60
accagaagat actacctggg tgcagtggaa ctgtcatggg actatatgca aagtgatctc 120
ggtgagctgc ctgtggacgc aagatttcct cctagagtgc caaaatcttt tccattcaac 180
acctcagtcg tgtacaaaaa gactctgttt gtagaattca cggatcacct tttcaacatc 240
gctaagccaa ggccaccctg gatgggtctg ctaggtccta ccatccaggc tgaggtttat 300
gatacagtgg tcattacact taagaacatg gcttcccatc ctgtcagtct tcatgctgtt 360
ggtgtatcct actggaaagc ttctgaggga gctgaatatg atgatcagac cagtcaaagg 420
gagaaagaag atgataaagt cttccctggt ggaagccata catatgtctg gcaggtcctg 480
aaagagaatg gtccaatggc ctctgaccca ctgtgcctta cctactcata tctttctcat 540
gtggacctgg taaaagactt gaattcaggc ctcattggag ccctactagt atgtagagaa 600
gggagtctgg ccaaggaaaa gacacagacc ttgcacaaat ttatactact tttgctgta 660 tttgatgaag ggaaaagttg gcactcagaa acaaagaact ccttgatgca ggatagggat 720
gctgcatctg ctcgggcctg gcctaaaatg cacacagtca atggttatgt aaacaggtct 780
ctgccaggtc tgattggatg ccacaggaaa tcagtctatt ggcatgtgat tggaatgggc 840

-continued

```
accactcctg aagtgcactc aatattcctc gaaggtcaca catttcttgt gaggaaccat    900
cgccaggcgt ccttggaaat ctcgccaata actttcctta ctgctcaaac actcttgatg    960
gaccttggac agtttctact gttttgtcat atctcttccc accaacatga tggcatggaa   1020
gcttatgtca aagtagacag ctgtccagag gaacccccaac tacgaatgaa aaataatgaa   1080
gaagcggaag actatgatga tgatcttact gattctgaaa tggatgtggt caggtttgat   1140
gatgacaact ctccttcctt tatccaaatt cgctcagttg ccaagaagca tcctaaaact   1200
tgggtacatt acattgctgc tgaagaggag gactgggact atgctccctt agtcctcgcc   1260
cccgatgaca gaagttataa aagtcaatat ttgaacaatg gccctcagcg gattggtagg   1320
aagtacaaaa aagtccgatt tatggcatac acagatgaaa cctttaagac tcgtgaagct   1380
attcagcatg aatcaggaat cttgggacct ttactttatg gggaagttgg agacacactg   1440
ttgattatat ttaagaatca agcaagcaga ccatataaca tctaccctca cggaatcact   1500
gatgtccgtc ctttgtattc aaggagatta ccaaaaggtg taaaacattt gaaggatttt   1560
ccaattctgc caggagaaat attcaaatat aaatggacag tgactgtaga agatgggcca   1620
actaaatcag atcctcggtg cctgacccgc tattactcta gtttcgttaa tatggagaga   1680
gatctagctt caggactcat tggccctctc ctcatctgct acaaagaatc tgtagatcaa   1740
agaggaaacc agataatgtc agacaagagg aatgtcatcc tgttttctgt atttgatgag   1800
aaccgaagct ggtacctcac agagaatata caacgctttc tccccaatcc agctggagtg   1860
cagcttgagg atccagagtt ccaagcctcc aacatcatgc acagcatcaa tggctatgtt   1920
tttgatagtt tgcagttgtc agtttgtttg catgaggtgg catactggta cattctaagc   1980
attggagcac agactgactt cctttctgtc ttcttctctg gatatacctt caaacacaaa   2040
atggtctatg aagacacact caccctattc ccattctcag gagaaactgt cttcatgtcg   2100
atggaaaacc caggtctatg gattctgggg tgccacaact cagactttcg gaacagaggc   2160
atgaccgcct tactgaaggt ttctagttgt gacaagaaca ctggtgatta ttacgaggac   2220
agttatgaag atatttcagc atacttgctg agtaaaaaca atgccattga accaagaagc   2280
ttctcccaaa acccaccagt cttgaaacgc catcaacggg aaataactcg tactactctt   2340
cagtcagatc aagaggaaat tgactatgat gataccatat cagttgaaat gaagaaggaa   2400
gattttgaca tttatgatga ggatgaaaat cagagccccc gcagctttca aaagaaaaca   2460
cgacactatt ttattgctgc agtggagagg ctctgggatt atgggatgag tagctcccca   2520
catgttctaa gaaacagggc tcagagtggc agtgtccctc agttcaagaa agttgttttc   2580
caggaattta ctgatggctc ctttactcag cccttatacc gtggagaact aaatgaacat   2640
ttgggactcc tggggccata tataagagca gaagttgaag ataatatcat ggtaactttc   2700
agaaatcagg cctctcgtcc ctattccttc tattctagcc ttatttctta tgaggaagat   2760
cagaggcaag gagcagaacc tagaaaaaac tttgtcaagc ctaatgaaac caaaacttac   2820
ttttggaaag tgcaacatca tatggcaccc actaaagatg agtttgactg caaagcctgg   2880
gcttatttct ctgatgttga cctggaaaaa gatgtgcact caggcctgat tggacccctt   2940
ctggtctgcc acactaacac actgaaccct gctcatggga gacaagtgac agtacaggaa   3000
tttgctctgt tttcaccat ctttgatgag accaaaagct ggtacttcac tgaaaatatg   3060
gaaagaaact gcagggctcc ctgcaatatc cagatggaag atcccacttt taaagagaat   3120
tatcgcttcc atgcaatcaa tggctacata atggatacac tacctggctt agtaatggct   3180
caggatcaaa ggattcgatg gtatctgctc agcatgggca gcaatgaaaa catccattct   3240
```

```
attcatttca gtggacatgt gttcaccgta cgaaaaaaag aggagtataa aatggcactg   3300
tacaatctct atccaggtgt ttttgagaca gtggaaatgt taccatccaa agctggaatt   3360
tggcgggtgg aatgccttat tggcgagcat ctacatgctg ggatgagcac actttttctg   3420
gtgtacagca ataagtgtca gactcccctg ggaatggctt ctggacacat tagagatttt   3480
cagattacag cttcaggaca atatggacag tgggccccaa agctggccag acttcattat   3540
tccggatcaa tcaatgcctg gagcaccaag gagccctttt cttggatcaa ggtggatctg   3600
ttggcaccaa tgattattca cggcatcaag acccagggtg cccgtcagaa gttctccagc   3660
ctctacatct ctcagtttat catcatgtat agtcttgatg ggaagaagtg gcagacttat   3720
cgaggaaatt ccactggaac cttaatggtc ttctttggca atgtggattc atctgggata   3780
aaacacaata tttttaaccc tccaattatt gctcgataca tccgtttgca cccaactcat   3840
tatagcattc gcagcactct tcgcatggag ttgatgggct gtgatttaaa tagttgcagc   3900
atgccattgg gaatggagag taaagcaata tcagatgcac agattactgc ttcatcctac   3960
tttaccaata tgtttgccac ctggtctcct tcaaaagctc gacttcacct ccaagggagg   4020
agtaatgcct ggagacctca ggtgaataat ccaaaagagt ggctgcaagt ggacttccag   4080
aagacaatga aagtcacagg agtaactact cagggagtaa aatctctgct taccagcatg   4140
tatgtgaagg agttcctcat ctccagcagt caagatggcc atcagtggac tctctttttt   4200
cagaatggca aagtaaaggt tttcaggga aatcaagact ccttcacacc tgtggtgaac   4260
tctctagacc caccgttact gactcgctac cttcgaattc acccccagag ttgggtgcac   4320
cagattgccc tgaggatgga ggttctgggc tgcgaggcac aggacctcta ctga         4374
```

<210> SEQ ID NO 5
<211> LENGTH: 4377
<212> TYPE: DNA
<213> ORGANISM: Artificial Sequence
<220> FEATURE:
<223> OTHER INFORMATION: hBDD-FVIII CO

<400> SEQUENCE: 5

```
atgcagatcg agctgtccac ctgctttttt ctgtgcctgc tgcggttctg cttcagcgcc     60
acccggcggt actacctggg cgccgtggag ctgtcctggg actacatgca gagcgacctg    120
ggcgagctgc ccgtggacgc ccggttcccc cccagagtgc ccaagagctt ccccttcaac    180
accagcgtgg tgtacaagaa aaccctgttc gtggagttca ccgaccacct gttcaatatc    240
gccaagccca ggccccccctg gatgggcctg ctgggcccca ccatccaggc cgaggtgtac    300
gacaccgtgg tgatcaccct gaagaacatg gccagccacc ccgtgagcct gcacgccgtg    360
ggcgtgagct actggaaggc cagcgagggc gccgagtacg acgaccagac cagccagcgg    420
gagaaagaag atgacaaggt gttccctggc ggcagccaca cctacgtgtg gcaggtgctg    480
aaagaaaacg gccccatggc ctccgacccc ctgtgcctga cctacagcta cctgagccac    540
gtggacctgg tgaaggacct gaacagcggc ctgatcggcg ctctgctcgt ctgccgggag    600
ggcagcctgg ccaaagagaa aacccagacc ctgcacaagt tcatcctgct gttcgccgtg    660
ttcgacgagg gcaagagctg gcacagcgag acaaagaaca gcctgatgca ggaccgggac    720
gccgcctctg ccagagcctg gcccaagatg cacaccgtga acggctacgt gaacagaagc    780
ctgcccggcc tgattggctg ccaccggaag agcgtgtact ggcacgtgat cggcatgggc    840
accacacccg aggtgcacag catctttctg gaagggcaca cctttctggt ccggaaccac    900
```

-continued

```
cggcaggcca gcctggaaat cagccctatc accttcctga ccgcccagac actgctgatg    960
gacctgggcc agttcctgct gttttgccac atcagctctc accagcacga cggcatggaa   1020
gcctacgtga aggtggactc ttgccccgag gaaccccagc tgcggatgaa gaacaacgag   1080
gaagccgagg actacgacga cgacctgacc gacagcgaga tggacgtggt gcggttcgac   1140
gacgacaaca gccccagctt catccagatc agaagcgtgg ccaagaagca ccccaagacc   1200
tgggtgcact atatcgccgc cgaggaagag gactgggact acgcccccct ggtgctggcc   1260
cccgacgaca gaagctacaa gagccagtac ctgaacaatg gcccccagcg gatcggccgg   1320
aagtacaaga aagtgcggtt catggcctac accgacgaga cattcaagac ccgggaggcc   1380
atccagcacg agagcggcat cctgggcccc ctgctgtacg gcgaagtggg cgacacactg   1440
ctgatcatct tcaagaacca ggctagccgg ccctacaaca tctacccccca cggcatcacc   1500
gacgtgcggc ccctgtacag caggcggctg cccaagggcg tgaagcacct gaaggacttc   1560
cccatcctgc ccggcgagat cttcaagtac aagtggaccg tgaccgtgga ggacggcccc   1620
accaagagcg accccagatg cctgacccgg tactacagca gcttcgtgaa catggaacgg   1680
gacctggcct ccgggctgat cggacctctg ctgatctgct acaaagaaag cgtggaccag   1740
cggggcaacc agatcatgag cgacaagcgg aacgtgatcc tgttcagcgt gttcgatgag   1800
aaccggtcct ggtatctgac cgagaacatc cagcggtttc tgcccaaccc tgccggcgtg   1860
cagctggaag atcccgagtt ccaggccagc aacatcatgc actccatcaa tggctacgtg   1920
ttcgactctc tgcagctctc cgtgtgtctg cacgaggtgg cctactggta catcctgagc   1980
atcggcgccc agaccgactt cctgagcgtg ttcttcagcg gctacacctt caagcacaag   2040
atggtgtacg aggacaccct gaccctgttc cctttcagcg gcgagacagt gttcatgagc   2100
atggaaaacc ccggcctgtg gattctgggc tgccacaaca gcgacttccg gaaccggggc   2160
atgaccgccc tgctgaaggt gtccagctgc gacaagaaca ccggcgacta ctacgaggac   2220
agctacgagg atatcagcgc ctacctgctg tccaagaaca acgccatcga accccggagc   2280
ttcagccaga acccccccgt gctgacgcgt caccagcggg agatcacccg gacaaccctg   2340
cagtccgacc aggaagagat cgattacgac gacaccatca gcgtggagat gaagaaagag   2400
gatttcgata tctacgacga ggacgagaac cagagcccca gaagcttcca gaagaaaacc   2460
cggcactact tcattgccgc cgtggagagg ctgtgggact acggcatgag ttctagcccc   2520
cacgtgctgc ggaaccgggc ccagagcggc agcgtgcccc agttcaagaa agtggtgttc   2580
caggaattca cagacggcag cttcacccag cctctgtata gaggcgagct gaacgagcac   2640
ctggggctgc tggggcccta catcagggcc gaagtggagg acaacatcat ggtgaccttc   2700
cggaatcagg ccagcagacc ctactccttc tacagcagcc tgatcagcta cgaagaggac   2760
cagcggcagg gcgccgaacc ccggaagaac ttcgtgaagc ccaacgaaac caagacctac   2820
ttctggaaag tgcagcacca catggccccc accaaggacg agttcgactg caaggcctgg   2880
gcctacttca gcgacgtgga tctggaaaag gacgtgcact ctggactgat tggcccactc   2940
ctggtctgcc acactaacac cctcaacccc gcccacggcc gccaggtgac cgtgcaggaa   3000
ttcgccctgt tcttcaccat cttcgacgag acaaagtcct ggtacttcac cgagaatatg   3060
gaacggaact gcagagcccc ctgcaacatc cagatggaag atcctacctt caaagagaac   3120
taccggttcc acgccatcaa cggctacatc atggacaccc tgcctggcct ggtgatggcc   3180
caggaccaga gaatccggtg gtatctgctg tccatgggca gcaacgagaa tatccacagc   3240
atccacttca gcggccacgt gttcaccgtg cggaagaaag aagagtacaa gatggccctg   3300
```

tacaacctgt accccggcgt gttcgagaca gtggagatgc tgcccagcaa ggccggcatc 3360
tggcgggtgg agtgtctgat cggcgagcac ctgcacgctg gcatgagcac cctgtttctg 3420
gtgtacagca acaagtgcca gaccccactg ggcatggcct ctggccacat ccgggacttc 3480
cagatcaccg cctccggcca gtacggccag tgggccccca agctggccag actgcactac 3540
agcggcagca tcaacgcctg gtccaccaaa gagcccttca gctggatcaa ggtggacctg 3600
ctggccccta tgatcatcca cggcattaag acccagggcg ccaggcagaa gttcagcagc 3660
ctgtacatca gccagttcat catcatgtac agcctggacg gcaagaagtg gcagacctac 3720
cggggcaaca gcaccggcac cctgatggtg ttcttcggca atgtggacag cagcggcatc 3780
aagcacaaca tcttcaaccc ccccatcatt gcccggtaca tccggctgca ccccacccac 3840
tacagcatta gatccacact gagaatggaa ctgatgggct gcgacctgaa ctcctgcagc 3900
atgcctctgg gcatggaaag caaggccatc agcgacgccc agatcacagc cagcagctac 3960
ttcaccaaca tgttcgccac ctggtccccc tccaaggcca ggctgcacct gcagggccgg 4020
tccaacgcct ggcggcctca ggtcaacaac cccaaagaat ggctgcaggt ggactttcag 4080
aaaaccatga aggtgaccgg cgtgaccacc cagggcgtga aaagcctgct gaccagcatg 4140
tacgtgaaag agtttctgat cagcagctct caggatggcc accagtggac cctgttcttt 4200
cagaacggca aggtgaaagt gttccagggc aaccaggact ccttcacccc cgtggtgaac 4260
tccctggacc ccccctgct gacccgctac ctgagaatcc acccccagtc ttgggtgcac 4320
cagatcgccc tcaggatgga agtcctggga tgtgaggccc aggatctgta ctgatga 4377

<210> SEQ ID NO 6
<211> LENGTH: 4374
<212> TYPE: DNA
<213> ORGANISM: Artificial Sequence
<220> FEATURE:
<223> OTHER INFORMATION: FVIII-RH

<400> SEQUENCE: 6
atgcaaatag agctctccac ctgcttcttt ctgtgccttt tgcgattctg ctttagtgcc 60
accagaagat actacctggg tgcagtggaa ctgtcatggg actatatgca aagtgatctc 120
ggtgagctgc ctgtggacgc aagatttcct cctagagtgc caaaatcttt tccattcaac 180
acctcagtcg tgtacaaaaa gactctgttt gtagaattca cggatcacct tttcaacatc 240
gctaagccaa ggccaccctg gatgggtctg ctaggtccta ccatccaggc tgaggtttat 300
gatacagtgg tcattacact taagaacatg gcttcccatc ctgtcagtct tcatgctgtt 360
ggtgtatcct actggaaagc ttctgaggga gctgaatatg atgatcagac cagtcaaagg 420
gagaaagaag atgataaagt cttccctggt ggaagccata catatgtctg gcaggtcctg 480
aaagagaatg gtccaatggc ctctgaccca ctgtgcctta cctactcata tctttctcat 540
gtggacctgg taaaagactt gaattcaggc ctcattggag ccctactagt atgtagagaa 600
gggagtctgg ccaaggaaaa gacacagacc ttgcacaaat ttatactact ttttgctgta 660
tttgatgaag ggaaaagttg gcactcagaa acaaagaact ccttgatgca ggatagggat 720
gctgcatctg ctcgggcctg gcctaaaatg cacacagtca atggttatgt aaacaggtct 780
ctgccaggtc tgattggatg ccacaggaaa tcagtctatt ggcatgtgat tggaatgggc 840
accactcctg aagtgcactc aatattcctc gaaggtcaca catttcttgt gaggaaccat 900
cgccaggcgt ccttggaaat ctcgccaata actttcctta ctgctcaaac actcttgatg 960

```
gaccttggac agtttctact gttttgtcat atctcttccc accaacatga tggcatggaa   1020
gcttatgtca aagtagacag ctgtccagag gaaccccaac tacgaatgaa aaataatgaa   1080
gaagcggaag actatgatga tgatcttact gattctgaaa tggatgtggt caggtttgat   1140
gatgacaact ctccttcctt tatccaaatt cgctcagttg ccaagaagca tcctaaaact   1200
tgggtacatt acattgctgc tgaagaggag gactgggact atgctccctt agtcctcgcc   1260
cccgatgaca gaagttataa aagtcaatat ttgaacaatg gccctcagcg gattggtagg   1320
aagtacaaaa aagtccgatt tatggcatac acagatgaaa cctttaagac tcgtgaagct   1380
attcagcatg aatcaggaat cttgggacct ttactttatg gggaagttgg agacacactg   1440
ttgattatat ttaagaatca agcaagcaga ccatataaca tctaccctca cggaatcact   1500
gatgtccgtc ctttgtattc aaggagatta ccaaaaggtg taaaacattt gaaggatttt   1560
ccaattctgc caggagaaat attcaaatat aaatggacag tgactgtaga agatgggcca   1620
actaaatcag atcctcggtg cctgacccgc tattactcta gtttcgttaa tatggagaga   1680
gatctagctt caggactcat tggccctctc ctcatctgct acaaagaatc tgtagatcaa   1740
agaggaaacc agataatgtc agacaagagg aatgtcatcc tgttttctgt atttgatgag   1800
aaccgaagct ggtacctcac agagaatata caacgctttc tccccaatcc agctggagtg   1860
cagcttgagg atccagagtt ccaagcctcc aacatcatgc acagcatcaa tggctatgtt   1920
tttgatagtt tgcagttgtc agtttgtttg catgaggtgg catactggta cattctaagc   1980
attggagcac agactgactt cctttctgtc ttcttctctg gatatacctt caaacacaaa   2040
atggtctatg aagacacact caccctattc ccattctcag gagaaactgt cttcatgtcg   2100
atggaaaacc caggtctatg gattctgggg tgccacaact cagactttcg gaacagaggc   2160
atgaccgcct tactgaaggt ttctagttgt gacaagaaca ctggtgatta ttacgaggac   2220
agttatgaag atatttcagc atacttgctg agtaaaaaca atgccattga accaagaagc   2280
ttctcccaaa acccaccagt cttgaaacac catcaacggg aaataactcg tactactctt   2340
cagtcagatc aagaggaaat tgactatgat gataccatat cagttgaaat gaagaaggaa   2400
gattttgaca tttatgatga ggatgaaaat cagagccccc gcagctttca aaagaaaaca   2460
cgacactatt ttattgctgc agtggagagg ctctgggatt atgggatgag tagctcccca   2520
catgttctaa gaaacagggc tcagagtggc agtgtccctc agttcaagaa agttgttttc   2580
caggaattta ctgatggctc ctttactcag cccttatacc gtggagaact aaatgaacat   2640
ttgggactcc tggggccata tataagagca gaagttgaag ataatatcat ggtaactttc   2700
agaaatcagg cctctcgtcc ctattccttc tattctagcc ttatttctta tgaggaagat   2760
cagaggcaag gagcagaacc tagaaaaaac tttgtcaagc ctaatgaaac caaaacttac   2820
ttttggaaag tgcaacatca tatggcaccc actaaagatg agtttgactg caaagcctgg   2880
gcttatttct ctgatgttga cctggaaaaa gatgtgcact caggcctgat tggacccctt   2940
ctggtctgcc acactaacac actgaaccct gctcatggga gacaagtgac agtacaggaa   3000
tttgctctgt tttcaccat ctttgatgag accaaaagct ggtacttcac tgaaaatatg    3060
gaaagaaact gcagggctcc ctgcaatatc cagatggaag atcccacttt taaagagaat   3120
tatcgcttcc atgcaatcaa tggctacata atggatacac tacctggctt agtaatggct   3180
caggatcaaa ggattcgatg gtatctgctc agcatgggca gcaatgaaaa catccattct   3240
attcatttca gtggacatgt gttcaccgta cgaaaaaaag aggagtataa aatggcactg   3300
tacaatctct atccaggtgt ttttgagaca gtggaaatgt taccatccaa agctggaatt   3360
```

tggcgggtgg aatgccttat tggcgagcat ctacatgctg ggatgagcac actttttctg 3420
gtgtacagca ataagtgtca gactcccctg ggaatggctt ctggacacat tagagatttt 3480
cagattacag cttcaggaca atatggacag tgggccccaa agctggccag acttcattat 3540
tccggatcaa tcaatgcctg gagcaccaag gagccctttt cttggatcaa ggtggatctg 3600
ttggcaccaa tgattattca cggcatcaag acccagggtg cccgtcagaa gttctccagc 3660
ctctacatct ctcagtttat catcatgtat agtcttgatg ggaagaagtg gcagacttat 3720
cgaggaaatt ccactggaac cttaatggtc ttctttggca atgtggattc atctgggata 3780
aaacacaata tttttaaccc tccaattatt gctcgataca tccgtttgca cccaactcat 3840
tatagcattc gcagcactct tcgcatggag ttgatgggct gtgatttaaa tagttgcagc 3900
atgccattgg gaatggagag taaagcaata tcagatgcac agattactgc ttcatcctac 3960
tttaccaata tgtttgccac ctggtctcct tcaaaagctc gacttcacct ccaagggagg 4020
agtaatgcct ggagacctca ggtgaataat ccaaaagagt ggctgcaagt ggacttccag 4080
aagacaatga aagtcacagg agtaactact cagggagtaa aatctctgct taccagcatg 4140
tatgtgaagg agttcctcat ctccagcagt caagatggcc atcagtggac tctctttttt 4200
cagaatggca aagtaaaggt ttttcaggga aatcaagact ccttcacacc tgtggtgaac 4260
tctctagacc caccgttact gactcgctac cttcgaattc acccccagag ttgggtgcac 4320
cagattgccc tgaggatgga ggttctgggc tgcgaggcac aggacctcta ctga 4374

<210> SEQ ID NO 7
<211> LENGTH: 4377
<212> TYPE: DNA
<213> ORGANISM: Artificial Sequence
<220> FEATURE:
<223> OTHER INFORMATION: FVIII-RH CO

<400> SEQUENCE: 7
atgcagatcg agctgtccac ctgctttttt ctgtgcctgc tgcggttctg cttcagcgcc 60
acccggcggt actacctggg cgccgtggag ctgtcctggg actacatgca gagcgacctg 120
ggcgagctgc ccgtggacgc ccggttcccc cccagagtgc ccaagagctt ccccttcaac 180
accagcgtgg tgtacaagaa aaccctgttc gtggagttca ccgaccacct gttcaatatc 240
gccaagccca ggccccccctg gatgggcctg ctgggcccca ccatccaggc cgaggtgtac 300
gacaccgtgg tgatcaccct gaagaacatg gccagccacc ccgtgagcct gcacgccgtg 360
ggcgtgagct actggaaggc cagcgagggc gccgagtacg acgaccagac cagccagcgg 420
gagaaagaag atgacaaggt gttccctggc ggcagccaca cctacgtgtg gcaggtgctg 480
aaagaaaacg gccccatggc ctccgacccc ctgtgcctga cctacagcta cctgagccac 540
gtggacctgg tgaaggacct gaacagcggc ctgatcggcg ctctgctcgt ctgccgggag 600
ggcagcctgg ccaaagagaa aacccagacc ctgcacaagt tcatcctgct gttcgccgtg 660
ttcgacgagg gcaagagctg gcacagcgag acaaagaaca gcctgatgca ggaccgggac 720
gccgcctctg ccagagcctg gcccaagatg cacaccgtga acggctacgt gaacagaagc 780
ctgcccggcc tgattggctg ccaccggaag agcgtgtact ggcacgtgat cggcatgggc 840
accacacccg aggtgcacag catctttctg gaagggcaca cctttctggt ccggaaccac 900
cggcaggcca gcctggaaat cagccctatc accttcctga ccgcccagac actgctgatg 960
gacctgggcc agttcctgct gttttgccac atcagctctc accagcacga cggcatggaa 1020

-continued

```
gcctacgtga aggtggactc ttgccccgag gaaccccagc tgcggatgaa gaacaacgag   1080
gaagccgagg actacgacga cgacctgacc gacagcgaga tggacgtggt gcggttcgac   1140
gacgacaaca gccccagctt catccagatc agaagcgtgg ccaagaagca ccccaagacc   1200
tgggtgcact atatcgccgc cgaggaagag gactgggact acgccccccct ggtgctggcc   1260
cccgacgaca gaagctacaa gagccagtac ctgaacaatg gcccccagcg gatcggccgg   1320
aagtacaaga aagtgcggtt catggcctac accgacgaga cattcaagac ccgggaggcc   1380
atccagcacg agagcggcat cctgggcccc ctgctgtacg gcgaagtggg cgacacactg   1440
ctgatcatct tcaagaacca ggctagccgg ccctacaaca tctaccccca cggcatcacc   1500
gacgtgcggc ccctgtacag caggcggctg cccaagggcg tgaagcacct gaaggacttc   1560
cccatcctgc ccggcgagat cttcaagtac aagtggaccg tgaccgtgga ggacggcccc   1620
accaagagcg accccagatg cctgacccgg tactacagca gcttcgtgaa catggaacgg   1680
gacctggcct ccgggctgat cggacctctg ctgatctgct acaaagaaag cgtggaccag   1740
cggggcaacc agatcatgag cgacaagcgg aacgtgatcc tgttcagcgt gttcgatgag   1800
aaccggtcct ggtatctgac cgagaacatc cagcggtttc tgcccaaccc tgccggcgtg   1860
cagctggaag atcccgagtt ccaggccagc aacatcatgc actccatcaa tggctacgtg   1920
ttcgactctc tgcagctctc cgtgtgtctg cacgaggtgg cctactggta catcctgagc   1980
atcggcgccc agaccgactt cctgagcgtg ttcttcagcg gctacacctt caagcacaag   2040
atggtgtacg aggacaccct gaccctgttc cctttcagcg gcgagacagt gttcatgagc   2100
atggaaaacc ccggcctgtg gattctgggc tgccacaaca gcgacttccg gaaccggggc   2160
atgaccgccc tgctgaaggt gtccagctgc gacaagaaca ccggcgacta ctacgaggac   2220
agctacgagg atatcagcgc ctacctgctg tccaagaaca acgccatcga accccggagc   2280
ttcagccaga accccccccgt gctgacgcat caccagcggg agatcacccg gacaaccctg   2340
cagtccgacc aggaagagat cgattacgac gacaccatca gcgtggagat gaagaaagag   2400
gatttcgata tctacgacga ggacgagaac cagagcccca gaagcttcca gaagaaaacc   2460
cggcactact tcattgccgc cgtggagagg ctgtgggact acggcatgag ttctagcccc   2520
cacgtgctgc ggaaccgggc ccagagcggc agcgtgcccc agttcaagaa agtggtgttc   2580
caggaattca cagacggcag cttcacccag cctctgtata gaggcgagct gaacgagcac   2640
ctggggctgc tggggcccta catcagggcc gaagtggagg acaacatcat ggtgaccttc   2700
cggaatcagg ccagcagacc ctactccttc tacagcagcc tgatcagcta cgaagaggac   2760
cagcggcagg gcgccgaacc ccggaagaac ttcgtgaagc ccaacgaaac caagacctac   2820
ttctggaaag tgcagcacca catggccccc accaaggacg agttcgactg caaggcctgg   2880
gcctacttca gcgacgtgga tctggaaaag gacgtgcact ctggactgat tggcccactc   2940
ctggtctgcc acactaacac cctcaacccc gcccacggcc gccaggtgac cgtgcaggaa   3000
ttcgccctgt tcttcaccat cttcgacgag acaaagtcct ggtacttcac cgagaatatg   3060
gaacggaact gcagagcccc ctgcaacatc cagatggaag atcctacctt caaagagaac   3120
taccggttcc acgccatcaa cggctacatc atggacaccc tgcctggcct ggtgatggcc   3180
caggaccaga gaatccggtg gtatctgctg tccatgggca gcaacgagaa tatccacagc   3240
atccacttca gcggccacgt gttcaccgtg cggaagaaag aagagtacaa gatggccctg   3300
tacaacctgt accccggcgt gttcgagaca gtggagatgc tgcccagcaa ggccggcatc   3360
tggcgggtgg agtgtctgat cggcgagcac ctgcacgctg gcatgagcac cctgtttctg   3420
```

```
gtgtacagca acaagtgcca gaccccactg ggcatggcct ctggccacat ccgggacttc   3480

cagatcaccg cctccggcca gtacggccag tgggccccca agctggccag actgcactac   3540

agcggcagca tcaacgcctg gtccaccaaa gagcccttca gctggatcaa ggtggacctg   3600

ctggccccta tgatcatcca cggcattaag acccagggcg ccaggcagaa gttcagcagc   3660

ctgtacatca gccagttcat catcatgtac agcctggacg gcaagaagtg gcagacctac   3720

cggggcaaca gcaccggcac cctgatggtg ttcttcggca atgtggacag cagcggcatc   3780

aagcacaaca tcttcaaccc ccccatcatt gcccggtaca tccggctgca ccccacccac   3840

tacagcatta gatccacact gagaatggaa ctgatgggct gcgacctgaa ctcctgcagc   3900

atgcctctgg gcatggaaag caaggccatc agcgacgccc agatcacagc cagcagctac   3960

ttcaccaaca tgttcgccac ctggtccccc tccaaggcca ggctgcacct gcagggccgg   4020

tccaacgcct ggcggcctca ggtcaacaac cccaaagaat ggctgcaggt ggactttcag   4080

aaaaccatga aggtgaccgg cgtgaccacc cagggcgtga aaagcctgct gaccagcatg   4140

tacgtgaaag agtttctgat cagcagctct caggatggcc accagtggac cctgttcttt   4200

cagaacggca aggtgaaagt gttccagggc aaccaggact ccttcacccc cgtggtgaac   4260

tccctggacc cccccctgct gacccgctac ctgagaatcc acccccagtc ttgggtgcac   4320

cagatcgccc tcaggatgga agtcctggga tgtgaggccc aggatctgta ctgatga      4377
```

```
<210> SEQ ID NO 8
<211> LENGTH: 4785
<212> TYPE: DNA
<213> ORGANISM: Artificial Sequence
<220> FEATURE:
<223> OTHER INFORMATION: FVIII-N6

<400> SEQUENCE: 8

atgcaaagtg atctcggtga gctgcctgtg gacgcaagat ttcctcctag agtgccaaaa     60

tcttttccat tcaacacctc agtcgtgtac aaaaagactc tgtttgtaga attcacggat    120

caccttttca acatcgctaa gccaaggcca ccctggatgg gtctgctagg tcctaccatc    180

caggctgagg tttatgatac agtggtcatt acacttaaga acatggcttc ccatcctgtc    240

agtcttcatg ctgttggtgt atcctactgg aaagcttctg agggagctga atatgatgat    300

cagaccagtc aaagggagaa agaagatgat aaagtcttcc ctggtggaag ccatacatat    360

gtctggcagg tcctgaaaga gaatggtcca atggcctctg acccactgtg ccttacctac    420

tcatatcttt ctcatgtgga cctggtaaaa gacttgaatt caggcctcat tggagcccta    480

ctagtatgta gagaagggag tctggccaag gaaaagacac agaccttgca caaatttata    540

ctactttttg ctgtatttga tgaagggaaa agttggcact cagaaacaaa gaactccttg    600

atgcaggata gggatgctgc atctgctcgg gcctggccta aaatgcacac agtcaatggt    660

tatgtaaaca ggtctctgcc aggtctgatt ggatgccaca ggaaatcagt ctattggcat    720

gtgattggaa tgggcaccac tcctgaagtg cactcaatat tcctcgaagg tcacacattt    780

cttgtgagga accatcgcca ggcgtccttg gaaatctcgc caataacttt ccttactgct    840

caaacactct tgatggacct tggacagttt ctactgtctt gtcatatctc ttcccaccaa    900

catgatggca tggaagctta tgtcaaagta gacagctgtc cagaggaacc ccaactacga    960

atgaaaaata atgaagaagc ggaagactat gatgatgatc ttactgattc tgaaatggat   1020

gtggtcaggt ttgatgatga caactctcct tcctttatcc aaattcgctc agttgccaag   1080
```

```
aagcatccta aaacttgggt acattacatt gctgctgaag aggaggactg ggactatgct   1140
cccttagtcc tcgcccccga tgacagaagt tataaaagtc aatatttgaa caatggccct   1200
cagcggattg gtaggaagta caaaaaagtc cgatttatgg catacacaga tgaaaccttt   1260
aagactcgtg aagctattca gcatgaatca ggaatcttgg gacctttact ttatggggaa   1320
gttggagaca cactgttgat tatatttaag aatcaagcaa gcagaccata taacatctac   1380
cctcacggaa tcactgatgt ccgtcctttg tattcaagga gattaccaaa aggtgtaaaa   1440
catttgaagg attttccaat tctgccagga gaaatattca aatataaatg gacagtgact   1500
gtagaagatg ggccaactaa atcagatcct cggtgcctga cccgctatta ctctagtttc   1560
gttaatatgg agagagatct agcttcagga ctcattggcc ctctcctcat ctgctacaaa   1620
gaatctgtag atcaaagagg aaaccagata atgtcagaca agaggaatgt catcctgttt   1680
tctgtatttg atgagaaccg aagctggtac ctcacagaga atatacaacg ctttctcccc   1740
aatccagctg gagtgcagct tgaggatcca gagttccaag cctccaacat catgcacagc   1800
atcaatggct atgtttttga tagtttgcag ttgtcagttt gtttgcatga ggtggcatac   1860
tggtacattc taagcattgg agcacagact gacttccttt ctgtcttctt ctctggatat   1920
accttcaaac acaaaatggt ctatgaagac acactcaccc tattcccatt ctcaggagaa   1980
actgtcttca tgtcgatgga aaacccaggt ctatggattc tggggtgcca caactcagac   2040
tttcggaaca gaggcatgac cgccttactg aaggtttcta gttgtgacaa gaacactggt   2100
gattattacg aggacagtta tgaagatatt tcagcatact tgctgagtaa aaacaatgcc   2160
attgaaccaa gaagcttctc ccagaattca agacacccta gcactaggca aaagcaattt   2220
aatgccacca caattccaga aaatgacata gagaagactg acccttggtt tgcacacaga   2280
acacctatgc ctaaaataca aaatgtctcc tctagtgatt tgttgatgct cttgcgacag   2340
agtcctactc cacatgggct atccttatct gatctccaag aagccaaata tgagactttt   2400
tctgatgatc catcacctgg agcaatagac agtaataaca gcctgtctga aatgacacac   2460
ttcaggccac agctccatca cagtggggac atggtattta cccctgagtc aggcctccaa   2520
ttaagattaa atgagaaact ggggacaact gcagcaacag agttgaagaa acttgatttc   2580
aaagtttcta gtacatcaaa taatctgatt tcaacaattc catcagacaa tttggcagca   2640
ggtactgata atacaagttc cttaggaccc ccaagtatgc cagttcatta tgatagtcaa   2700
ttagatacca ctctatttgg caaaaagtca tctcccctta ctgagtctgg tggacctctg   2760
agcttgagtg aagaaaataa tgattcaaag ttgttagaat caggtttaat gaatagccaa   2820
gaaagttcat ggggaaaaaa tgtatcgacg cgtagctttc aaaagaaaac acgacactat   2880
tttattgctg cagtggagag gctctgggat tatgggatga gtagctcccc acatgttcta   2940
agaaacaggg ctcagagtgg cagtgtccct cagttcaaga aagttgtttt ccaggaattt   3000
actgatggct cctttactca gcccttatac cgtggagaac taaatgaaca tttgggactc   3060
ctggggccat atataagagc agaagttgaa gataatatca tggtaacttt cagaaatcag   3120
gcctctcgtc cctattcctt ctattctagc cttatttctt atgaggaaga tcagaggcaa   3180
ggagcagaac ctagaaaaaa ctttgtcaag cctaatgaaa ccaaaactta cttttggaaa   3240
gtgcaacatc atatggcacc cactaaagat gagtttgact gcaaagcctg ggcttatttc   3300
tctgatgttg acctggaaaa agatgtgcac tcaggcctga ttggacccct tctggtctgc   3360
cacactaaca cactgaaccc tgctcatggg agacaagtga cagtacagga atttgctctg   3420
tttttcacca tctttgatga gaccaaaagc tggtacttca ctgaaaatat ggaaagaaac   3480
```

tgcagggctc cctgcaatat ccagatggaa gatcccactt ttaaagagaa ttatcgcttc 3540
catgcaatca atggctacat aatggataca ctacctggct tagtaatggc tcaggatcaa 3600
aggattcgat ggtatctgct cagcatgggc agcaatgaaa acatccattc tattcatttc 3660
agtggacatg tgttcactgt acgaaaaaaa gaggagtata aaatggcact gtacaatctc 3720
tatccaggtg tttttgagac agtggaaatg ttaccatcca aagctggaat ttggcgggtg 3780
gaatgcctta ttggcgagca tctacatgct gggatgagca cactttttct ggtgtacagc 3840
aataagtgtc agactcccct gggaatggct tctggacaca ttagagattt tcagattaca 3900
gcttcaggac aatatggaca gtgggcccca aagctggcca gacttcatta ttccggatca 3960
atcaatgcct ggagcaccaa ggagcccttt tcttggatca aggtggatct gttggcacca 4020
atgattattc acggcatcaa gacccagggt gcccgtcaga agttctccag cctctacatc 4080
tctcagttta tcatcatgta tagtcttgat gggaagaagt ggcagactta tcgaggaaat 4140
tccactggaa ccttaatggt cttctttggc aatgtggatt catctgggat aaaacacaat 4200
atttttaacc ctccaattat tgctcgatac atccgtttgc acccaactca ttatagcatt 4260
cgcagcactc ttcgcatgga gttgatgggc tgtgatttaa atagttgcag catgccattg 4320
ggaatggaga gtaaagcaat atcagatgca cagattactg cttcatccta ctttaccaat 4380
atgtttgcca cctggtctcc ttcaaaagct cgacttcacc tccaagggag gagtaatgcc 4440
tggagacctc aggtgaataa tccaaaagag tggctgcaag tggacttcca gaagacaatg 4500
aaagtcacag gagtaactac tcagggagta aaatctctgc ttaccagcat gtatgtgaag 4560
gagttcctca tctccagcag tcaagatggc catcagtgga ctctcttttt tcagaatggc 4620
aaagtaaagg tttttcaggg aaatcaagac tccttcacac ctgtggtgaa ctctctagac 4680
ccaccgttac tgactcgcta ccttcgaatt cacccccaga gttgggtgca ccagattgcc 4740
ctgaggatgg aggttctggg ctgcgaggca caggacctct actga 4785

<210> SEQ ID NO 9
<211> LENGTH: 1272
<212> TYPE: DNA
<213> ORGANISM: Artificial Sequence
<220> FEATURE:
<223> OTHER INFORMATION: FIX

<400> SEQUENCE: 9
atgcagcgcg tgaacatgat catggcagaa tcaccaggcc tcatcaccat ctgcctttta 60
ggatatctac tcagtgctga atgtacagtt tttcttgatc atgaaaacgc caacaaaatt 120
ctgaatcggc caaagaggta taattcaggt aaattggaag agtttgttca agggaacctt 180
gagagagaat gtatggaaga aaagtgtagt tttgaagaag cacgagaagt tttgaaaaac 240
actgaaagaa caactgaatt ttggaagcag tatgttgatg taacatgtaa cattaagaat 300
ggcagatgcg agcagttttg taaaaatagt gctgataaca aggtggtttg ctcctgtact 360
gagggatatc gacttgcaga aaaccagaag tcctgtgaac cagcagtgcc atttccatgt 420
ggaagagttt ctgtttcaca aacttctaag ctcacccgtg ctgagactgt ttttcctgat 480
gtggactatg taaattctac tgaagctgaa accattttgg ataacatcac tcaaagcacc 540
caatcattta atgacttcac tcgggttgtt ggtggagaag atgccaaacc aggtcaattc 600
ccttggcagg ttgttttgaa tggtaaagtt gatgcattct gtggaggctc tatcgttaat 660
gaaaaatgga ttgtaactgc tgcccactgt gttgaaactg gtgttaaaat tacagttgtc 720

```
gcaggtgaac ataatattga ggagacagaa catacagagc aaaagcgaaa tgtgattcga    780

attattcctc accacaacta caatgcagct attaataagt acaaccatga cattgccctt    840

ctggaactgg acgaaccctt agtgctaaac agctacgtta cacctatttg cattgctgac    900

aaggaataca cgaacatctt cctcaaattt ggatctggct atgtaagtgg ctggggaaga    960

gtcttccaca aagggagatc agctttagtt cttcagtacc ttagagttcc acttgttgac   1020

cgagccacat gtcttcgatc tacaaagttc accatctata acaacatgtt ctgtgctggc   1080

ttccatgaag gaggtagaga ttcatgtcaa ggagatagtg gggacccca tgttactgaa   1140

gtggaaggga ccagtttctt aactggaatt attagctggg gtgaagagtg tgcaatgaaa   1200

ggcaaatatg gaatatatac caaggtatcc cggtatgtca actggattaa ggaaaaaaca   1260

aagctcactt aa                                                        1272
```

<210> SEQ ID NO 10
<211> LENGTH: 2544
<212> TYPE: DNA
<213> ORGANISM: Artificial Sequence
<220> FEATURE:
<223> OTHER INFORMATION: FIX Padua

<400> SEQUENCE: 10

```
atgcagcgcg tgaacatgat catggcagaa tcaccaggcc tcatcaccat ctgcctttta     60

ggatatctac tcagtgctga atgtacagtt tttcttgatc atgaaaacgc caacaaaatt    120

ctgaatcggc caaagaggta taattcaggt aaattggaag agtttgttca agggaacctt    180

gagagagaat gtatggaaga aaagtgtagt tttgaagaag cacgagaagt tttgaaaac    240

actgaaagaa caactgaatt ttggaagcag tatgttgatg taacatgtaa cattaagaat    300

ggcagatgcg agcagttttg taaaaatagt gctgataaca aggtggtttg ctcctgtact    360

gagggatatc gacttgcaga aaaccagaag tcctgtgaac cagcagtgcc atttccatgt    420

ggaagagttt ctgtttcaca aacttctaag ctcacccgtg ctgagactgt ttttcctgat    480

gtggactatg taaattctac tgaagctgaa accattttgg ataacatcac tcaaagcacc    540

caatcattta atgacttcac tcgggttgtt ggtggagaag atgccaaacc aggtcaattc    600

ccttggcagg ttgttttgaa tggtaaagtt gatgcattct gtggaggctc tatcgttaat    660

gaaaaatgga ttgtaactgc tgcccactgt gttgaaactg gtgttaaaat tacagttgtc    720

gcaggtgaac ataatattga ggagacagaa catacagagc aaaagcgaaa tgtgattcga    780

attattcctc accacaacta caatgcagct attaataagt acaaccatga cattgccctt    840

ctggaactgg acgaaccctt agtgctaaac agctacgtta cacctatttg cattgctgac    900

aaggaataca cgaacatctt cctcaaattt ggatctggct atgtaagtgg ctggggaaga    960

gtcttccaca aagggagatc agctttagtt cttcagtacc ttagagttcc acgagttgac   1020

cgagccacat gtcttcgatc tacaaagttc accatctata acaacatgtt ctgtgctggc   1080

ttccatgaag gaggtagaga ttcatgtcaa ggagatagtg gggacccca tgttactgaa   1140

gtggaaggga ccagtttctt aactggaatt attagctggg gtgaagagtg tgcaatgaaa   1200

ggcaaatatg gaatatatac caaggtatcc cggtatgtca actggattaa ggaaaaaaca   1260

aagctcactt aaatgcagcg cgtgaacatg atcatggcag aatcaccagg cctcatcacc   1320

atctgccttt taggatatct actcagtgct gaatgtacag tttttcttga tcatgaaaac   1380

gccaacaaaa ttctgaatcg gccaaagagg tataattcag gtaaattgga agagtttgtt   1440

caagggaacc ttgagagaga atgtatggaa gaaaagtgta gttttgaaga agcacgagaa   1500
```

```
gtttttgaaa acactgaaag aacaactgaa ttttggaagc agtatgttga tgtaacatgt   1560

aacattaaga atggcagatg cgagcagttt tgtaaaaata gtgctgataa caaggtggtt   1620

tgctcctgta ctgagggata tcgacttgca gaaaaccaga agtcctgtga accagcagtg   1680

ccatttccat gtggaagagt ttctgtttca caaacttcta agctcacccg tgctgagact   1740

gtttttcctg atgtggacta tgtaaattct actgaagctg aaaccatttt ggataacatc   1800

actcaaagca cccaatcatt taatgacttc actcgggttg ttggtggaga agatgccaaa   1860

ccaggtcaat tcccttggca ggttgttttg aatggtaaag ttgatgcatt ctgtggaggc   1920

tctatcgtta atgaaaaatg gattgtaact gctgcccact gtgttgaaac tggtgttaaa   1980

attacagttg tcgcaggtga acataatatt gaggagacag aacatacaga gcaaaagcga   2040

aatgtgattc gaattattcc tcaccacaac tacaatgcag ctattaataa gtacaaccat   2100

gacattgccc ttctggaact ggacgaaccc ttagtgctaa acagctacgt tacacctatt   2160

tgcattgctg acaaggaata cacgaacatc ttcctcaaat ttggatctgg ctatgtaagt   2220

ggctggggaa gagtcttcca caaagggaga tcagctttag ttcttcagta ccttagagtt   2280

ccacgagttg accgagccac atgtcttcga tctacaaagt tcaccatcta taacaacatg   2340

ttctgtgctg gcttccatga aggaggtaga gattcatgtc aaggagatag tggggggaccc   2400

catgttactg aagtggaagg gaccagtttc ttaactggaa ttattagctg ggtgaagag   2460

tgtgcaatga aaggcaaata tggaatatat accaaggtat cccggtatgt caactggatt   2520

aaggaaaaaa caaagctcac ttaa                                          2544
```

<210> SEQ ID NO 11
<211> LENGTH: 1401
<212> TYPE: DNA
<213> ORGANISM: Artificial Sequence
<220> FEATURE:
<223> OTHER INFORMATION: FVII

<400> SEQUENCE: 11

```
atggtctccc aggccctcag gctcctctgc cttctgcttg ggcttcaggg ctgcctggct     60

gcaggcgggg tcgctaaggc ctcaggagga gaaacacggg acatgccgtg gaagccgggg    120

cctcacagag tcttcgtaac ccaggaggaa gcccacggcg tcctgcaccg gcgccggcgc    180

gccaacgcgt tcctggagga gctgcggccg ggctccctgg agagggagtg caaggaggag    240

cagtgctcct tcgaggaggc ccgggagatc ttcaaggacg cggagaggac gaagctgttc    300

tggatttctt acagtgatgg ggaccagtgt gcctcaagtc catgccagaa tgggggctcc    360

tgcaaggacc agctccagtc ctatatctgc ttctgcctcc ctgccttcga gggccggaac    420

tgtgagacgc acaaggatga ccagctgatc tgtgtgaacg agaacggcgg ctgtgagcag    480

tactgcagtg accacacggg caccaagcgc tcctgtcggt gccacgaggg gtactctctg    540

ctggcagacg gggtgtcctg cacacccaca gttgaatatc catgtggaaa aatacctatt    600

ctagaaaaaa gaaatgccag caaaccccaa ggccgaattg tgggggggcaa ggtgtgcccc    660

aaaggggagt gtccatggca ggtcctgttg ttggtgaatg gagctcagtt gtgtgggggg    720

accctgatca acaccatctg ggtggtctcc gcggcccact gtttcgacaa aatcaagaac    780

tggaggaacc tgatcgcggt gctgggcgag cacgacctca gcgagcacga cggggatgag    840

cagagccggc gggtggcgca ggtcatcatc cccagcacgt acgtcccggg caccaccaac    900

cacgacatcg cgctgctccg cctgcaccag cccgtggtcc tcactgacca tgtggtgccc    960
```

ctctgcctgc ccgaacggac gttctctgag aggacgctgg ccttcgtgcg cttctcattg 1020
gtcagcggct ggggccagct gctggaccgt ggcgccacgg ccctggagct catggtcctc 1080
aacgtgcccc ggctgatgac ccaggactgc ctgcagcagt cacggaaggt gggagactcc 1140
ccaaatatca cggagtacat gttctgtgcc ggctactcgg atggcagcaa ggactcctgc 1200
aagggggaca gtggaggccc acatgccacc cactaccggg gcacgtggta cctgacgggc 1260
atcgtcagct ggggccaggg ctgcgcaacc gtgggccact ttggggtgta caccagggtc 1320
tcccagtaca tcgagtggct gcaaaagctc atgcgctcag agccacgccc aggagtcctc 1380
ctgcgagccc catttcccta g 1401

<210> SEQ ID NO 12
<211> LENGTH: 6675
<212> TYPE: DNA
<213> ORGANISM: Artificial Sequence
<220> FEATURE:
<223> OTHER INFORMATION: FV

<400> SEQUENCE: 12
atgttcccag gctgcccacg cctctgggtc ctggtggtct tgggcaccag ctgggtaggc 60
tgggggagcc aagggacaga agcggcacag ctaaggcagt tctacgtggc tgctcagggc 120
atcagttgga gctaccgacc tgagcccaca aactcaagtt tgaatctttc tgtaacttcc 180
tttaagaaaa ttgtctacag agagtatgaa ccatatttta agaaagaaaa accacaatct 240
accatttcag gacttcttgg gcctacttta tatgctgaag tcggagacat cataaaagtt 300
cactttaaaa ataaggcaga taagcccttg agcatccatc ctcaaggaat taggtacagt 360
aaattatcag aaggtgcttc ttaccttgac cacacattcc ctgcggagaa gatggacgac 420
gctgtggctc caggccgaga atacacctat gaatggagta tcagtgagga cagtggaccc 480
acccatgatg accctccatg cctcacacac atctattact cccatgaaaa tctgatcgag 540
gatttcaact cggggctgat tgggcccctg cttatctgta aaaaagggac cctaactgag 600
ggtgggacac agaagacgtt tgacaagcaa atcgtgctac tatttgctgt gtttgatgaa 660
agcaagagct ggagccagtc atcatcccta atgtacacag tcaatggata tgtgaatggg 720
acaatgccag atataacagt ttgtgcccat gaccacatca gctggcatct gctgggaatg 780
agctcggggc cagaattatt ctccattcat ttcaacggcc aggtcctgga gcagaaccat 840
cataaggtct cagccatcac ccttgtcagt gctacatcca ctaccgcaaa tatgactgtg 900
ggcccagagg gaaagtggat catatcttct ctcaccccaa aacatttgca agctgggatg 960
caggcttaca ttgacattaa aaactgccca aagaaaacca ggaatcttaa gaaaataact 1020
cgtgagcaga ggcggcacat gaagaggtgg gaatacttca ttgctgcaga ggaagtcatt 1080
tgggactatg cacctgtaat accagcgaat atggacaaaa aatacaggtc tcagcatttg 1140
gataatttct caaaccaaat tggaaaacat tataagaaag ttatgtacac acagtacgaa 1200
gatgagtcct tcaccaaaca tacagtgaat cccaatatga aagaagatgg gattttgggt 1260
cctattatca gagcccaggt cagagacaca ctcaaaatcg tgttcaaaaa tatggccagc 1320
cgcccctata gcatttaccc tcatggagtg accttctcgc cttatgaaga tgaagtcaac 1380
tcttctttca cctcaggcag gaacaacacc atgatcagag cagttcaacc aggggaaacc 1440
tatacttata agtggaacat cttagagttt gatgaaccca cagaaaatga tgcccagtgc 1500
ttaacaagac catactacag tgacgtggac atcatgagag acatcgcctc tgggctaata 1560
ggactacttc taatctgtaa gagcagatcc ctggacaggc gaggaataca gagggcagca 1620

```
gacatcgaac agcaggctgt gtttgctgtg tttgatgaga acaaaagctg gtaccttgag   1680
gacaacatca acaagttttg tgaaaatcct gatgaggtga aacgtgatga ccccaagttt   1740
tatgaatcaa acatcatgag cactatcaat ggctatgtgc ctgagagcat aactactctt   1800
ggattctgct ttgatgacac tgtccagtgg cacttctgta gtgtggggac ccagaatgaa   1860
attttgacca tccacttcac tgggcactca ttcatctatg gaaagaggca tgaggacacc   1920
ttgaccctct tccccatgcg tggagaatct gtgacggtca caatggataa tgttggaact   1980
tggatgttaa cttccatgaa ttctagtcca agaagcaaaa agctgaggct gaaattcagg   2040
gatgttaaat gtatcccaga tgatgatgaa gactcatatg agatttttga acctccagaa   2100
tctacagtca tggctacacg gaaaatgcat gatcgtttag aacctgaaga tgaagagagt   2160
gatgctgact atgattacca gaacagactg gctgcagcat taggaatcag gtcattccga   2220
aactcatcat tgaatcagga agaagaagag ttcaatctta ctgccctagc tctggagaat   2280
ggcactgaat tcgtttcttc aaacacagat ataattgttg gttcaaatta ttcttcccca   2340
agtaatatta gtaagttcac tgtcaataac cttgcagaac ctcagaaagc cccttctcac   2400
caacaagcca ccacagctgg ttccccactg agacacctca ttggcaagaa ctcagttctc   2460
aattcttcca cagcagagca ttccagccca tattctgaag accctataga ggatcctcta   2520
cagccagatg tcacagggat acgtctactt tcacttggtg ctggagaatt caaaagtcaa   2580
gaacatgcta agcataaggg acccaaggta gaaagagatc aagcagcaaa gcacaggttc   2640
tcctggatga aattactagc acataaagtt gggagacacc taagccaaga cactggttct   2700
ccttccggaa tgaggccctg ggaggacctt cctagccaag acactggttc tccttccaga   2760
atgaggccct ggaaggaccc tcctagtgat ctgttactct taaaacaaag taactcatct   2820
aagattttgg ttgggagatg gcatttggct tctgagaaag gtagctatga aataatccaa   2880
gatactgatg aagacacagc tgttaacaat tggctgatca gcccccagaa tgcctcacgt   2940
gcttggggag aaagcacccc tcttgccaac aagcctggaa agcagagtgg ccacccaaag   3000
tttcctagag ttagacataa atctctacaa gtaagacagg atggaggaaa gagtagactg   3060
aagaaaagcc agtttctcat taagacacga aaaaagaaaa aagagaagca cacacaccat   3120
gctcctttat ctccgaggac ctttcaccct ctaagaagtg aagcctacaa cacattttca   3180
gaaagaagac ttaagcattc gttggtgctt cataaatcca atgaaacatc tcttcccaca   3240
gacctcaatc agacattgcc ctctatggat tttggctgga tagcctcact tcctgaccat   3300
aatcagaatt cctcaaatga cactggtcag gcaagctgtc ctccaggtct ttatcagaca   3360
gtgcccccag aggaacacta tcaaacattc cccattcaag accctgatca aatgcactct   3420
acttcagacc ccagtcacag atcctcttct ccagagctca gtgaaatgct tgagtatgac   3480
cgaagtcaca agtccttccc cacagatata agtcaaatgt ccccttcctc agaacatgaa   3540
gtctggcaga cagtcatctc tccagacctc agccaggtga ccctctctcc agaactcagc   3600
cagacaaacc tctctccaga cctcagccac acgactctct ctccagaact cattcagaga   3660
aacctttccc cagccctcgg tcagatgccc atttctccag acctcagcca tacaaccctt   3720
tctccagacc tcagccatac aacccttttct ttagacctca gccagacaaa cctctctcca   3780
gaactcagtc agacaaacct ttctccagcc ctcggtcaga tgcccctttc tccagacctc   3840
agccatacaa cccttttctct agacttcagc cagacaaacc tctctccaga actcagccat   3900
atgactctct ctccagaact cagtcagaca aacctttccc cagccctcgg tcagatgccc   3960
```

```
atttctccag acctcagcca tacaaccctt tctctagact tcagccagac aaacctctct   4020
ccagaactca gtcaaacaaa cctttcccca gccctcggtc agatgcccct ttctccagac   4080
cccagccata caaccctttc tctagacctc agccagacaa acctctctcc agaactcagt   4140
cagacaaacc tttccccaga cctcagtgag atgcccctct ttgcagatct cagtcaaatt   4200
ccccttaccc cagacctcga ccagatgaca ctttctccag accttggtga gacagatctt   4260
tccccaaact ttggtcagat gtccctttcc ccagacctca gccaggtgac tctctctcca   4320
gacatcagtg acaccaccct tctcccggat ctcagccaga tatcacctcc tccagacctt   4380
gatcagatat tctacccttc tgaatctagt cagtcattgc ttcttcaaga atttaatgag   4440
tcttttcctt atccagacct tggtcagatg ccatctcctt catctcctac tctcaatgat   4500
acttttctat caaaggaatt taatccactg gttatagtgg gcctcagtaa agatggtaca   4560
gattacattg agatcattcc aaaggaagag gtccagagca gtgaagatga ctatgctgaa   4620
attgattatg tgccctatga tgacccctac aaaactgatg ttaggacaaa catcaactcc   4680
tccagagatc ctgacaacat tgcagcatgg tacctccgca gcaacaatgg aaacagaaga   4740
aattattaca ttgctgctga agaaatatcc tgggattatt cagaatttgt acaaagggaa   4800
acagatattg aagactctga tgatattcca gaagatacca catataagaa agtagttttt   4860
cgaaagtacc tcgacagcac ttttaccaaa cgtgatcctc gaggggagta tgaagagcat   4920
ctcggaattc ttggtcctat tatcagagct gaagtggatg atgttatcca agttcgtttt   4980
aaaaatttag catccagacc gtattctcta catgcccatg gactttccta tgaaaaatca   5040
tcagagggaa agacttatga agatgactct cctgaatggt ttaaggaaga taatgctgtt   5100
cagccaaata gcagttatac ctacgtatgg catgccactg agcgatcagg gccagaaagt   5160
cctggctctg cctgtcgggc ttgggcctac tactcagctg tgaacccaga aaaagatatt   5220
cactcaggct tgataggtcc cctcctaatc tgccaaaaag gaatactaca taaggacagc   5280
aacatgccta tggacatgag agaatttgtc ttactattta tgacctttga tgaaaagaag   5340
agctggtact atgaaaagaa gtcccgaagt tcttggagac tcacatcctc agaaatgaaa   5400
aaatcccatg agtttcacgc cattaatggg atgatctaca gcttgcctgg cctgaaaatg   5460
tatgagcaag agtgggtgag gttacacctg ctgaacatag gcggctccca agacattcac   5520
gtggttcact ttcacggcca gaccttgctg gaaaatggca ataaacagca ccagttaggg   5580
gtctggcccc ttctgcctgg ttcatttaaa actcttgaaa tgaaggcatc aaaacctggc   5640
tggtggctcc taaacacaga ggttggagaa aaccagagag cagggatgca aacgccattt   5700
cttatcatgg acagagactg taggatgcca atgggactaa gcactggtat catatctgat   5760
tcacagatca aggcttcaga gtttctgggt tactgggagc ccagattagc aagattaaac   5820
aatggtggat cttataatgc ttggagtgta gaaaaacttg cagcagaatt tgcctctaaa   5880
ccttggatcc aggtggacat gcaaaaggaa gtcataatca cagggatcca gacccaaggt   5940
gccaaacact acctgaagtc ctgctatacc acagagttct atgtagctta cagttccaac   6000
cagatcaact ggcagatctt caaagggaac agcacaagga atgtgatgta ttttaatggc   6060
aattcagatg cctctacaat aaaagagaat cagtttgacc cacctattgt ggctagatat   6120
attaggatct ctccaactcg agcctataac agacctaccc ttcgattgga actgcaaggt   6180
tgtgaggtaa atggatgttc cacacccctg ggtatggaaa atggaaagat agaaaacaag   6240
caaatcacag cttcttcgtt taagaaatct tggtggggag attactggga acccttccgt   6300
gcccgtctga atgcccaggg acgtgtgaat gcctggcaag ccaaggcaaa caacaataag   6360
```

```
cagtggctag aaattgatct actcaagatc aagaagataa cggcaattat aacacagggc   6420

tgcaagtctc tgtcctctga aatgtatgta aagagctata ccatccacta cagtgagcag   6480

ggagtggaat ggaaaccata caggctgaaa tcctccatgg tggacaagat tttgaagga   6540

aatactaata ccaaaggaca tgtgaagaac tttttcaacc ccccaatcat ttccaggttt   6600

atccgtgtca ttcctaaaac atggaatcaa agtattgcac ttcgcctgga actctttggc   6660

tgtgatattt actag                                                    6675


<210> SEQ ID NO 13
<211> LENGTH: 110
<212> TYPE: DNA
<213> ORGANISM: Artificial Sequence
<220> FEATURE:
<223> OTHER INFORMATION: mirT122-3p 110 bp

<400> SEQUENCE: 13

acaaacacca ttgtcacact ccattcgaaa caaacaccat tgtcacactc caacgcgtac     60

aaacaccatt gtcacactcc aatgcataca aacaccattg tcacactcca               110


<210> SEQ ID NO 14
<211> LENGTH: 98
<212> TYPE: DNA
<213> ORGANISM: Artificial Sequence
<220> FEATURE:
<223> OTHER INFORMATION: mirT223 98 bp

<400> SEQUENCE: 14

ggggtatttg acaaactgac acgatggggt atttgacaaa ctgacaaccg gtggggtatt     60

tgacaaactg acatcacggg gtatttgaca aactgaca                             98


<210> SEQ ID NO 15
<211> LENGTH: 106
<212> TYPE: DNA
<213> ORGANISM: Artificial Sequence
<220> FEATURE:
<223> OTHER INFORMATION: mirT142-3p 108 bp

<400> SEQUENCE: 15

tccataaagt aggaaacact acacgattcc ataaagtagg aaacactaca accggttcca     60

taaagtagga aacactacat cactccataa agtaggaaac actaca                   106


<210> SEQ ID NO 16
<211> LENGTH: 24
<212> TYPE: DNA
<213> ORGANISM: Artificial Sequence
<220> FEATURE:
<223> OTHER INFORMATION: CP1: Stab2.2 sense

<400> SEQUENCE: 16

ctcgagcgtt tccatcatgg tttc                                            24


<210> SEQ ID NO 17
<211> LENGTH: 28
<212> TYPE: DNA
<213> ORGANISM: Artificial Sequence
<220> FEATURE:
<223> OTHER INFORMATION: CP2: Stab2.1-3 anti-sense

<400> SEQUENCE: 17

accggtgagg aaatatttgc tccttctc                                        28
```

-continued

```
<210> SEQ ID NO 18
<211> LENGTH: 26
<212> TYPE: DNA
<213> ORGANISM: Artificial Sequence
<220> FEATURE:
<223> OTHER INFORMATION: CP3: Stab2.1 sense

<400> SEQUENCE: 18

ctcgaggtct aacatggcat ttccct                                    26


<210> SEQ ID NO 19
<211> LENGTH: 27
<212> TYPE: DNA
<213> ORGANISM: Artificial Sequence
<220> FEATURE:
<223> OTHER INFORMATION: CP4: Stab2.3 sense

<400> SEQUENCE: 19

ctcgagtaga ggagaggcag gaccgtt                                   27


<210> SEQ ID NO 20
<211> LENGTH: 22
<212> TYPE: DNA
<213> ORGANISM: Artificial Sequence
<220> FEATURE:
<223> OTHER INFORMATION: SP1

<400> SEQUENCE: 20

gaagcatcca atttatgtcc ct                                        22


<210> SEQ ID NO 21
<211> LENGTH: 22
<212> TYPE: DNA
<213> ORGANISM: Artificial Sequence
<220> FEATURE:
<223> OTHER INFORMATION: SP2

<400> SEQUENCE: 21

gatagatgtg acctcggctt tc                                        22
```